United States Patent
Hyodo et al.

(10) Patent No.: US 9,591,282 B2
(45) Date of Patent: Mar. 7, 2017

(54) IMAGE PROCESSING METHOD, IMAGE PROCESSING DEVICE, AND ELECTRONIC APPARATUS

(71) Applicant: Sony Corporation, Tokyo (JP)

(72) Inventors: Yasuhide Hyodo, Tokyo (JP); Takanori Ishikawa, Saitama (JP)

(73) Assignee: Sony Corporation, Tokyo (JP)

( * ) Notice: Subject to any disclaimer, the term of this patent is extended or adjusted under 35 U.S.C. 154(b) by 80 days.

(21) Appl. No.: 14/620,380

(22) Filed: Feb. 12, 2015

(65) Prior Publication Data
US 2015/0245007 A1 Aug. 27, 2015

(30) Foreign Application Priority Data
Feb. 21, 2014 (JP) ................................. 2014-031592

(51) Int. Cl.
H04N 13/00 (2006.01)
G06T 7/00 (2006.01)

(52) U.S. Cl.
CPC ....... *H04N 13/0022* (2013.01); *G06T 7/0075* (2013.01); *H04N 13/0018* (2013.01); *G06T 2207/20228* (2013.01); *H04N 2213/002* (2013.01)

(58) Field of Classification Search
None
See application file for complete search history.

(56) References Cited

U.S. PATENT DOCUMENTS

| | | | | |
|---|---|---|---|---|
| 2013/0057644 A1* | 3/2013 | Stefanoski | ................ | G06T 5/50 348/42 |
| 2014/0218488 A1* | 8/2014 | Didyk | .................. | G06T 7/0022 348/51 |
| 2014/0340486 A1* | 11/2014 | Asano | .................... | G01B 11/02 348/47 |

FOREIGN PATENT DOCUMENTS

JP    2010-529521 A    8/2010

OTHER PUBLICATIONS

Hosik Sohn, Yong Ju Jung, and Yong Man Ro, "Crosstalk reduction in stereoscopic 3D displays: Disparity adjustment using crosstalk visibility index for crosstalk cancellation," Opt. Express 22, 3375-3392 (Feb. 5, 2014).*

Lang, M., Hornung, A., Wang, O., Poulakos, S., Smolic, A., & Gross, M. (Jul. 2010). Nonlinear disparity mapping for stereoscopic 3D. In ACM Transactions on Graphics (TOG) (vol. 29, No. 4, p. 75). ACM.*

\* cited by examiner

*Primary Examiner* — Kim Vu
*Assistant Examiner* — Nathan Bloom
(74) *Attorney, Agent, or Firm* — Wolf, Greenfield & Sacks, P.C.

(57) ABSTRACT

There is provided an image processing method including acquiring an original image and a disparity map, the disparity map indicating distribution of disparity values associated with respective pixels in the original image, causing a processor to decide a dynamic range of disparity on the basis of the acquired original image and the acquired disparity map, and converting the disparity map in a manner that each disparity in the disparity map is distributed within the decided dynamic range of the disparity.

18 Claims, 35 Drawing Sheets

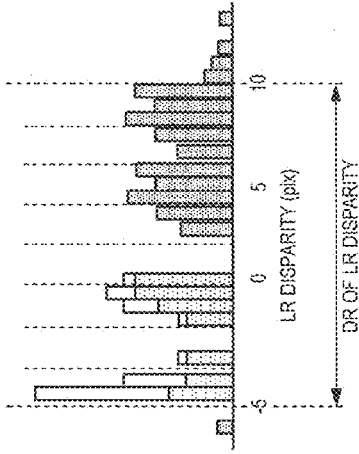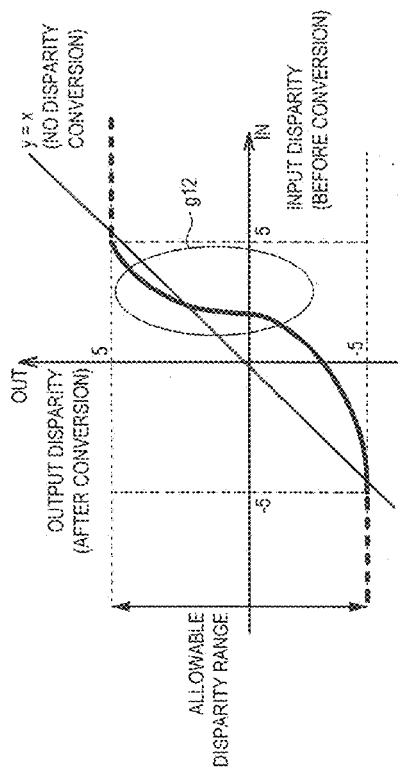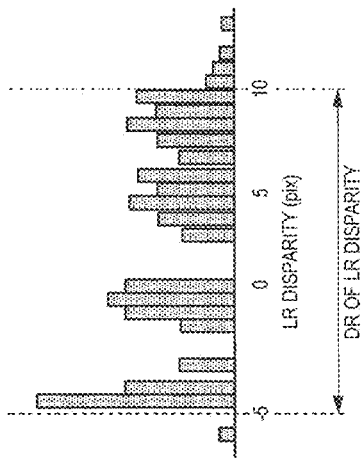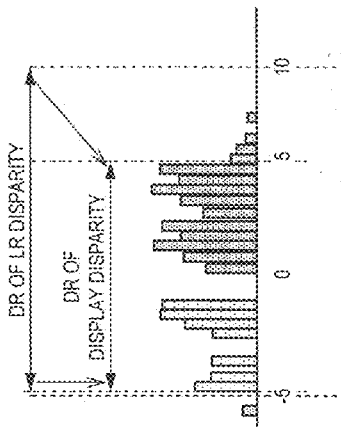
FIG. 12

EXAMPLE OF RELATIONSHIP BETWEEN VISUAL CHARACTERISTIC JND AND LUMINANCE v50 v52 v60 v52

FIG. 34

VIEWPOINT NUMBER MAPPED TO PANEL

| row | Column1 | | | Column2 | | | Column3 | | |
|---|---|---|---|---|---|---|---|---|---|
| | 1R | 1G | 1B | 2R | 2G | 2B | 3R | 3G | 3B |
| 1 | 1 | 2 | 3 | 4 | 5 | 6 | 1 | 2 | 3 |
| 2 | 2 | 3 | 4 | 5 | 6 | 1 | 2 | 3 | 4 |
| 3 | 3 | 4 | 5 | 6 | 1 | 2 | 3 | 4 | 5 |
| 4 | 4 | 5 | 6 | 1 | 2 | 3 | 4 | 5 | 6 |
| 5 | 5 | 6 | 1 | 2 | 3 | 4 | 5 | 6 | 1 |
| 6 | 6 | 1 | 2 | 3 | 4 | 5 | 6 | 1 | 2 |
| 7 | 1 | 2 | 3 | 4 | 5 | 6 | 1 | 2 | 3 |
| 8 | 2 | 3 | 4 | 5 | 6 | 1 | 2 | 3 | 4 |
| 9 | 3 | 4 | 5 | 6 | 1 | 2 | 3 | 4 | 5 |
| 10 | 4 | 5 | 6 | 1 | 2 | 3 | 4 | 5 | 6 |
| 11 | 5 | 6 | 1 | 2 | 3 | 4 | 5 | 6 | 1 |
| 12 | 6 | 1 | 2 | 3 | 4 | 5 | 6 | 1 | 2 |

LIGHT QUANTITY RATIO OF SUB-PIXEL SEEN FROM GIVEN APPARENT POSITION

RESPECTIVE LIGHT QUANTITY RATIOS OF RGB ARE UNIFORM IN OBLIQUE DIRECTION
⇒ NO FALSE COLOR BECAUSE BALANCE OF RGB IS NOT LOST

| row | Column1 | | | Column2 | | | Column3 | | |
|---|---|---|---|---|---|---|---|---|---|
| | 1R | 1G | 1B | 2R | 2G | 2B | 3R | 3G | 3B |
| 1 | 0.13 | 0.3 | 1 | 0.3 | 0.13 | 0.1 | 0.13 | 0.3 | 1 |
| 2 | 0.3 | 1 | 0.3 | 0.13 | 0.1 | 0.13 | 0.3 | 1 | 0.3 |
| 3 | 1 | 0.3 | 0.13 | 0.1 | 0.13 | 0.3 | 1 | 0.3 | 0.13 |
| 4 | 0.3 | 0.13 | 0.1 | 0.13 | 0.3 | 1 | 0.3 | 0.13 | 0.1 |
| 5 | 0.13 | 0.1 | 0.13 | 0.3 | 1 | 0.3 | 0.13 | 0.1 | 0.13 |
| 6 | 0.1 | 0.13 | 0.3 | 1 | 0.3 | 0.13 | 0.1 | 0.13 | 0.3 |
| 7 | 0.13 | 0.3 | 1 | 0.3 | 0.13 | 0.1 | 0.13 | 0.3 | 1 |
| 8 | 0.3 | 1 | 0.3 | 0.13 | 0.1 | 0.13 | 0.3 | 1 | 0.3 |
| 9 | 1 | 0.3 | 0.13 | 0.1 | 0.13 | 0.3 | 1 | 0.3 | 0.13 |
| 10 | 0.3 | 0.13 | 0.1 | 0.13 | 0.3 | 1 | 0.3 | 0.13 | 0.1 |
| 11 | 0.13 | 0.1 | 0.13 | 0.3 | 1 | 0.3 | 0.13 | 0.1 | 0.13 |
| 12 | 0.1 | 0.13 | 0.3 | 1 | 0.3 | 0.13 | 0.1 | 0.13 | 0.3 |

FIG. 35

VIEWPOINT NUMBER MAPPED TO PANEL

| row | Column1 | | | Column2 | | | Column3 | | |
|---|---|---|---|---|---|---|---|---|---|
| | 1R | 1G | 1B | 2R | 2G | 2B | 3R | 3G | 3B |
| 1 | 1 | 2 | 3 | 4 | 5 | 6 | 7 | 8 | 1 |
| 2 | 2 | 3 | 4 | 5 | 6 | 7 | 8 | 1 | 2 |
| 3 | 2 | 3 | 4 | 5 | 6 | 7 | 8 | 1 | 2 |
| 4 | 3 | 4 | 5 | 6 | 7 | 8 | 1 | 2 | 3 |
| 5 | 4 | 5 | 6 | 7 | 8 | 1 | 2 | 3 | 4 |
| 6 | 4 | 5 | 6 | 7 | 8 | 1 | 2 | 3 | 4 |
| 7 | 5 | 6 | 7 | 8 | 1 | 2 | 3 | 4 | 5 |
| 8 | 6 | 7 | 8 | 1 | 2 | 3 | 4 | 5 | 6 |
| 9 | 6 | 7 | 8 | 1 | 2 | 3 | 4 | 5 | 6 |
| 10 | 7 | 8 | 1 | 2 | 3 | 4 | 5 | 6 | 7 |
| 11 | 8 | 1 | 2 | 3 | 4 | 5 | 6 | 7 | 8 |
| 12 | 8 | 1 | 2 | 3 | 4 | 5 | 6 | 7 | 8 |

LIGHT QUANTITY RATIO OF SUB-PIXEL SEEN FROM GIVEN APPARENT POSITION

RESPECTIVE LIGHT QUANTITY RATIOS OF RGB ARE NOT UNIFORM IN OBLIQUE DIRECTION
⇒ FALSE COLOR OCCURS BECAUSE BALANCE OF RGB IS LOST

| row | Column1 | | | Column2 | | | Column3 | | |
|---|---|---|---|---|---|---|---|---|---|
| | 1R | 1G | 1B | 2R | 2G | 2B | 3R | 3G | 3B |
| 1 | 0.1 | 0.13 | 0.45 | 0.74 | 0.55 | 0.14 | 0.1 | 0.1 | 0.1 |
| 2 | 0.11 | 0.25 | 0.73 | 0.66 | 0.19 | 0.11 | 0.1 | 0.09 | 0.11 |
| 3 | 0.16 | 0.65 | 0.71 | 0.34 | 0.12 | 0.1 | 0.1 | 0.1 | 0.16 |
| 4 | 0.45 | 0.74 | 0.55 | 0.14 | 0.1 | 0.1 | 0.1 | 0.13 | 0.45 |
| 5 | 0.73 | 0.66 | 0.19 | 0.11 | 0.1 | 0.09 | 0.11 | 0.25 | 0.73 |
| 6 | 0.71 | 0.34 | 0.12 | 0.1 | 0.1 | 0.1 | 0.16 | 0.65 | 0.71 |
| 7 | 0.55 | 0.14 | 0.1 | 0.1 | 0.1 | 0.13 | 0.45 | 0.74 | 0.55 |
| 8 | 0.19 | 0.11 | 0.1 | 0.09 | 0.1 | 0.25 | 0.73 | 0.66 | 0.19 |
| 9 | 0.12 | 0.1 | 0.1 | 0.1 | 0.16 | 0.65 | 0.71 | 0.34 | 0.12 |
| 10 | 0.1 | 0.1 | 0.1 | 0.13 | 0.45 | 0.74 | 0.55 | 0.14 | 0.1 |
| 11 | 0.1 | 0.09 | 0.11 | 0.25 | 0.73 | 0.66 | 0.19 | 0.1 | 0.12 |
| 12 | 0.1 | 0.1 | 0.16 | 0.65 | 0.71 | 0.34 | 0.12 | 0.1 | 0.1 |

FIG. 36
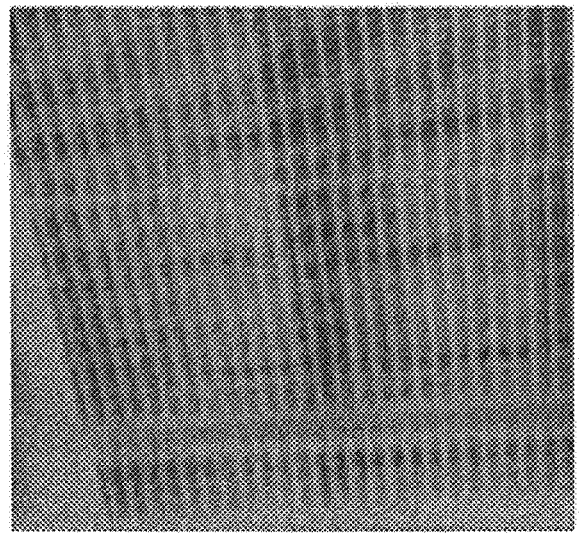
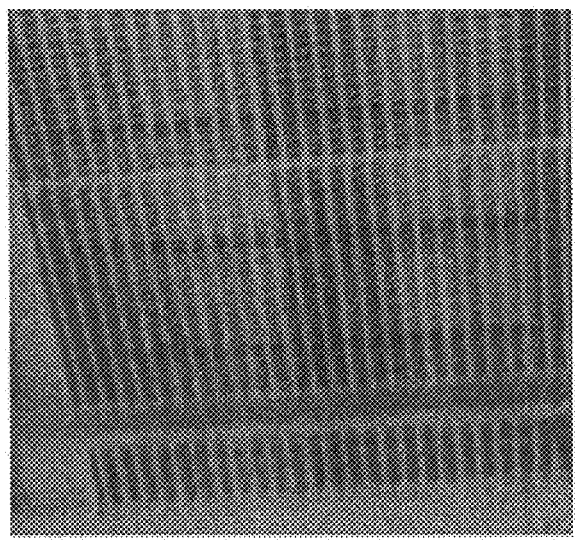

IMAGE PROCESSING METHOD, IMAGE PROCESSING DEVICE, AND ELECTRONIC APPARATUS

CROSS REFERENCE TO RELATED APPLICATIONS

This application claims the benefit of Japanese Priority Patent Application JP 2014-031592 filed Feb. 21, 2014, the entire contents of which are incorporated herein by reference.

BACKGROUND

The present disclosure relates to an image processing method, an image processing device, and an electronic apparatus.

In recent years, stereoscopic display devices that can stereoscopically display content have been gaining widespread use. Such a stereoscopic display device horizontally shifts and displays an image for a right eye and an image for a left eye on a display, and adjusts a disparity amount on the basis of how much the images have been shifted, thereby displaying content in a given distance in the depth direction.

Dedicated glasses have been traditionally used to stereoscopically display content, and yet glasses-free 3D technology has been recently developed to allow a user to enjoy 3D video without any dedicated glasses (see JP 2010-529521T).

SUMMARY

Stereoscopic display devices that display viewpoint images of two or more viewpoints sometimes suffer from a phenomenon in which rays of light leak into each viewpoint image from the adjacent viewpoint image because of the optical characteristics of the displays, the phenomenon being referred to as crosstalk. Once crosstalk occurs, the crosstalk may cause stereoscopic display images for both of right and left eyes to be distorted like image ghosting and image doubling, and this will considerably degrade the image quality. That is to say, image quality is traded off for disparity, which means that if image quality is maintained at a given level, a range of disparity which can be displayed is limited.

Disparity can be set for both of a front side and a back side of the display surface of a display in the depth direction, and yet the distribution of disparity may also be deviated to one of the front side and the back side of the display surface in the depth direction. The other disparity display range of the display surface of a display is rarely used effectively in such a case, and the resultant insufficient use of the display performance leads to a limited stereopsis.

Accordingly, the present disclosure provides a novel and improved image processing method, image processing device, and electronic apparatus that can prevent image quality from degrading and can emphasize a stereoscopic sense.

According to an embodiment of the present disclosure, there is provided an image processing method including acquiring an original image and a disparity map, the disparity map indicating distribution of disparity values associated with respective pixels in the original image, causing a processor to decide a dynamic range of disparity on the basis of the acquired original image and the acquired disparity map, and converting the disparity map in a manner that each disparity in the disparity map is distributed within the decided dynamic range of the disparity.

According to another embodiment of the present disclosure, there is provided an image processing device including an acquisition unit configured to acquire an original image and a disparity map, the disparity map indicating distribution of disparity values associated with respective pixels in the original image, a disparity range deciding unit configured to decide a dynamic range of disparity on the basis of the acquired original image and the acquired disparity map, and a disparity layout converting unit configured to convert the disparity map in a manner that each disparity in the disparity map is distributed within the decided dynamic range of the disparity.

According to still another embodiment of the present disclosure, there is provided an electronic apparatus including an acquisition unit configured to acquire an original image and a disparity map, the disparity map indicating distribution of disparity values associated with respective pixels in the original image, a disparity range deciding unit configured to decide a dynamic range of disparity on the basis of the acquired original image and the acquired disparity map, and a disparity layout converting unit configured to convert the disparity map in a manner that each disparity in the disparity map is distributed within the decided dynamic range of the disparity.

According to one or more of embodiments of the present disclosure as described above, there are provided a novel and improved image processing method, image processing device, and electronic apparatus that can prevent image quality from degrading and can emphasize a stereoscopic sense.

Note that the advantageous effects described above are not necessarily limited, but any advantageous effects that are shown in the present specification or any other advantageous effects that can be grasped from the present specification may be attained in combination of the above-described advantageous effects or instead thereof.

BRIEF DESCRIPTION OF THE DRAWINGS

FIG. 12 is an explanatory diagram for describing an overview of a process of converting a disparity layout;

FIG. 34 is a plan view illustrating RGB sub-pixels and crosstalk ratios thereof, the schematic diagram illustrating crosstalk ratios dependent on slope of a disparity element;

FIG. 35 is a plan view illustrating RGB sub-pixels and crosstalk ratios thereof, the schematic diagram illustrating crosstalk ratios dependent on slope of a disparity element;

FIG. 36 is a schematic diagram illustrating an example in which a striped pattern occurs because of color breakup;

DETAILED DESCRIPTION OF THE EMBODIMENT(S)

Figure 1:
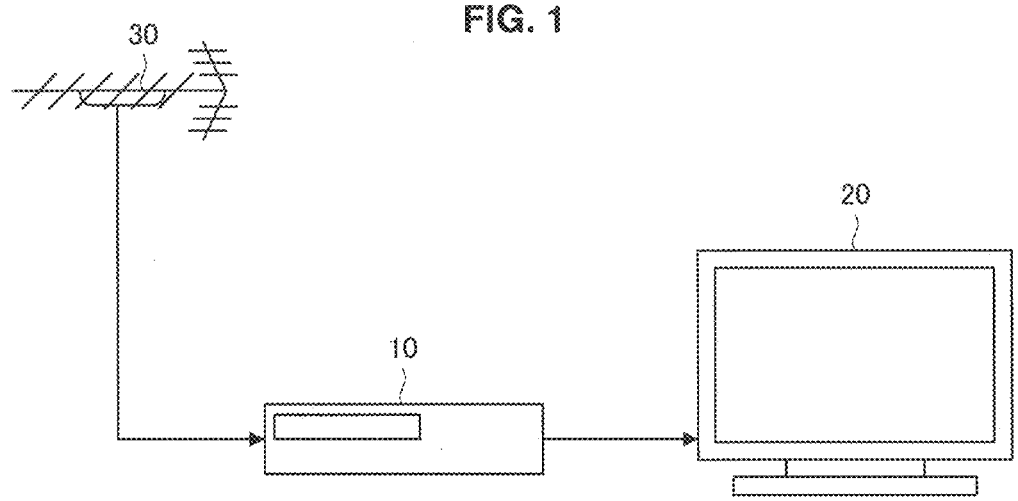
FIG. 1 is an explanatory diagram illustrating an example of a schematic configuration of a system including an image processing device according to an embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Here, the description will be made in the following order.
1. Overview
2. Configuration of Display Device
3. Disadvantages
4. Description of Principles
   4.1. Model Formula of Crosstalk
   4.2. Estimation of Disparity Transition of Crosstalk Degradation Amount ΔI through Learning
   4.3. Flattening of Histogram and Application to Conversion of Disparity Layout
5. First Embodiment
6. Second Embodiment
7. Third Embodiment
8. Modified Examples
   8.1. Modified Example 1
   8.2. Modified Example 2
   8.3. Modified Example 3
9. Hardware Configuration
10. Application Example
11. Conclusion

1. OVERVIEW

First of all, the overview of an image processing device according to an embodiment of the present disclosure will be described with reference to FIG. 1. FIG. 1 is an explanatory diagram illustrating an example of a schematic configuration of a system including an image processing device according to an embodiment of the present disclosure.

As illustrated in FIG. 1, an image processing device 10 according to an embodiment of the present disclosure is connected to a display device 20. Additionally, the image processing device 10 may be built in the display device 20. Let us assume below that the image processing device 10 is installed as a separate housing from the display device 20.

The display device 20 according to an embodiment of the present disclosure is configured to set a plurality of virtual viewpoints (at least two or more virtual viewpoints) in advance at different predetermined positions in a forward part of the display surface of the display device 20, and to be capable of showing viewpoint video that is different at each of the virtual viewpoints. For example, the positions of the respective virtual viewpoints are adjusted in advance in such a configuration to cause the left and right eyes of a viewer to serve as virtual viewpoints that are different from each other, and a viewpoint image for which different disparity has been set at each of the viewpoints is displayed, thereby allowing the viewer to enjoy an image creating a stereoscopic sense. Specific examples of the display device 20 include a glasses-free 3D display.

The image processing device 10 acquires an original image to be displayed from the outside, generates a viewpoint image corresponding to each virtual viewpoint on the basis of the acquired original image, and then outputs the generated viewpoint image to the display device 20. The image processing device 10 may be, for example, connected to an antenna 30 for receiving broadcasting that include an image such as a still image and a moving image.

Additionally, an original image, herein, refers to an image that is a source for generating a viewpoint image corresponding to each virtual viewpoint, and is not limited in particular as long as it is possible to generate the viewpoint image. Examples of original images include still images and moving images. In addition, an original image may also be what is called a stereo image for allowing for stereopsis, or may be an image that does not take stereopsis into consideration (in other words, an image for a single viewpoint). If an image that does not take stereopsis into consideration is acquired as an original image, the image processing device 10 may carry out an image analysis on the original image to generate each viewpoint image on the basis of the analysis results. If a stereo image is used as an original image but a viewpoint image is desired which takes more viewpoints into consideration than the stereo image does, the image processing device 10 may carry out an image analysis on the original image to generate a viewpoint image for the necessary viewpoints.

A source is not limited in particular from which the image processing device 10 acquires an original image. For example, as illustrated in FIG. 1, the image processing device 10 may receive an original image via the antenna 30, the original image having been delivered as broadcasting. To give another example, the image processing device 10 may also read out an original image recorded in an external medium from the external medium. To give still another example, the image processing device 10 may include a storage unit for storing an original image, and the image processing device 10 may be configured to read out the original image stored in the storage unit.

2. CONFIGURATION OF DISPLAY DEVICE

Figure 2:
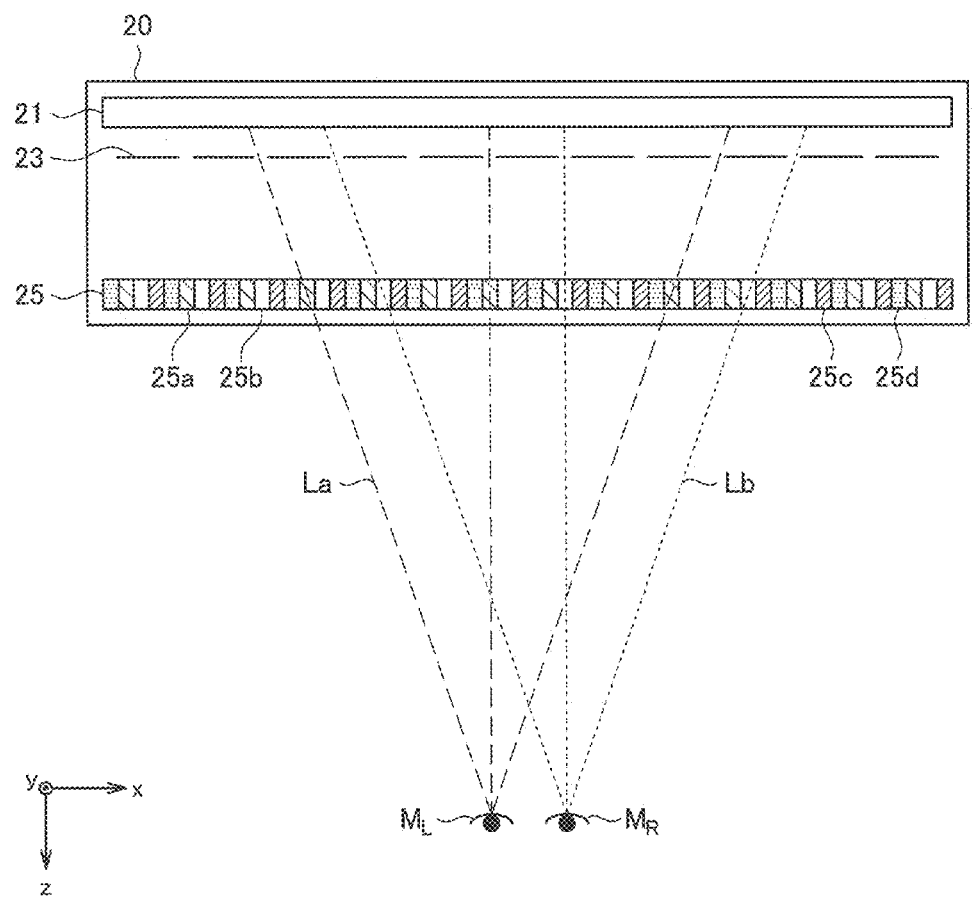
FIG. 2 is an explanatory diagram illustrating an example of a schematic configuration of a display device according to the same embodiment.

Next, an example of the configuration of a display device 20 according to an embodiment of the present disclosure will be described with reference to FIG. 2. FIG. 2 is an explanatory diagram illustrating an example of a schematic configuration of a display device according to the present embodiment. An x direction indicating the transverse direction in FIG. 2 indicates a horizontal direction for the display surface of the display device 20, while a y direction indicating the vertical direction in the figure indicates a vertical direction for the display surface of the display device 20. Meanwhile, a z direction indicating the longitudinal direction indicates a depth direction for the display surface of the display device 20.

As illustrated in FIG. 2, the display device 20 includes a backlight 21, a barrier 23, and a display panel 25. For example, the configuration illustrated in FIG. 2 shows a display device (display) using a liquid crystal panel as the display panel 25, and the rays of light that have been emitted from the backlight 21 and passed through the display panel 25 arrive at a viewer as an image. The barrier 23 is installed in front of the backlight 21 in the configuration illustrated in FIG. 2. The display panel 25 is installed at a position spaced by a predetermined distance from the barrier 23 in front of the barrier 23.

The barrier 23 is, for example, made of an optical member such as a lenticular plate and a parallax barrier. The barrier 23 has openings in the x direction at a predetermined frequency, and only the rays of light passing through the openings of the barrier 23 among the rays of light that have been emitted from the backlight 23 arrive at the display panel 25.

The display panel 25 includes a plurality of pixels. Each pixel of the display panel 25 is associated with an index indicating any of a plurality of virtual viewpoints that have been set in advance, and is configured to display a pixel of the disparity image corresponding to the index. Additionally, the association of each pixel with each index is designed in advance in accordance with a positional relationship between the barrier 23, the display panel 25, and each virtual viewpoint.

To give a specific example, the display panel 25 includes pixels 25a to 25d associated with indexes each corresponding to a different virtual viewpoint in the example illustrated in FIG. 2. For example, rays of light La that have passed through openings of the barrier 23 pass through pixels 25a and converge at a virtual viewpoint $M_L$ illustrated in FIG. 2, while rays of light Lb that have passed through openings of the barrier 23 pass through pixels 25b and converge at a virtual viewpoint $M_R$. If the left eye of a viewer is, for example, positioned at the virtual viewpoint $M_L$ and the right eye of the viewer is positioned at the virtual viewpoint $M_R$, the pixels 25a displaying a disparity image for the left eye and the pixels 25b displaying a disparity image for the right eye allow the viewer to enjoy an image that creates a stereoscopic sense.

The example illustrated in FIG. 2 is merely illustrative, and the configuration of the display device 20 is not limited in particular as long as it is possible to observe a different disparity image at the position of a different viewpoint. To give a specific example, the barrier 23 may be installed in front of the display panel 25.

3. DISADVANTAGES

Figure 3:
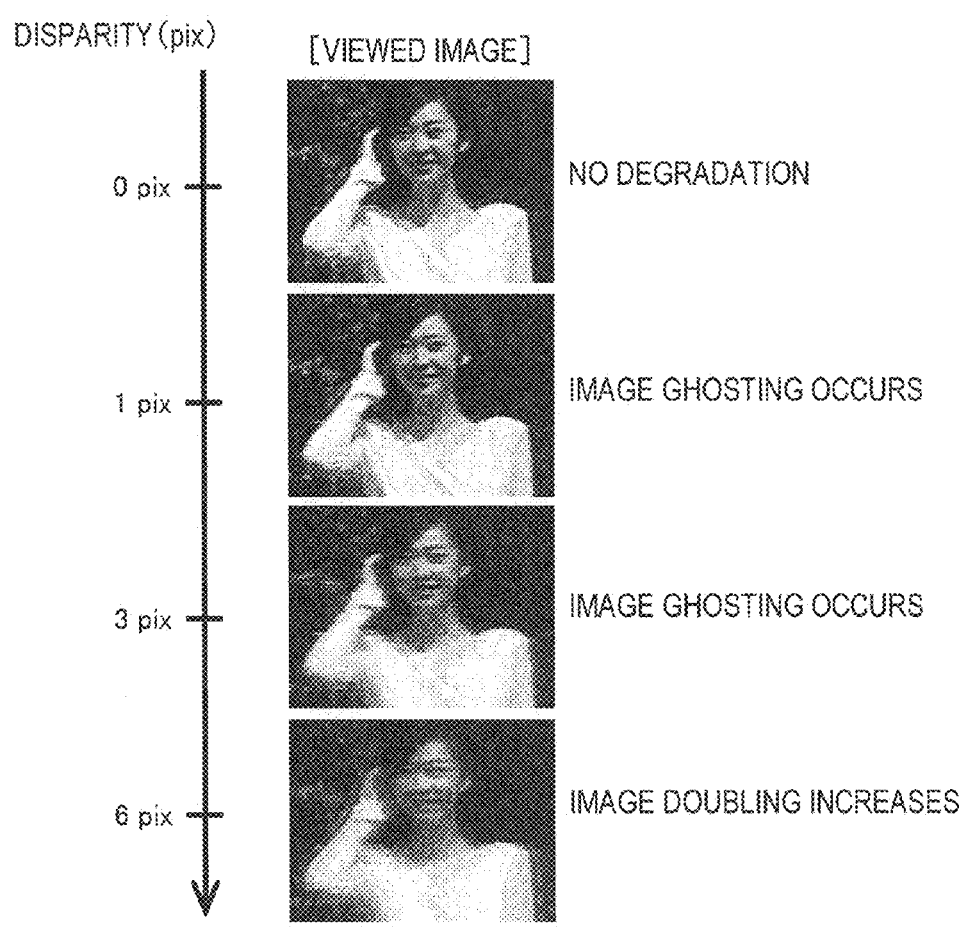
FIG. 3 is a schematic diagram illustrating an example in which a viewed image experiences image ghosting and image doubling because of crosstalk.

Stereoscopic display devices (such as the display device 20) that display viewpoint images of two or more viewpoints sometimes suffer from a phenomenon in which light leaks into each viewpoint image from the adjacent viewpoint image because of the optical characteristics of the displays, the phenomenon being referred to as crosstalk. Once crosstalk occurs, the crosstalk may cause stereoscopic display images for both of right and left eyes to be distorted like image ghosting and image doubling, and this will considerably degrade the image quality. For example, FIG. 3 is a schematic view illustrating an example in which a viewed image experiences image ghosting and image doubling because of crosstalk. As illustrated in FIG. 3, crosstalk causes image ghosting and image doubling in an image, and larger disparity causes more image ghosting and image doubling. That is to say, image quality is traded off for disparity, which means that if image quality is maintained at a given level, a range of disparity which can be displayed is limited.

Figure 4:
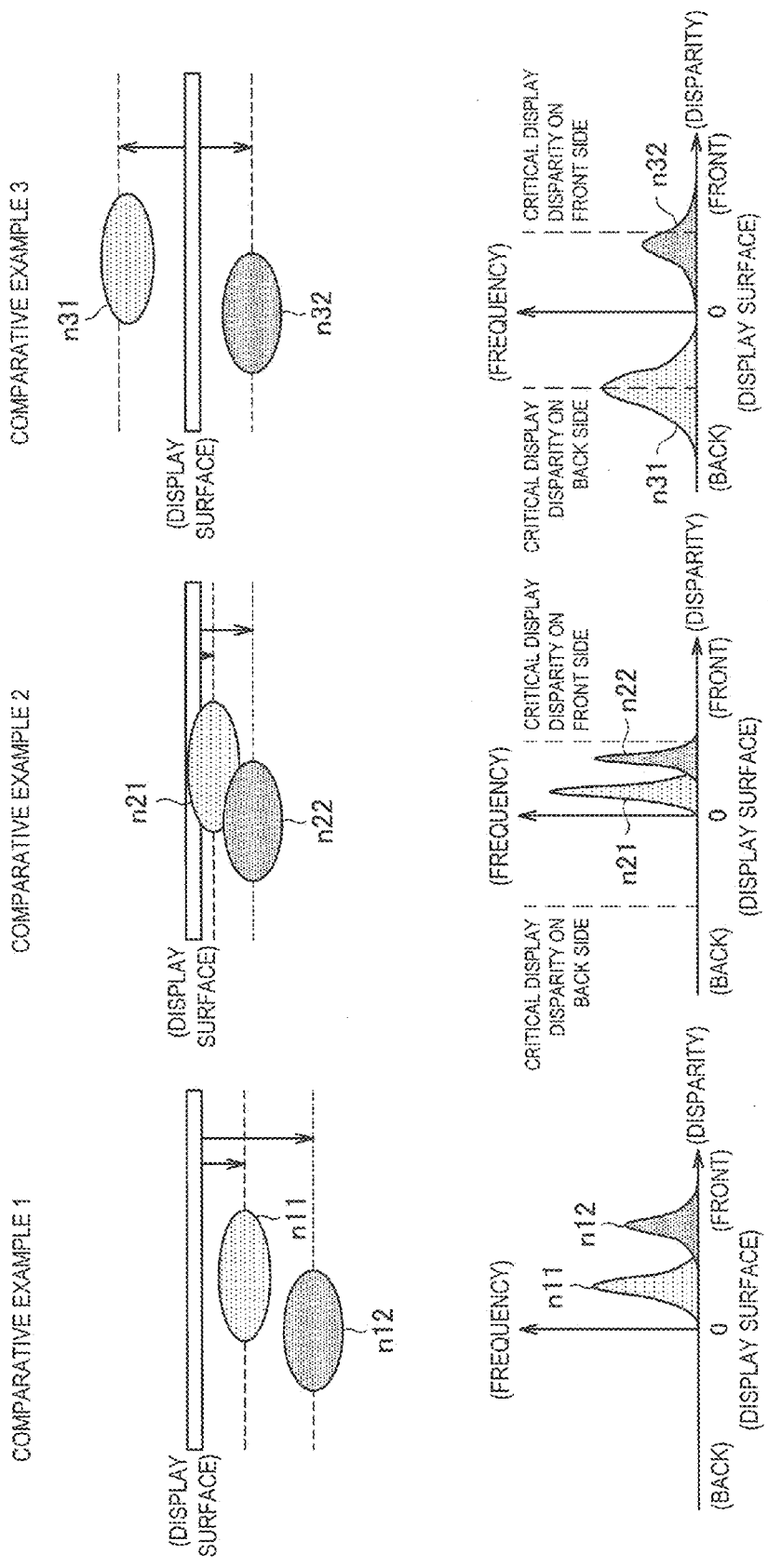
FIG. 4 is a diagram for describing an example of disparity control exerted by a stereoscopic display device that displays a viewpoint image of two or more viewpoints.

Disparity can be set for both of a front side and a back side of the display surface of a display in the depth direction, and yet the distribution of disparity may also be deviated to one of the front side and the back side of the display surface in the depth direction. For example, FIG. 4 is a diagram for describing an example of disparity control exerted by a stereoscopic display device that displays a viewpoint image of two or more viewpoints. A comparative example 1 in FIG. 4 illustrates an example in which the distribution of disparity is deviated to one side (front side) of a display surface in the depth direction. That is to say, the example in the comparative example 1 illustrates that images n11 and n12 arranged at different positions in the depth direction are each deviated to a front side of the display surface.

A comparative example 2 illustrates an example in which the disparity (which will also be referred to as "critical display disparity") on a front side and a back side in the depth direction is calculated in which the influence of crosstalk may be observed, and then the disparity of the images n11 and n12 in the comparative example 1 is limited to the range of the critical display disparity.

A technique illustrated in the comparative example 2 estimates, from the characteristics of a display and the features of an image, a maximum disparity amount in which no image ghosting or no image doubling has not yet occurred, and calculates, on the basis of the estimation results, a critical disparity (which will also be referred to as "critical display disparity") in which the influence of crosstalk is not observed on a front side or a back side in the depth direction. The technique illustrated in FIG. 2 then multiplies disparity values of the images n11 and n12 in the comparative example 1 by a gain, thereby limiting the converted disparity values of the images n21 and n22 to the range of the calculated critical display disparity. Accordingly, the images n21 and n22 concentrate on the front side, and the disparity range on the back side is not effectively used (i.e. the display performance is not sufficiently used). As a result, a stereoscopic sense may be limited.

A comparative example 3 illustrates an example in which the images n11 and n12 in the comparative example 1 are rearranged at positions denoted with reference numerals n31 and n32 in a manner that both of the disparity ranges on the front side and the back side of the display surface are used. Additionally, a process of rearranging each image in the depth direction may also be referred to as "change in a disparity layout" below.

As illustrated in the comparative example 3, a change in the disparity layouts of the images n11 and n12 in the comparative example 1 leads to the use of both of the disparity ranges on a front side and a back side, allowing a stereoscopic sense to be emphasized more than in the examples in the comparative examples 1 and 2. Meanwhile, it is difficult in the example in the comparative example 3 to accurately estimate a range of each of the images n31 and n32 within which disparity occurs, so that crosstalk may occur out of the range of the critical display disparity and the distortion of an image may stand out like image ghosting and image doubling.

For this, a method for effectively using the range of the critical display disparity is conceivable by combining the techniques illustrated in the comparative examples 2 and 3. A simple combination of the techniques illustrated in the comparative examples 2 and 3 alone does not, however, lead to effective use of the range of the critical display disparity.

Specific examples may include a method for enlarging the range of disparity by changing a disparity layout on the basis of the technique in the comparative example 3, and then limiting the range of disparity on the basis of the technique in the comparative example 2. It is, however, difficult to tentatively decide maximum disparity amounts of a front side and a back side when disparity layouts are changed, a ratio of the disparity ranges between the front side and the back side of the surface display is not necessarily constant. One of the front side and the back side that has a smaller ratio may have a smaller disparity than the maximum disparity, resulting in ineffective use of the disparity range.

Other examples may include a method for restricting the range of disparity on the basis of the technique in the comparative example 2, and then enlarging the range of disparity by changing a disparity layout on the basis of the technique in the comparative example 3. In this case, it is certainly possible to tentatively decide (calculate) maximum disparity amounts of the disparity ranges on the front side and the back side, and yet an object that is likely to experience image ghosting and image doubling is not necessarily positioned on the foremost side or the innermost side but image ghosting and image doubling may occur in an intermediate layer within the disparity range.

Accordingly, it is desirable for the image processing device 10 according to the present embodiment to prevent image quality from degrading like image ghosting and image doubling, and to effectively use a disparity range to allow a stereoscopic sense to be emphasized.

4. DESCRIPTION OF PRINCIPLES

Next, the description will be made for a principle of each process for the image processing device 10 according to the present embodiment to control disparity.

4.1. Model Formula of Crosstalk

Figure 5:
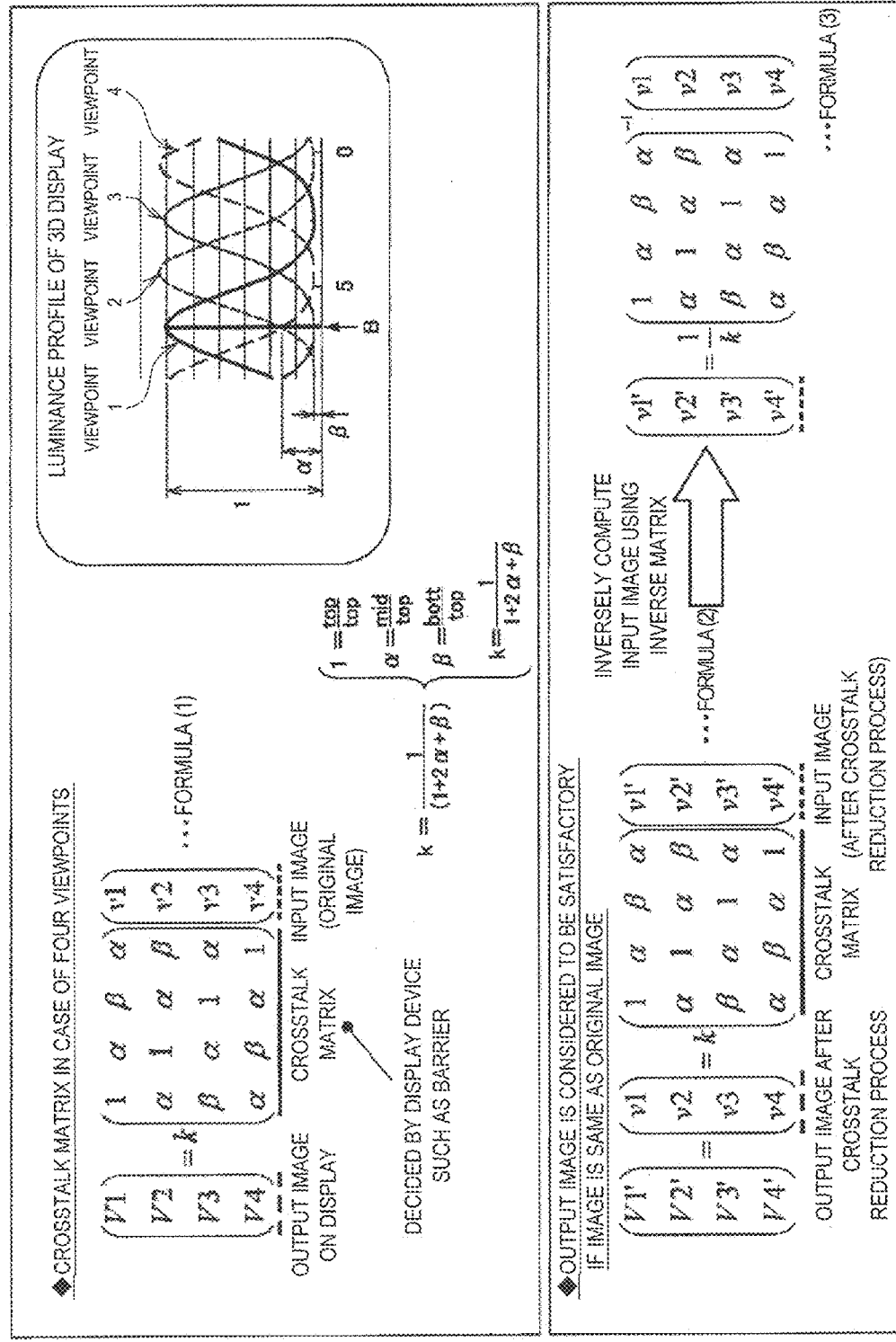
FIG. 5 is a schematic diagram illustrating a model formula of crosstalk.

First of all, a model formula of crosstalk according to the present embodiment will be described. In the present embodiment, taking into consideration a correlation between an image feature and an image having image ghosting and an image having image doubling (which will be referred to as image ghosting and doubling) caused by crosstalk, disparity control under which the disparity display performance of a display is exhibited to the maximum is exerted. A correlation of image ghosting and doubling caused by crosstalk and an image feature is derived from a model formula of crosstalk illustrated in FIG. 5.

In order to describe the gist of the present embodiment, first of all, a perception degradation model of image ghosting and doubling will be described. In general, the degradation of image quality can be objectively evaluated using a difference value between a reference image F which serves as a reference of evaluation and an evaluation image G which is a target of the evaluation. If the definition is applied to the occurrence of image ghosting and doubling in a stereoscopic display device, the reference image F is an original image (an image that is originally desired to be displayed) and the evaluation image G is an image that is actually viewed when disparity is applied. A difference value between the evaluation image G and the reference image F is an amount of degradation caused by crosstalk. This computation is performed using gradation values of an image, however, a relationship between gradation values of an image and physical luminance of a pixel is clarified as a γ characteristic. That is to say, an amount of degradation caused by crosstalk is defined as a physical amount (luminance). A computation method using gradation values of an image will be shown below.

Figure 6:
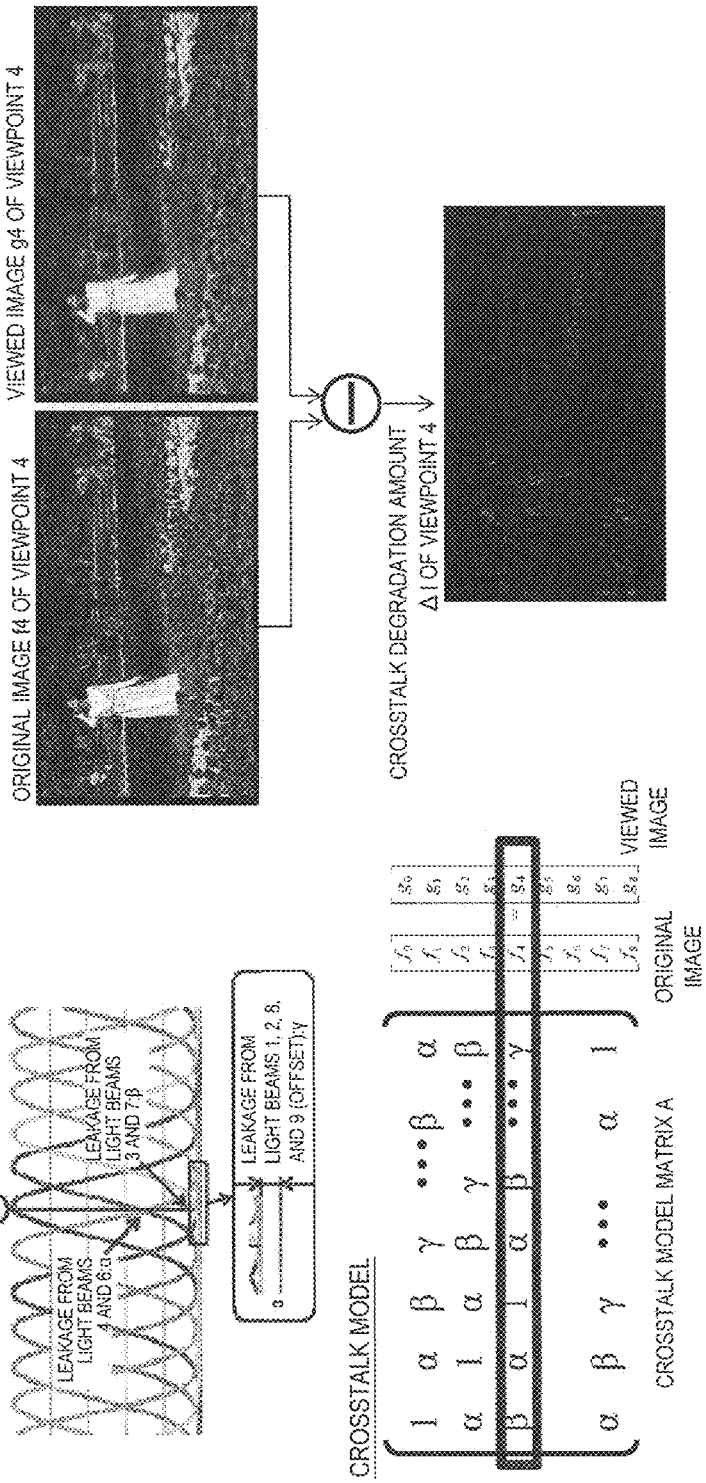
FIG. 6 is a schematic diagram illustrating a method for computing an amount of degradation caused by crosstalk.

FIG. 6 is a schematic diagram illustrating a method of computing a degradation amount using a crosstalk model formula. First of all, using a crosstalk model, a viewed image G is computed from an original image F. The crosstalk model can be obtained from a luminance profile of a display. When, for example, eyes are at the position at which a viewpoint 5 is viewed as illustrated in FIG. 6, the image of the viewpoint 5 is dominantly viewed and intensity thereof is set to 1. At this time, the viewpoints 4 and 6 adjacent to the aforementioned viewpoint is viewed to the extent of α, the second adjacent viewpoints 3 and 7 are viewed to the extent of β, and viewpoints separated further therefrom are viewed to the extent of γ. Even in the cases in which the eyes are at positions other than the viewpoint 5, a relationship of 1, α, β, and γ can be obtained. An expression in which a relationship of the original image F and the viewed image G is defined as a matrix based on this relationship is a crosstalk model matrix. As illustrated in FIG. 6, the crosstalk model matrix is defined as a diagonal matrix having elements of 1, α, β, and γ. When the crosstalk model matrix is integrated with the reference image F (original image), the viewed image G can be generated. The crosstalk model matrix has a characteristic as a low-pass filter that causes image ghosting and doubling in an image.

Next, a difference value between the viewed image G (evaluation image) and the reference image F (original image), i.e. a crosstalk degradation amount ΔI, is obtained. In the figure in the lower right part of FIG. 6, a difference between the viewed image G (evaluation image) and the reference image F (original image) is obtained with respect to the viewpoint 4, and then the crosstalk degradation amount ΔI is obtained. The crosstalk degradation amount ΔI is expressed with luminance, and in the figure in the lower right part of FIG. 6, an area having higher luminance has a larger crosstalk degradation amount ΔI. If the iterative computation is repeated by changing the disparity, a disparity transition of the crosstalk degradation amount ΔI can be obtained as image data.

Figure 7:
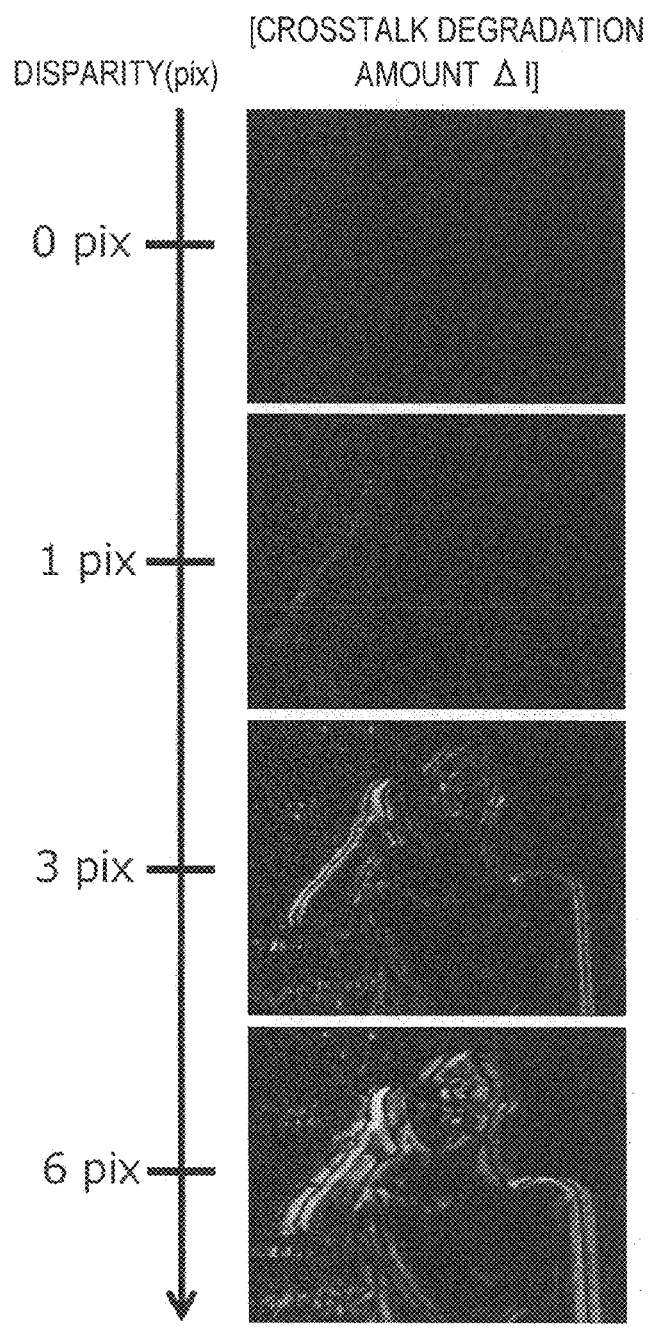
FIG. 7 is a schematic diagram illustrating disparity dependency of a crosstalk degradation amount $\Delta I$.

FIG. 7 is a schematic diagram illustrating disparity dependency of the crosstalk degradation amount ΔI. FIG. 7 illustrates a state in which disparity is set to have values sequentially increasing from 0 pixels (pix) to one pixel (pix), three pixels (pix), and six pixels (pix) and accordingly crosstalk of the viewed image G illustrated in FIG. 3 is degraded. For example, an image whose disparity has a value of 0 pixels is a two-dimensional image, and a position of a three-dimensional image to be displayed in the depth direction is away from a reference position (on a display plane) when the disparity has a value of 0 pixels or more. As illustrated in FIG. 7, when disparity increases, the crosstalk degradation amount ΔI tends to also increase. When the crosstalk degradation amount ΔI exceeds a predetermined threshold value, a person perceives image ghosting and doubling, and perceives image quality degrading.

In the present embodiment, using crosstalk of a device and an image feature, disparity in which the number of pixels at which generate image ghosting and doubling occur is kept equal to or less than a given number (such as 1% of the number of pixels of a whole image) is decided.

Next, a method for estimating a disparity transition of a crosstalk degradation amount ΔI through learning will be described as a specific implementation method.

4.2. Estimation of Disparity Transition of Crosstalk Degradation Amount ΔI Through Learning As described above, by repeating the iterative computation of FIG. 6 for each of pixels and thereby obtaining a crosstalk degradation amount ΔI for each of the pixels, disparity in which the number of pixels at which image ghosting and doubling occur is kept equal to or less than a given number (such as 1% of the number of pixels of a whole image) can be decided. When, however, a real-time moving image processing is implemented using the matrix expression illustrated in FIG. 6, the computation of the matrix has to be repeated until a crosstalk degradation amount ΔI exceeds the above-described threshold for the perception of image ghosting and doubling, and accordingly a calculation amount increases. Thus, in an embodiment of present disclosure, by using contrast/spatial frequency dependency of the crosstalk degradation amount ΔI in addition to the disparity dependency of the crosstalk degradation amount ΔI, a framework for estimating a disparity transition of the crosstalk degradation amount ΔI is constructed.

Figure 8:
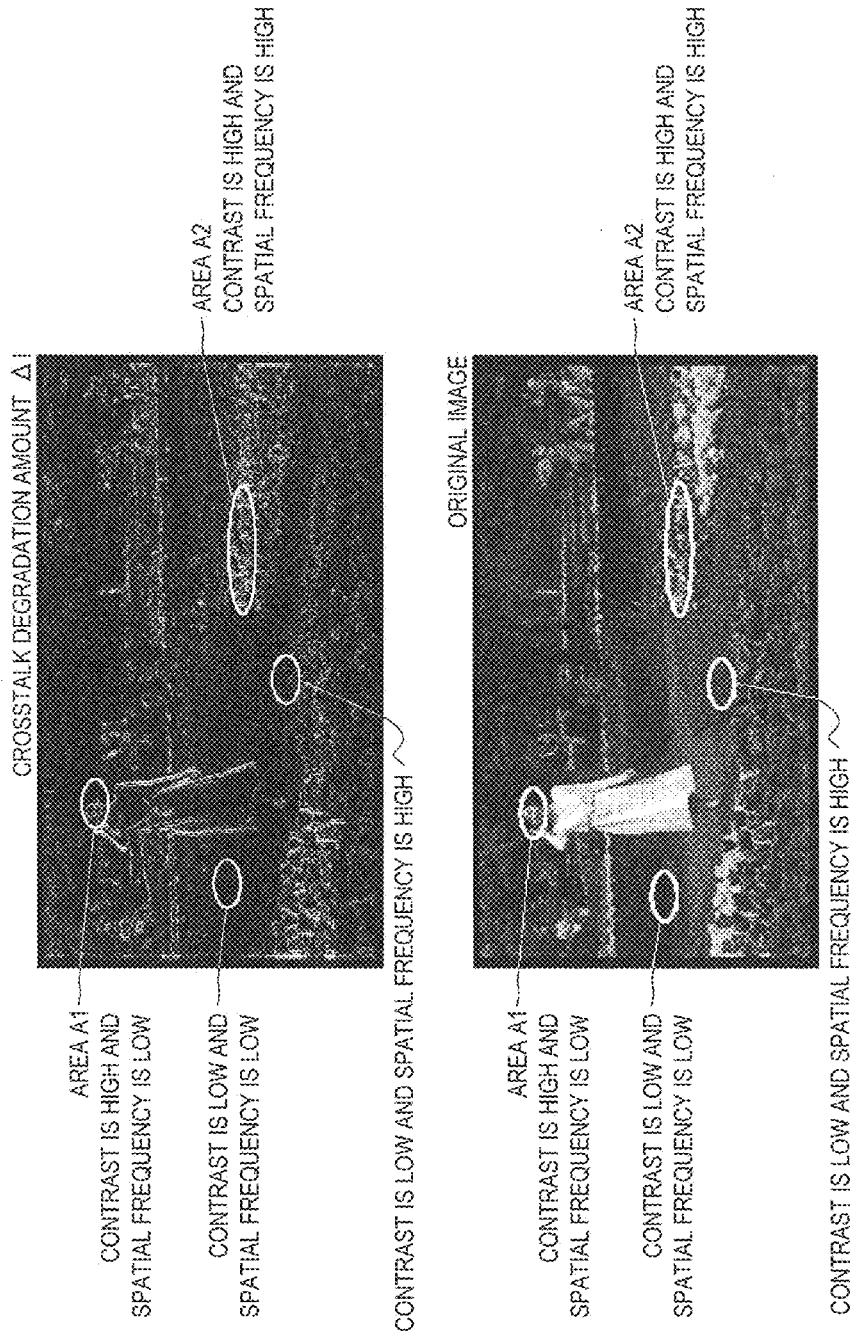
FIG. 8 is a schematic diagram illustrating contrast/spatial frequency dependency of the crosstalk degradation amount $\Delta I$.

FIG. 8 is a schematic diagram illustrating contrast/spatial frequency dependency of a crosstalk degradation amount ΔI. FIG. 8 illustrates a crosstalk degradation amount when disparity of a multi-viewpoint image is uniformly applied as in FIG. 7, illustrating that a disparity of five pixels (pix) is applied to the whole screen as an example. Here, the figure in the upper part of FIG. 8 illustrates a crosstalk degradation amount ΔI that is obtained from a difference between a viewed image G (evaluation image) and a reference image F (original image) using the method illustrated in FIG. 4. In addition, the figure in the lower part of FIG. 8 illustrates the reference image F (original image). As in FIG. 6, the white portions in the image in the upper part illustrating the crosstalk degradation amount ΔI indicate portions having large crosstalk degradation amounts.

As illustrated in FIG. 8, a crosstalk degradation amount ΔI sharply increases as contrast becomes higher and a spatial frequency becomes higher. For example, when crosstalk degradation amounts ΔI of the face of a person (area A1) in the left part of FIG. 8 and the stems of flowers (area A2) in the right part are compared to each other, the area A2 around the stems of the flowers is whiter than the area A1 around the face in the figure in the upper part of FIG. 8, and thus the crosstalk degradation amount ΔI thereof is large. Meanwhile, in the original image, when the contrast/spatial frequencies of the areas A1 and A2 are compared, both of the face of the person (area A1) and the stems of the flowers (area A2) have the same degree of contrast (dynamic range of a regional gradation change), but the face of the person has a low spatial frequency (wide gap of spatial changes in gradation) and the stems of the flowers have a high spatial frequency (narrow gap of spatial changes in gradation). In addition, areas with low contrast generally have small crosstalk degradation amounts ΔI, but the crosstalk degradation amounts ΔI vary according to spatial frequencies even if contrast is the same. As such, the crosstalk degradation amount ΔI tends to increasingly change as disparity increases, and the characteristic of the change has dependency on contrast/spatial frequency. Thus, the dependency of the crosstalk degradation amount ΔI on disparity/contrast/spatial frequency can be expressed using the following formula.

$$\Delta I(C_{sf}, \text{disp}) = \Sigma_{i=0}^{N-1}(s_i(\text{disp}) \times C_i) + N(\sigma),$$

$$C_{sf} = (C_0, C_1, \ldots, C_{N-1}) \qquad \text{(formula 1)}$$

Here, $C_{sf}$ represents a contrast vector which is decomposed into N vectors for each spatial frequency, Ci represents contrast of a spatial frequency i, $s_i$ represents a coefficient which indicates a degree of influence of certain disparity on the degradation of the contrast Ci, disp represents disparity, and $N(\sigma)$ represents a residual. Furthermore, the first term of the formula 1 can be expressed as follows.

$$\Delta I(C_{sf}, \text{disp}) = \widehat{\Delta I}(C_{sf}, \text{disp}) + N(\sigma), \quad \text{(formula 2)}$$

When $C_{sf}$ indicating contrast/spatial frequency of the formula 2 is considered to be fixed, the first term (which is referred to as ΔI hat) on the right side can be interpreted as a statistical value of a disparity transition of the crosstalk degradation amount ΔI of $C_{sf}$. Using this feature, a disparity transition graph of the crosstalk degradation amount ΔI is learned in advance offline, and a learning result thereof is applied to real-time image processing.

Figure 9:
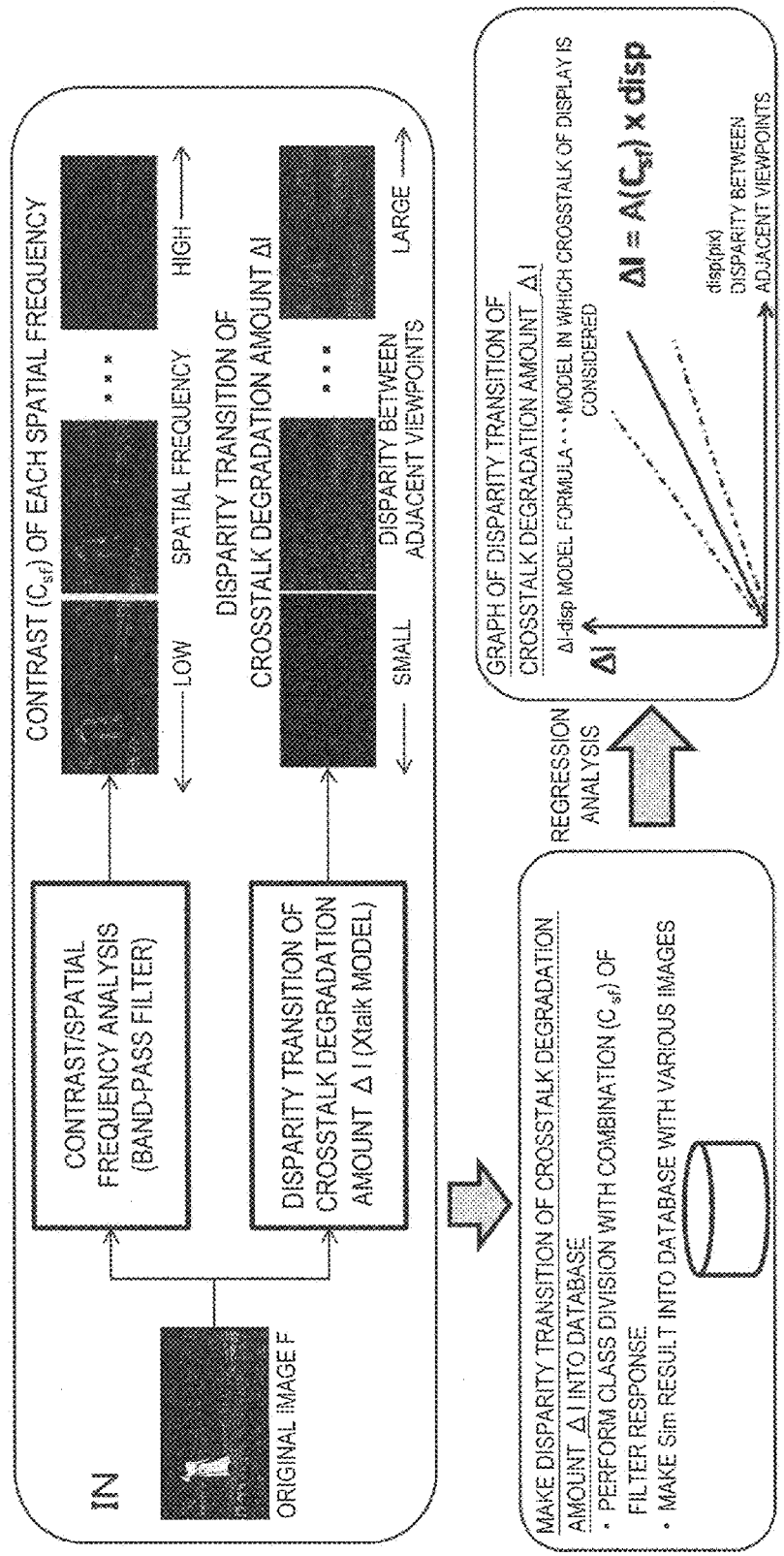
FIG. 9 is a schematic diagram illustrating an example of a learning method for a disparity transition graph of the crosstalk degradation amount $\Delta I$.

FIG. 9 is a schematic diagram illustrating an example of a learning method of the disparity transition graph of the crosstalk degradation amount ΔI. Here, the learning method will be described by dividing the method into four steps. In a first step of learning, the contrast/spatial frequency of an original image F are analyzed. Specifically, using N band-pass image filters, the original image F is decomposed into contrast maps of N spatial frequencies. Here, as a band-pass filter, for example, an existing band-pass image filter such as a Gabor filter and an LOG filter can be used. Frequency components are hereby decomposed into N in number for each spatial frequency as outputs of the N filters, and a contrast vector $C_{sf}=(C_0, C_1, \ldots, C_{N-1})$ which indicates a relationship of contrast-spatial frequency is obtained for each pixel. Each component (element) of the contrast vector $C_{sf}$ indicates contrast of each spatial frequency.

As a second step, a map of the crosstalk degradation amount ΔI is generated with various types of disparity. Specifically, multi-viewpoint images are generated while changing disparity amounts (deviation amounts of pixels) of viewpoint images, and a crosstalk degradation amount ΔI is obtained for each disparity using a crosstalk model. In this step, a map of the crosstalk degradation amount ΔI is computed for each image based on various types of disparity. That is to say, sample data for computing the statistical value ΔI hat of the formula 2 is computed. The crosstalk model of FIG. 6 is used only for creating the sample data.

As a third step, disparity transitions of the crosstalk degradation amounts ΔI are made into a database. Specifically, using the dependency of the crosstalk degradation amount ΔI on contrast/spatial frequency, an image is divided into classes for each $C_{sf}$ indicating contrast/spatial frequency, and disparity transition data of the crosstalk degradation amounts ΔI is retained in each class.

As an example, comparison of the crosstalk degradation amounts ΔI of the face of the person (area A1) in the left part and the stems of the flowers (area A2) in the right part described in FIG. 8 will be described. As described above, the face of the person (area A1) in the left part and the stems of the flowers (area A2) in the right part of FIG. 8 have the same degree of contrast, but have different distribution of spatial frequencies. Regarding the distribution of spatial frequencies, a spatial frequency of the face of the person is present dominantly in a low band, and a spatial frequency of the stems of the flowers is present dominantly in a high band.

Figure 10:
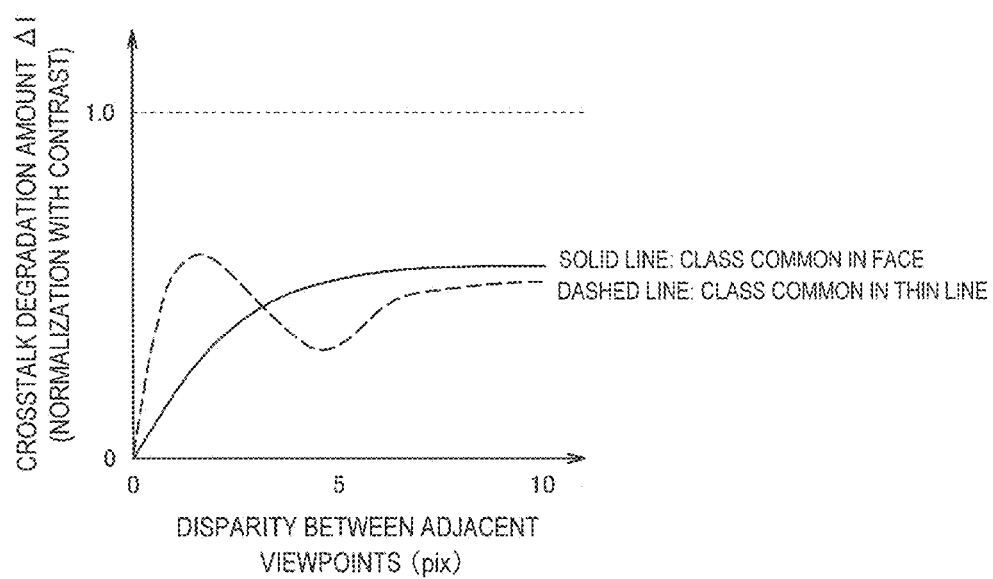
FIG. 10 is a characteristic diagram illustrating an analysis result of learning data (average of sample data for each class)

Based on FIG. 10, the first to the third steps described above will be described in detail. FIG. 10 is a characteristic diagram illustrating a result of analysis of learning data (average of sample data of each class). FIG. 10 illustrates an example in which the number of filters is set to N=4, and responses of band-pass filters are normalized with contrast of a dominant spatial frequency set to 1 for comparison at the same contrast, and class division is performed according to ratios of the responses of the filters.

In the example illustrated in FIG. 10, contrast vectors $C_{sf}=(C_0, C_1, C_2, C_3)=(\text{r1cpd, r2cpd, r4cpd, r8cpd})$ whose components are decomposed for each of spatial frequencies by four filters are obtained (first step). FIG. 10 illustrates contrast vectors corresponding to classes common in an image of the face of a person (area A1) and classes common in an image with a thin line such as the stems of flowers (area A2) according to the components of the obtained contrast vectors. As described above, a spatial frequency of the face of a person is present dominantly in a low band, and a spatial frequency of the stems of flowers is present dominantly in a high band. Thus, with regard to the contrast vectors classified into the classes common in an image of the face of a person, components corresponding to low spatial frequency bands are larger than components corresponding to high spatial frequency bands. In addition, with regard to the contrast vectors classified into the classes common in an image with a thin line such as the stems of flowers, components corresponding to high spatial frequency bands are larger than components corresponding to low spatial frequency bands.

Thus, an image can be divided into classes on the basis of components of contrast vectors. By performing a filtering process on an image, it is possible to determine whether the image is an image that belongs to, for example, a class of the image of the face of a person (area A1), a class of the image of the stems of flowers (area A2), or another class.

With regard to the contrast vectors corresponding to the classes common in the image of the face of a person (area A1) and the classes common in the image with a thin line such as the stems of flowers (area A2), multi-viewpoint images are generated while changing disparity amounts (deviation amounts of pixels) of viewpoint images, and a crosstalk degradation amount ΔI is obtained for each disparity using a crosstalk model (second step) as illustrated in FIG. 10. Accordingly, a disparity transition graph of the crosstalk degradation amounts ΔI resulting from differences of spatial frequencies is created for each of the classes (indicated in a solid line in FIG. 10) common in the image of the face of a person (area A1) and the classes (indicated in the dashed line in FIG. 10) common in the image with a thin line such as the stems of flowers (area A2) as illustrated in FIG. 10. When the two disparity transition graphs are compared to each other, it can be ascertained as a result that, while the disparity transition of the crosstalk degradation amount ΔI tends to gently increase in the classes of contrast/spatial frequency distributed highly in the face of a person (area A1) in the left part, the disparity transition of the crosstalk degradation amount ΔI tends to sharply increase in the classes of contrast/spatial frequency distributed highly in the stems of flowers (area A2) in the right part. This coincides with the qualitative analysis described in FIG. 8.

Next, as a fourth step, using the least-square method, a regression analysis is carried out on the disparity transition data of the crosstalk degradation amount ΔI of each class obtained in the third step, and the disparity transition of the crosstalk degradation amount ΔI is made into a function. Through the regression analysis, the crosstalk degradation amount ΔI can be calculated as a function of disparity/contrast/spatial frequency, i.e. ΔI hat. In this step, for compression of information, the crosstalk degradation amount ΔI is made into a function having disparity/contrast/spatial frequency as arguments. In the example of FIG. 10, regarding the classes of contrast/spatial frequency distributed highly in the face of a person (area A1) in the left part, a function in which the crosstalk degradation amount ΔI (longitudinal axis) gently increases (indicated in a solid line of FIG. 10) if compared with the amount of an increase of disparity (transverse axis) is obtained. In addition, regarding the classes of contrast/spatial frequency distributed highly in the stems of flowers (area A2) in the right part, a function in which the crosstalk degradation amount ΔI (longitudinal axis) sharply increases (indicated in a dashed line of FIG. 10) if compared with the amount of an increase of disparity (transverse axis) is obtained. Accordingly, the crosstalk degradation amount ΔI can be expressed as the following formula.

$$\Delta I = A(C_{sf}) \times \text{disp}$$

If a table having a sufficient amount of data can be retained, the average of the crosstalk degradation amounts ΔI can be computed for each class, and retained as a table of data rather than as a function. In addition, to make a function, method of having a linear or non-linear type, or retaining a polygonal line, a domain, and a codomain may be applied.

The graph illustrated in the lower right part of FIG. 9 indicates a graph obtained in the fourth step. Additionally, FIG. 9 illustrates an example in which a relationship of the crosstalk degradation amount ΔI and disparity is made into a linear function. In the example illustrated in FIG. 9, the slope of a characteristic indicating a relationship of the crosstalk degradation amount ΔI and disparity changes according to the type of image. As described above, the classes distributed highly in the face of a person (area A1) form a characteristic C1 having a gentle slope, and the classes distributed highly in the stems of flowers (area A2) form a characteristic C2 having a steep slope. Through the four steps above, ΔI hat indicated in the formula 2 can be computed through learning.

As such, ΔI hat obtained through leaning is constructed as a database (such as a function and a table) which defines a relationship between disparity and the crosstalk degradation amount ΔI for each contrast vector $C_{sf}$.

Figure 11:
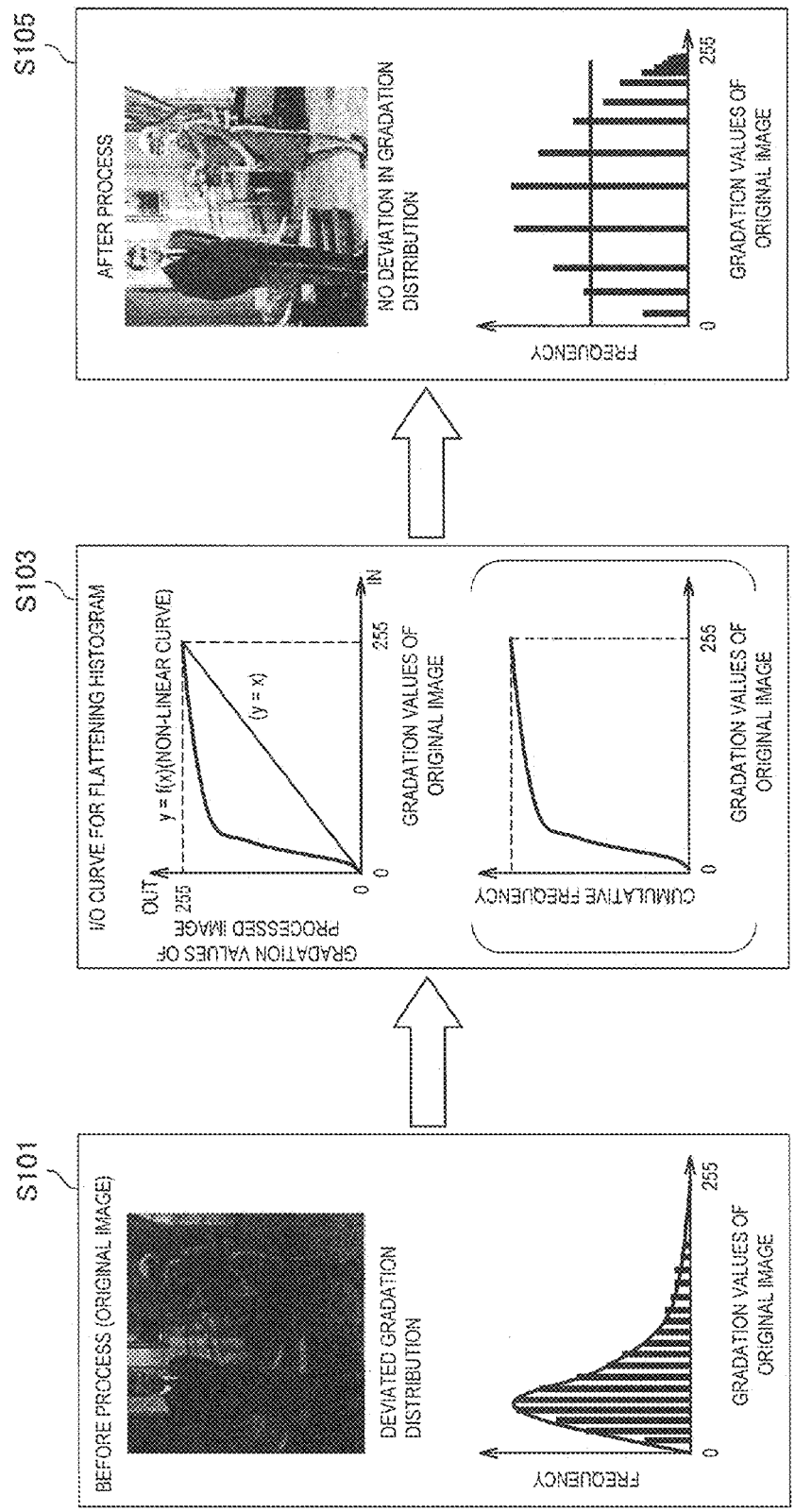
FIG. 11 is an explanatory diagram for describing flattening of a histogram.

4.3. Flattening of Histogram and Application to Conversion of Disparity Layout Next, a technique of converting a disparity layout (which will also be referred to as "disparity enlargement technique" below) will be described. A histogram indicating the disparity distribution of an original image is flattened in an embodiment of the present disclosure to generate an I/O curve (conversion table in other words) indicating a relationship between an input disparity (before conversion) and an output disparity (after conversion), and the disparity layout is converted on the basis of the I/O curve. First of all, the conversion of contrast will be used as an example to describe flattening of a histogram with reference to FIG. 11.

A reference numeral S101 illustrates an original image in which the contrast has not yet been converted, and a histogram representing the distribution of gradation values of the original image. As illustrated in the histogram of the original image before conversion, the gradation values of the original image before conversion are deviated to a side of "0" (i.e. dark side), and it is understood that the original image is generally dark and has low contrast.

A reference numeral S103 illustrates an example of an I/O curve for flattening a histogram in which gradation values are deviated to a side of "0" as illustrated in the reference numeral S101. The transverse axis (x axis) indicates the gradation values of an original image (i.e. before conversion), and the longitudinal axis (y axis) indicates the gradation values of the processed image (i.e. after conversion) in the I/O curve illustrated in the upper part of the reference numeral S103. As illustrated in the reference numeral S103, the I/O curve is represented by a nonlinear curve y=f(x) in which low gradation values before conversion are converted into high gradation values. If y=x, the gradation values are not changed before and after conversion. That is to say, it is indicated that no conversion is carried out.

The I/O curve illustrated in the upper part of the reference numeral S103 is generated, for example, on the basis of the histogram illustrated in the reference numeral S101. Specifically, the frequencies of the gradation values indicated by the histogram are scanned and integrated from a side of "0" to a side of "255," thereby generating a graph indicating a relationship between gradation values (transverse axis) and cumulative frequencies (longitudinal axis) of the gradation values as illustrated in the lower part of the reference numeral S103. The cumulative frequencies (i.e. longitudinal axis) of the gradation values in the generated graph are normalized into gradation values of "0" to "255," thereby generating the I/O curve illustrated in the upper part.

A reference numeral S105 illustrates a histogram representing an original image after conversion and the distribution of gradation values of the original image resulting from the conversion of the gradation values of the original image illustrated in the reference numeral S101 based on the I/O curve illustrated in the reference numeral S103. A comparison of the histograms between the original images before and after conversion shows that gradation values deviated to a side of "0" (i.e. dark side) before conversion are converted and evenly distributed after conversion. Along with the even distribution, the deviation of gradation values decreases and higher contrast is obtained in the original image after conversion.

As described above, flattening of a histogram of gradation values in an original image before and after conversion allows the contrast of the original image to be corrected.

The image processing device 10 according to an embodiment of the present disclosure applies the above-described process of flattening a histogram to a histogram indicating the disparity distribution of an original image to convert a disparity layout in a manner that the disparity is more emphasized. The overview of a process of converting a disparity layout to be performed by the image processing device 10 according to an embodiment of the present disclosure will be described below with reference to FIG. 12.

As illustrated in FIG. 12, the image processing device 10 according to an embodiment of the present disclosure uses a histogram indicating the disparity distribution of an original image as an input to generate an I/O curve for converting a disparity layout chiefly in four phases, the I/O curve indicating a relationship between an input disparity (before conversion) and an output disparity (after conversion).

First of all, the image processing device 10 calculates a dynamic range of disparity between an image for a left eye and an image for a right eye (which will also be referred to as "LR disparity" below) on the basis of a histogram indicating the distribution of the LR disparity in a phase 1. Additionally, a histogram of LR disparity may be generated, for example, on the basis of the disparity map corresponding to an original image. A disparity map indicates the distribution of disparity values (i.e. values indicating which positions in the depth direction) of pixels in an original image. The histograms illustrated in FIG. 12 each indicate that the transverse axis (x axis) indicates a position in the depth direction using the position of the display surface of a display as "0" and the longitudinal axis (y axis) indicates a frequency. Additionally, let us assume below that a front side is a "+ side" and a back side is a "− side" for a disparity value in the depth direction.

The image processing device 10 then weights the disparity distribution in accordance with the positions in the depth direction in a phase 2, and converts the disparity distribution on the basis of the weight. For example, the image processing device 10 divides the disparity range into areas cf0 to cf7 in the example illustrated in FIG. 12, and carries out conversion in a manner that an area positioned nearer to a back side (− side) has a smaller disparity distribution. The image processing device 10 removes an unhatched part in the histogram in the example illustrated in FIG. 12, and converts the histogram in a manner that an area positioned nearer to a back side (− side) has a smaller disparity distribution. This makes the disparity distribution on a front side (+ side) relatively larger than the disparity distribution on a back side (− side) in the example illustrated in FIG. 12.

After converting the disparity distribution, the image processing device 10 converts the disparity range in a phase 3. For example, the image processing device 10 converts the disparity range of the histogram by multiplying the disparity range of the histogram by a gain in the example illustrated in FIG. 12 in a manner that the disparity distribution deviated toward a front side (+ side) falls within a range of ±5 [pix], within which little image ghosting and image doubling occur.

The image processing device 10 generates a histogram of the disparity distribution before and after conversion as described above. The image processing device 10 scans and integrates the frequencies of the disparity values indicated in the histogram before and after conversion from the innermost side to a front side in the depth direction as illustrated in a phase 4, thereby generating a graph indicating a relationship between the disparity values and the cumulative frequencies of the disparity values. The image processing device 10 then normalizes the cumulative frequencies of the disparity values in the generated graph into disparity values within an allowable disparity range (e.g. disparity values within a range of ±5 [pix]), thereby generating an I/O curve for converting a disparity layout.

That is to say, the image processing device 10 generates an I/O curve in the example of FIG. 12 in a manner that a change in the disparity on a front side (i.e. foreground side) in the depth direction is emphasized within a dynamic range of disparity as indicated in a reference numeral g12. The image processing device 10 clips the I/O curve out of the dynamic range of disparity in the example illustrated in FIG. 12, thereby keeping the distribution of the disparity values after conversion within a range of ±5 [pix].

Figure 13:
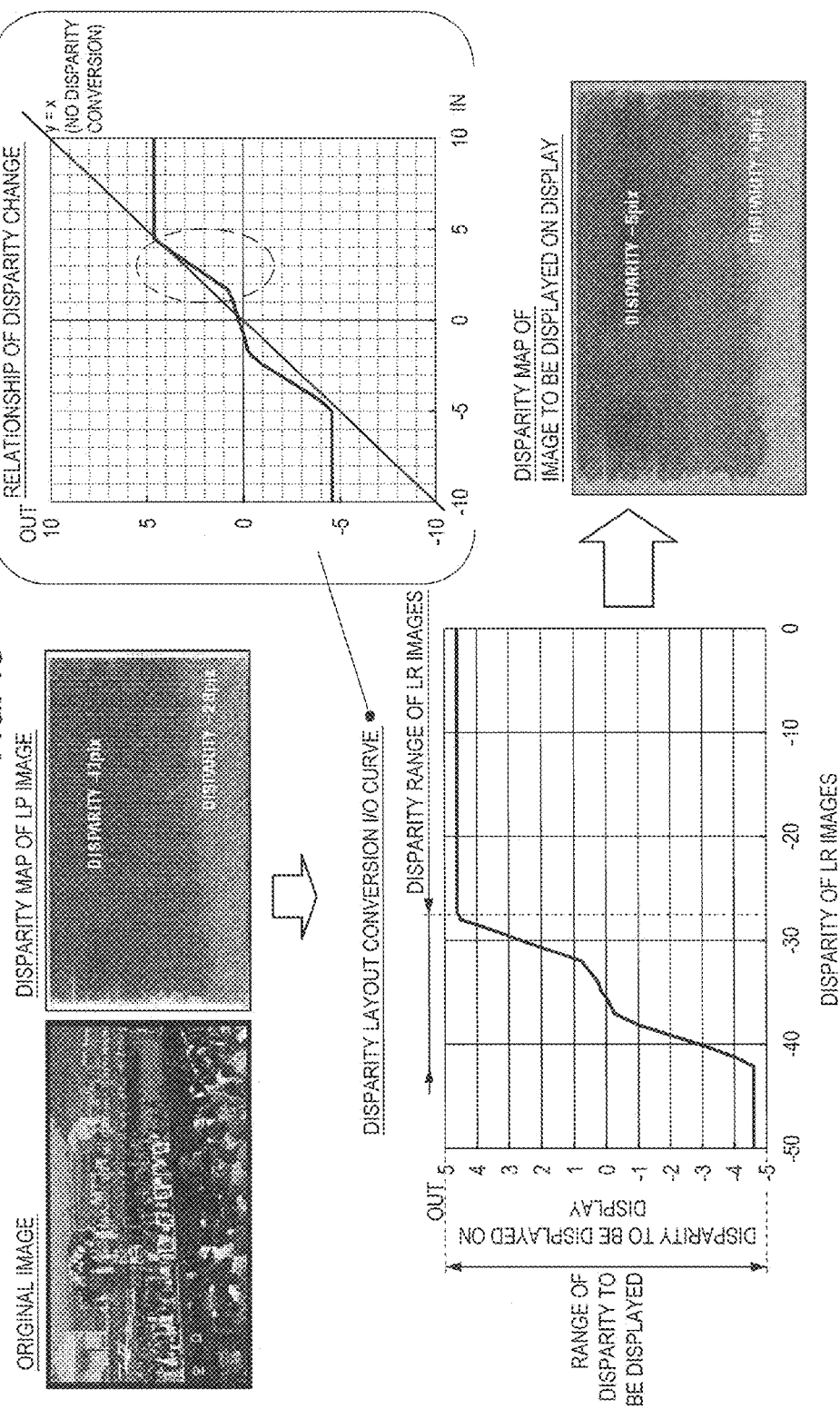
FIG. 13 illustrates an example of a process result of a process of converting a disparity layout.

FIG. 13 illustrates an example of a process result of the above-described process of converting a disparity layout. The disparity of an original image before conversion illustrated in FIG. 13 is distributed within a range of −43 [pix] to −28 [pix] as indicated in a disparity map of an LR image before conversion illustrated in the upper left part. The lower left part of the figure illustrates an I/O curve for converting a disparity layout generated on the basis of such an original image and a disparity map.

The transverse axis indicates the disparity of an LR image in the I/O curve in the lower left part of the figure, which namely means the disparity in a disparity map before conversion. Meanwhile, the longitudinal axis indicates the disparity displayed on a display, which namely means the disparity in a disparity map after conversion.

The disparity within a dynamic range of the disparity in the disparity map of the LR image before conversion, which namely means the disparity within a range of −43 [pix] to −28 [pix], is generated to converted into a range of ±5 [pix] in the example illustrated in the I/O curve in the lower left part.

The upper right part of the figure illustrates an I/O curve schematically indicating a relationship between the disparity changes. If, as indicated in a reference numeral g14 of the I/O curve in the upper right part of the figure, the I/O curve has been defined, a front side (i.e. foreground side in the depth direction is emphasized, emphasizing the front-to-back relationship and enhancing a stereoscopic sense. The I/O curve in the lower left of the figure also illustrates such a relationship between disparity changes within the range of the disparity range of the LR image.

The lower right part of FIG. 13 illustrates a disparity map converted as described above on the basis of the I/O curve illustrated in the lower left part. As indicated in the disparity map, a dynamic range of disparity falls within a range of ±5 in the disparity map after conversion. The contrast between areas indicating each disparity is enhanced in the disparity map, showing that the front-to-back relationship is emphasized.

The description has been made so far for the principles of the processes for the image processing device 10 according to the present embodiment to control disparity.

5. FIRST EMBODIMENT

Figure 14:
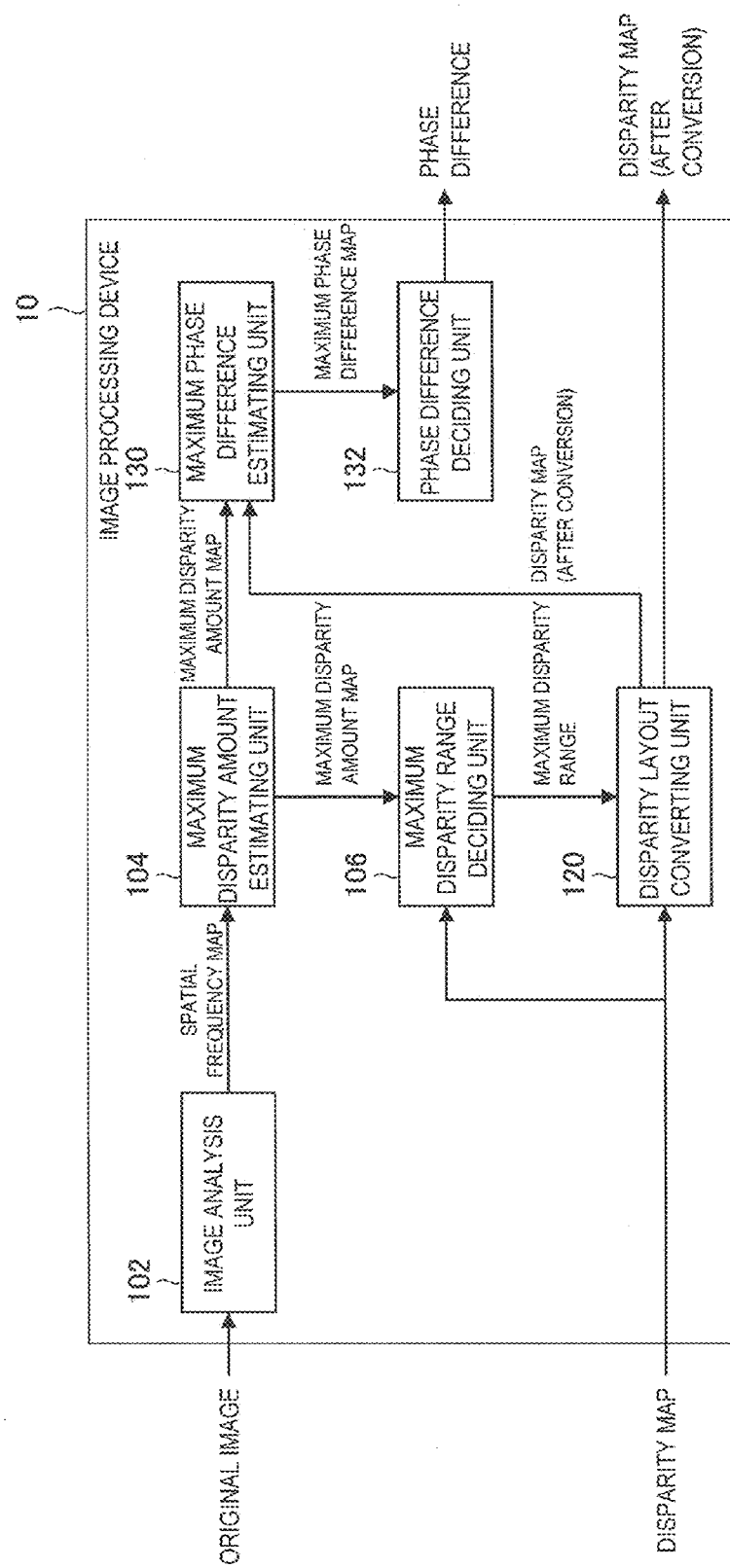
FIG. 14 is a block diagram illustrating an example of a functional configuration of an image processing device according to a first embodiment of the present disclosure.

Next, an image processing device 10 according to a first embodiment will be described with reference to FIG. 14. FIG. 14 is a block diagram illustrating an example of a functional configuration of the image processing device 10 according to the present embodiment.

As illustrated in FIG. 14, the image processing device 10 according to the present embodiment includes an image analysis unit 102, a maximum disparity amount estimating unit 104, a maximum disparity range deciding unit 106, a disparity layout converting unit 120, a maximum phase difference estimating unit 130, and a phase difference deciding unit 132.

Figure 15:
FIG. 15 is an example of an original image.

The image analysis unit 102 acquires an original image from the outside, the original image being a source for generating each viewpoint image that the display device 20 is caused to display. Additionally, as discussed above, the image analysis unit 102 may receive, via the antenna 30, an original image delivered as broadcasting, or may read out an original image recorded in an external medium from the external medium. For example, FIG. 15 illustrates an example of an original image to be acquired.

The image analysis unit 102 filters an original image v10 with N band-pass filters, and acquires, for each pixel, contrast vector $C_{sf}=(C_0, C_1, \ldots, C_{N-1})$ of each of N spatial frequencies. This filtering is applied in the same way as learning for the disparity transition graph of a crosstalk degradation amount ΔI. The image analysis unit 102 outputs information indicating the contrast vector $C_{sf}=(C0, C1, \ldots, C_{N-1})$ of each of N types of spatial frequency acquired for each pixel, which namely means the distribution (spatial frequency map) of the contrast of each of N types of spatial frequency, to the maximum disparity amount estimating unit 104.

The maximum disparity amount estimating unit 104 acquires, from the image analysis unit 102, the information indicating the distribution of the contrast of each of N types of spatial frequency. The maximum disparity amount estimating unit 104 makes a class separation on the basis of the contrast vector $C_{sf}=(C_0, C_1, \ldots, C_{N-1})$ of each of N types of spatial frequency, and acquires, for each pixel, a function or a table of a disparity transition of a crosstalk degradation amount ΔI in the corresponding class from learning data (database not illustrated).

The maximum disparity amount estimating unit 104 sets a threshold Th of perception of the crosstalk degradation amount ΔI for the acquired function or table of the disparity transition of the crosstalk degradation amount ΔI. Then, the maximum disparity amount estimating unit 104 calculates the number of pixels which correspond to disparity in which the crosstalk degradation amount ΔI reaches the threshold Th of perception for each pixel. Specifically, the maximum disparity amount estimating unit 104 inputs the threshold Th to the crosstalk degradation amount ΔI of the function or the table, searches for the inverse function for the function and corresponding disparity for the table, and obtains an amount of the corresponding disparity. Here, since the crosstalk degradation amount ΔI is expressed by luminance, the threshold Th of degradation perception is set by luminance that is optically measured.

Furthermore, in order to further reflect the perception characteristic of a human, the threshold Th of degradation perception can be adaptively decided for each pixel by taking into consideration a visual characteristic of a human (contrast sensitivity function (CSF), and a Just Noticeable Difference (JND)). Accordingly, the threshold Th can be set while differences of spatial frequencies are taken into consideration.

Figure 16:
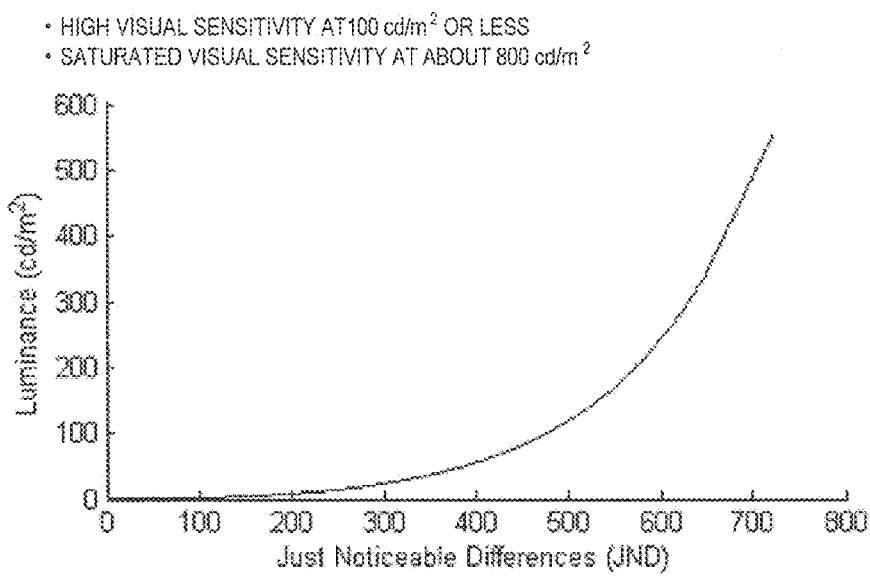
FIG. 16 is a characteristic diagram illustrating a relationship between a visual characteristic JND and luminance.

FIG. 16 is a characteristic diagram illustrating a relationship between a visual characteristic JND and luminance. As illustrated in FIG. 16, it is known that a human does not perceive a luminance change in the same way as a physical amount, but perceives a luminance change in the form of a logarithmic function. Specifically, in an area with a relatively low luminance, the visual characteristic of a human gently increases for an increase in a physical amount ($cd/m^2$) of the luminance. In addition, in an area with a relatively high luminance, the visual characteristic of a human sharply increases for an increase in a physical amount ($cd/m^2$) of the luminance rather than in a dark area. If the adaptive threshold is set to adaTh, adaTh is obtained using the following formula. Additionally, the threshold Th is decided for each pixel because a spatial frequency is different for each pixel.

$$adaTh = f(Csf, Y_{ave}, Th) \quad \text{(formula 3)}$$

Here, $Y_{ave}$ is lighting luminance around a pixel, and can be obtained by filtering an image using a smoothing filter such as a Gaussian filter. The formula 3 qualitatively means that the adaptive threshold adaTh of degradation perception can be computed with $C_{sf}$ of contrast/spatial frequency, lighting luminance $Y_{ave}$ around a pixel, and a fixed threshold Th (constant) of degradation perception. Note that the fixed threshold Th can be set to 30 $cd/m^2$ as an example.

Furthermore, the formula 3 can be computed as, for example, the following formula 4.

$$adaTh = Th \times JND(Y_{ave}) \times \sum_{i=0}^{N-1} \left\{ \left( \frac{C_i}{\sum_{k=0}^{N-1} C_k} \right) \times \frac{1}{CSF(C_i)} \right\} \quad \text{(formula 4)}$$

The formula 4 qualitatively means that the adaptive threshold adaTh of degradation perception is obtained by integrating a constant term Th, a perception gain JND that varies according to the lighting luminance $Y_{ave}$ around a pixel, and a perception gain that varies according to contrast vectors $C_{sf}$ of respective spatial frequencies that an image has.

Figure 17:
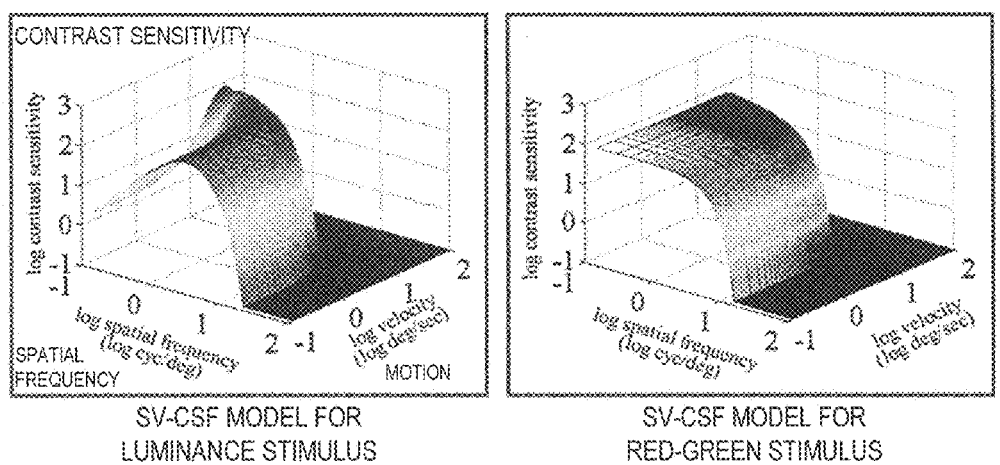
FIG. 17 is a characteristic diagram illustrating a relationship between a spatial frequency, motion of an object in an image, and contrast sensitivity.

Furthermore, it is also known that contrast sensitivity changes due to motion information of an object such as motion blur. FIG. 17 is a characteristic diagram illustrating a relationship between a spatial frequency, a motion of an object in an image, and contrast sensitivity. As indicated in a model for a luminance stimulus in FIG. 17, contrast sensitivity increases as a motion of an object becomes large. That is to say, when a motion of an object becomes fast, it becomes difficult to recognize image ghosting and doubling.

In addition, as illustrated in FIG. 17, if a spatial frequency is excessively high, contrast sensitivity is difficult to perceive. For this reason, when a spatial frequency is high, a threshold at which a luminance change is perceived can be set even higher. In addition, when a motion is fast, contrast sensitivity is difficult to perceive. For this reason, a threshold at which a luminance change is perceived can be set even higher when a motion is fast. In this case, motion information is added to an argument of the contrast sensitivity function (CSF) of the formula 4, and a perception gain of contrast/spatial frequency can be changed.

As described above, when the luminance threshold Th or adaTh of degradation perception is obtained, the inverse function for a function and corresponding disparity for a table are searched for, and then a disparity amount corresponding to the threshold is obtained. When the function of the disparity transition of the crosstalk degradation amount ΔI is obtained in the above-described process, a maximum disparity amount max_dspx in which degradation is not perceived is obtained for each pixel as a disparity amount corresponding to the threshold. The same applies to the table, and a maximum disparity amount max_dspx in which degradation is not perceived can be obtained for each pixel.

The maximum disparity amount estimating unit 104 outputs the maximum disparity amount max_dspx obtained for each pixel, which namely means a maximum disparity map indicating the distribution of maximum disparity amounts, to the maximum disparity range deciding unit 106 and the maximum phase difference estimating unit 130.

Figure 18:
FIG. 18 is an example of a disparity map.

The maximum disparity range deciding unit 106 acquires a disparity map indicating the distribution of disparity between different viewpoint images (e.g. between an image for a left eye and an image for a right eye) set for the respective pixels in the original image. The disparity map may be then acquired from the outside in the same way as the original image, or an analysis process may be performed on the original image to generate the disparity map. Additionally, the image processing device 10 itself may generate the disparity map on the basis of the original image. For example, FIG. 18 illustrates an example of a disparity map based on the original image v10 illustrated in FIG. 15. A structural element for acquiring an original image and a disparity map corresponds to an example of the "acquisition unit."

The maximum disparity range deciding unit 106 acquires a maximum disparity amount map from the maximum disparity amount estimating unit 104.

The maximum disparity range deciding unit 106 identifies a forward ROI indicating an area on a front side (foreground side) in the original image and a backward ROI indicating an area on a back side (background side) on the basis of the acquired disparity map. Specifically, the maximum disparity range deciding unit 106 analyzes a histogram indicating the distribution of disparity based on the acquired disparity map, thereby identifying the forward ROI and the backward ROI.

Figure 19:
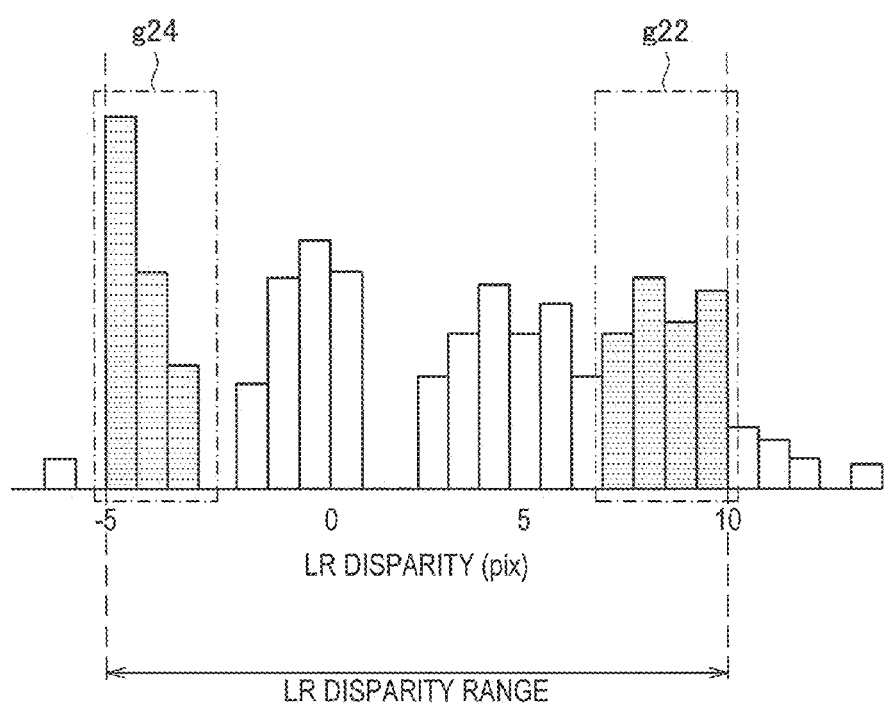
FIG. 19 is a schematic diagram illustrating an example of a histogram indicating distribution of disparity.

For example, FIG. 19 illustrates an example of a histogram indicating the distribution of disparity based on the acquired disparity map. Additionally, for example, the histogram indicating the distribution of disparity can be calculated on the basis of the number of pixels associated with each disparity value in the disparity map for each disparity value.

The maximum disparity range deciding unit 106 identifies a dynamic range (i.e. LR disparity range) of LR disparity on the basis of the histogram. For example, the maximum disparity range deciding unit 106 may then identify the range indicated by a value on the foremost side (+ side) and a value on the innermost side (− side) in the histogram as a dynamic range of LR disparity. To give another example, the maximum disparity range deciding unit 106 may leave a margin when identifying each end of a dynamic range of LR disparity. Specifically, the maximum disparity range deciding unit 106 may integrate the frequencies of disparity values from the foremost side (+ side) of the histogram, and then identify a disparity value at which the integrated value exceeds a predefined threshold as an end of the front side (+ side) within a dynamic range of LR disparity. In the same way, the maximum disparity range deciding unit 106 may integrate the frequencies of disparity values from the innermost side (− side) of the histogram, and then identify a disparity value at which the integrated value exceeds the threshold as an end of the back side (− side) within the dynamic range of LR disparity.

Next, the maximum disparity range deciding unit 106 integrates the frequencies of disparity values from the identified front side (+ side) of the dynamic range, and then compares the integrated value with a predefined value, thereby identifying, as a forward ROI, a range g22 of the disparity within which the integrated value becomes less than or equal to the threshold. In the same way, the maximum disparity range deciding unit 106 integrates the frequencies of disparity values from the identified back side (− side) of the dynamic range, and then compares the integrated value with a predefined value, thereby identifying, as a backward ROI, a range g24 of the disparity within which the integrated value becomes less than or equal to the threshold.

Figure 20:
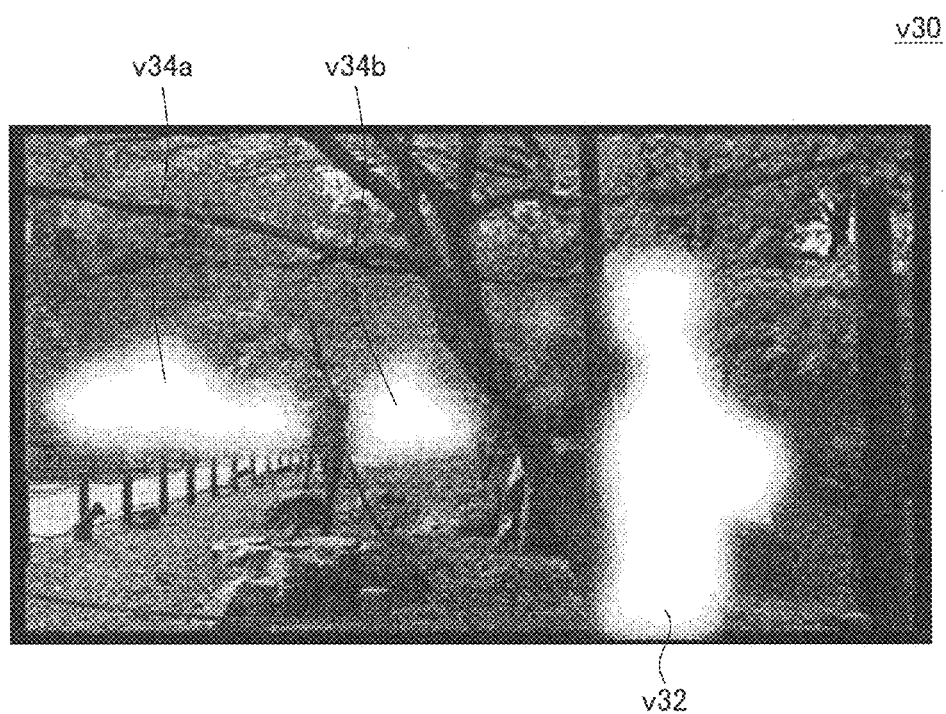
FIG. 20 is a schematic diagram illustrating examples of a forward ROI and a backward ROI in an original image.

For example, FIG. 20 illustrates examples of the forward ROI and the backward ROI in the original image v10, which are decided on the basis of the original image v10 illustrated in FIG. 15 and the disparity map v20 illustrated in FIG. 18. For example, an area v32 indicates a forward ROI, while areas v34a and v34b each indicate a backward ROI.

Next, the maximum disparity range deciding unit 106 calculates a maximum disparity value of each of the forward ROI and the backward ROI on the basis of the identified forward ROI and backward ROI, and the acquired maximum disparity amount map. The maximum disparity range deciding unit 106 then integrates the frequencies of maximum disparity amounts in the respective areas in order of increasing maximum disparity amount, compares the integrated value with a predefined threshold, and identifies, as a maximum disparity amount in the area, a maximum disparity amount in which the integrated value exceeds the threshold.

Figure 21A:
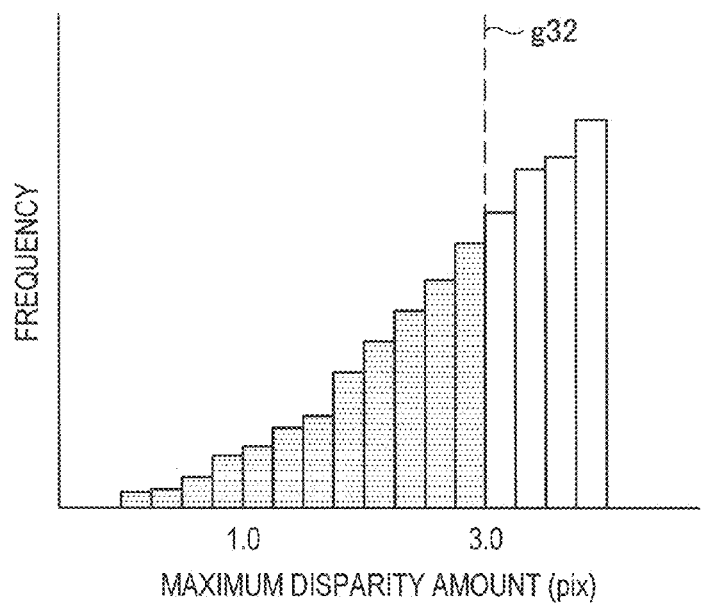
FIG. 21A is an example of a histogram of a maximum disparity amount for a backward ROI.

For example, FIG. 21A is a histogram indicating a relationship between a maximum disparity amount of a backward ROI and the frequency of the maximum disparity amount. The transverse axis indicates a maximum disparity amount [pix] in FIG. 21A, while the longitudinal axis indicates a frequency. Additionally, for example, a histogram as illustrated in FIG. 21A can be calculated on the basis of the number of pixels associated with each maximum disparity amount in an area corresponding to a backward ROI in a maximum disparity amount map.

The maximum disparity range deciding unit 106 integrates frequencies from a smaller maximum disparity amount to a larger maximum disparity amount on the basis of a histogram of maximum disparity amounts as illustrated in FIG. 21A, and compares the integrated value with a predefined threshold. The maximum disparity range deciding unit 106 then identifies, as a maximum disparity amount of a backward ROI, a maximum disparity amount in which the integrated value almost exceeds the threshold.

For example, the example of FIG. 21A illustrates that a larger maximum disparity amount has a higher frequency, and the hatched ranges indicates ranges within which an integrated value of frequencies does not exceed a threshold. If a value indicated by a reference numeral g32 is exceeded in this case, the maximum disparity range deciding unit 106 identifies, as a maximum disparity amount of a backward ROI, a maximum disparity amount 3.0 [pix] indicated by the reference numeral g32 because an integrated value of frequencies exceeds a threshold.

Such a threshold process allows the maximum disparity range deciding unit 106 to identify a maximum disparity amount that can keep, less than or equal to a predetermined value, a frequency at which degradation is perceived for a backward ROI, which means, in other words, a ratio of areas in the backward ROI in which degradation is perceived. That is to say, even if the backward ROI has an identified disparity of up to 3.0 [pix], it is possible to keep a frequency at which degradation is perceived less than or equal to a predetermined value.

Figure 21B:
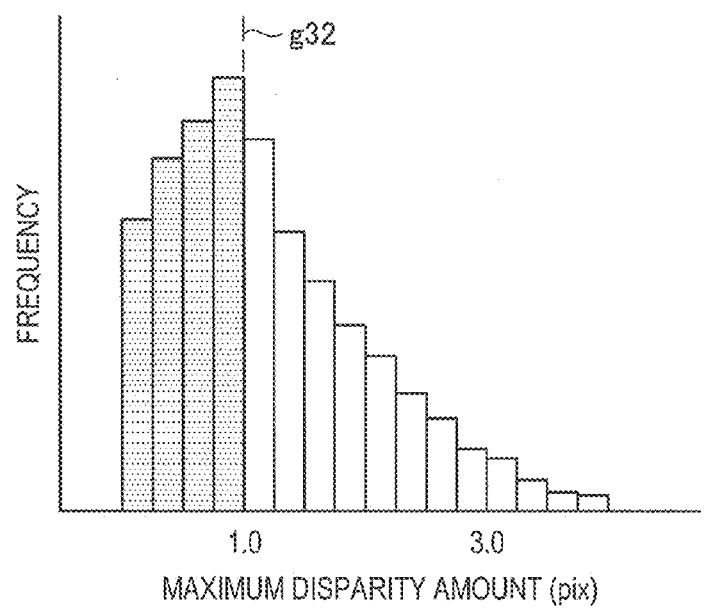
FIG. 21B is an example of a histogram of a maximum disparity amount for a forward ROI.

The same applies to a forward ROI. For example, FIG. 21B is a histogram indicating a relationship between a maximum disparity amount of a forward ROI and the frequency of the maximum disparity amount. The transverse axis and the longitudinal axis in FIG. 21B each indicate the same as in FIG. 21A.

The maximum disparity range deciding unit 106 integrates frequencies from a smaller maximum disparity amount to a larger maximum disparity amount on the basis of a histogram of maximum disparity amounts as illustrated in FIG. 21B, and compares the integrated value with a predefined threshold, thereby identifying a maximum disparity amount of a forward ROI.

For example, the example of FIG. 21B illustrates that a smaller maximum disparity amount has a higher frequency becomes, and the hatched ranges indicates ranges within which an integrated value of frequencies does not exceed a threshold. If a value indicated by a reference numeral g32 is exceeded in this case, the maximum disparity range deciding unit 106 identifies, as a maximum disparity amount of a forward ROI, a maximum disparity amount 1.0 [pix] indicated by the reference numeral g32 because an integrated value of frequencies exceeds a threshold.

In this way, the example of FIG. 21B illustrates that the integrated value exceeds the threshold at a value at which the maximum disparity amount is smaller than the maximum disparity amount in the example of FIG. 21A, which namely means the point of a maximum disparity amount 1.0 [pix] indicated by the reference numeral g32, because a smaller maximum disparity amount has a higher frequency. That is to say, while a backward ROI can have a disparity of up to 3.0 [pix], the example of FIG. 21B illustrates that once a forward ROI has a disparity of more than 1.0 [pix], it is difficult to keep, less than or equal to a predetermined value, a frequency at which degradation is perceived.

Figure 21C:
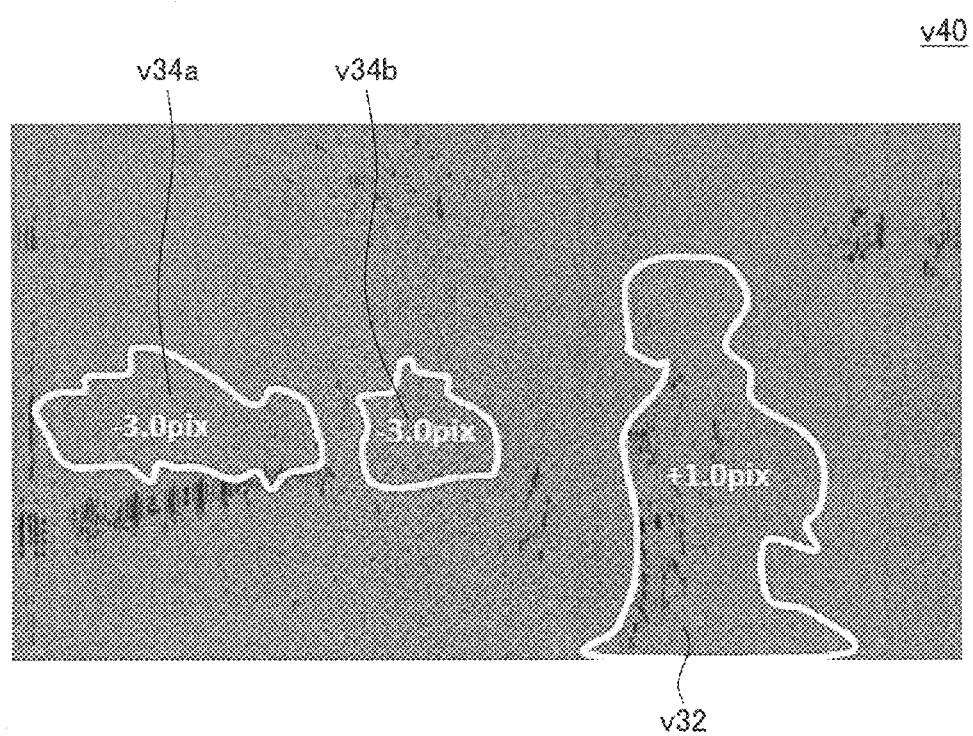
FIG. 21C is an example of a maximum disparity amount map.

FIG. 21C illustrates an example of a maximum disparity amount map. The example of FIG. 21C schematically illustrates, in a maximum disparity amount map v40, the forward ROI v32 and the backward ROIs v34a and v34b, which have been identified in the above-described process.

For example, the maximum disparity amount corresponding to the forward ROI v32 is 1.0 [pix] in the example illustrated in FIG. 21C. Accordingly, the maximum disparity range deciding unit 106 identifies the maximum disparity amount of the forward ROI as maximum disparity dispMax=+1.0 [pix] on a front side (+ side). In the same way, the maximum disparity amounts corresponding to the backward ROIs v34a and v34b are 3.0 [pix] in the example illustrated in FIG. 21C. Accordingly, the maximum disparity range deciding unit 106 identifies the maximum disparity amounts of the backward ROIs as maximum disparity dispMin=−3.0 [pix] on a back side (− side).

As described above, the maximum disparity range deciding unit 106 identifies a maximum disparity range defined with the maximum disparity dispMax on the front side (+ side) and the maximum disparity dispMin on the back side (− side). That is to say, a range of −3.0 [pix] to +1.0 [pix] is identified as a maximum disparity range in FIG. 21C.

The maximum disparity range deciding unit 106 outputs the identified maximum disparity range, which namely means information indicating the maximum disparity dispMax on the front side (+ side) and the maximum disparity dispMin on the back side (− side), to the disparity layout converting unit 120.

Figure 22:
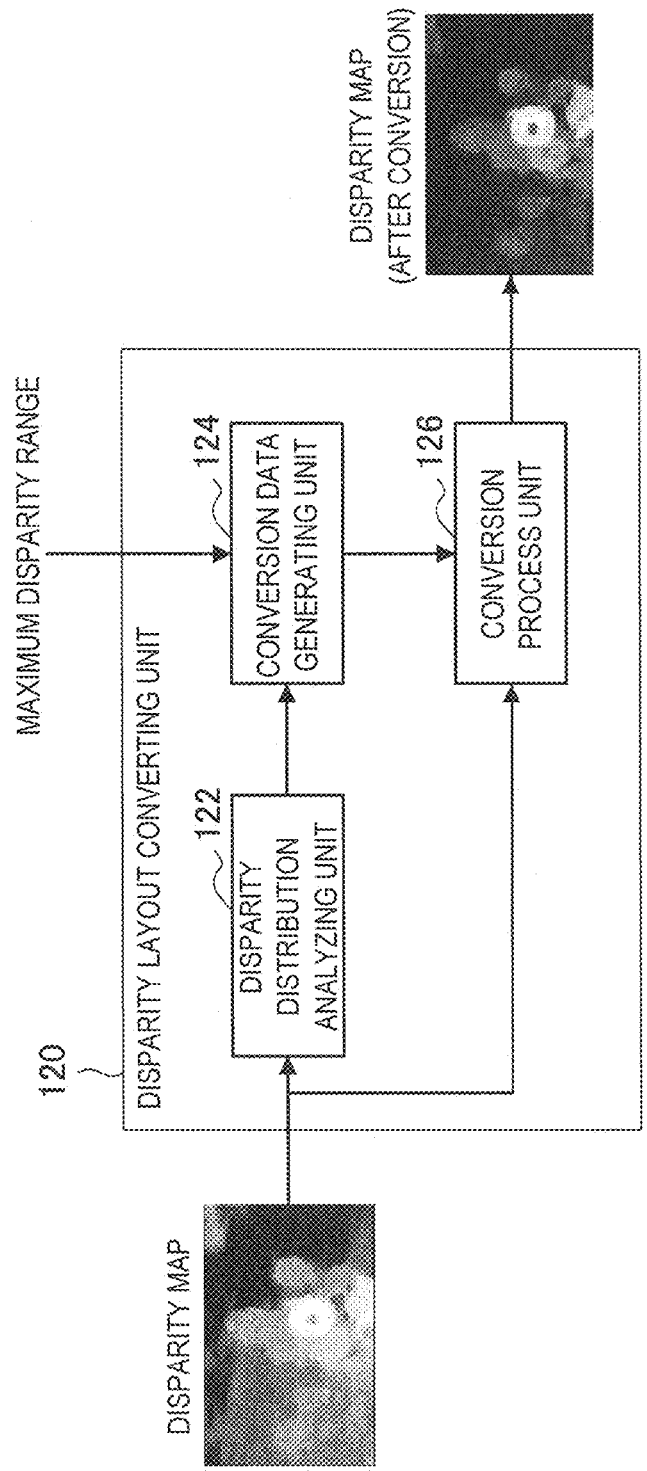
FIG. 22 is a block diagram illustrating an example of a functional configuration of a disparity layout converting unit.

Next, the disparity layout converting unit 120 will be described in detail with reference to FIG. 22. FIG. 22 is a block diagram illustrating an example of a functional configuration of the disparity layout converting unit 120. As illustrated in FIG. 22, the disparity layout converting unit 120 includes a disparity distribution analyzing unit 122, a conversion data generating unit 124, and a conversion process unit 126.

The disparity layout converting unit 120 acquires a disparity map. Additionally, the disparity map acquired here is the same as the disparity map acquired by the maximum disparity range deciding unit 106. The acquired disparity map is output to the disparity distribution analyzing unit 122 and the conversion process unit 126.

The disparity distribution analyzing unit 122 generates a histogram indicating the distribution of disparity on the basis of the acquired disparity map. Additionally, the disparity distribution analyzing unit 122 may acquire the histogram generated by the maximum disparity range deciding unit 106 from the maximum disparity range deciding unit 106 instead of a disparity map. This generates a histogram as illustrated in FIG. 19, the histogram indicating the distribution of disparity. The disparity distribution analyzing unit 122 outputs the generated histogram to the conversion data generating unit 124. Additionally, the maximum disparity range deciding unit 106 corresponds to an example of a "disparity range deciding unit."

The conversion data generating unit 124 acquires the histogram indicating the distribution of disparity from the disparity distribution analyzing unit 122. In addition, the conversion data generating unit 124 acquires, from the maximum disparity range deciding unit 106, the maximum disparity range, which namely means the information indicating the maximum disparity dispMax on the front side (+ side) and the maximum disparity dispMin on the back side (− side).

Figure 23:
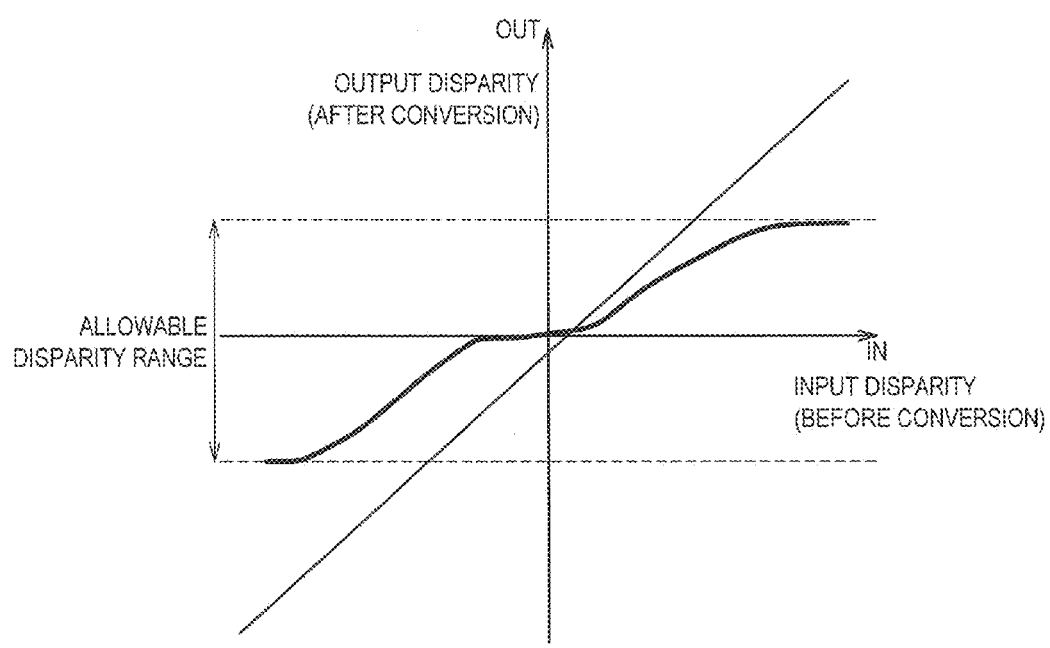
FIG. 23 is a schematic diagram illustrating an example of an I/O curve for flattening distribution of disparity.

As discussed in "4.3. Flattening of Histogram and Application to Conversion of Disparity Layout," the conversion data generating unit 124 generates an I/O curve for converting a disparity layout from the acquired histogram. This generates an I/O curve for flattening the distribution of disparity in a disparity map before conversion. For example, FIG. 23 illustrates an example of an I/O curve to be generated.

Here, the conversion data generating unit 124 sets a dynamic range of output disparity as an allowable disparity range, which namely means a maximum disparity range acquired from the maximum disparity range deciding unit 106. For example, if a maximum disparity range is decided on the basis of the example illustrated in FIG. 21C, the conversion data generating unit 124 sets a dynamic range of output disparity (after conversion) within a range of −3.0 [pix] to +1.0 [pix].

The conversion data generating unit 124 outputs the I/O curve for converting the generated disparity layout to the conversion process unit 126.

The conversion process unit 126 converts each disparity in the acquired disparity map on the basis of the I/O curve output from the conversion data generating unit 124. This allows the conversion process unit 126 to keep the acquired disparity map within a disparity dynamic range of −3.0 [pix] to +1.0 [pix], and to convert the acquired disparity map into a disparity map having the distribution of disparity flattened.

The conversion process unit 126 outputs the disparity map after conversion to the maximum phase difference estimating unit 130, and a structural element (such as another image processing unit and the display device 20) for generating a viewpoint image.

Next, the operations of the maximum phase difference estimating unit 130 and the phase difference deciding unit 132 will be described. First of all, the overview of the operations of the maximum phase difference estimating unit 130 and the phase difference deciding unit 132 will be described with reference to FIGS. 24 to 26.

As shown as the operation of the disparity layout converting unit 120, the disparity map converted by the disparity layout converting unit 120 has a disparity layout converted in a manner that the disparity range is decided on the basis of a maximum disparity amount of a forward ROI and a maximum disparity amount of a backward ROI. However, an object that is likely to experience image ghosting and image doubling is not necessarily positioned on the foremost side (forward ROI) or on the innermost side (backward ROI). For example, if a maximum disparity amount of an intermediate layer within a disparity range is larger than a maximum disparity amount of the foremost side or the innermost side, the intermediate layer may have image ghosting and image doubling.

Figure 24:
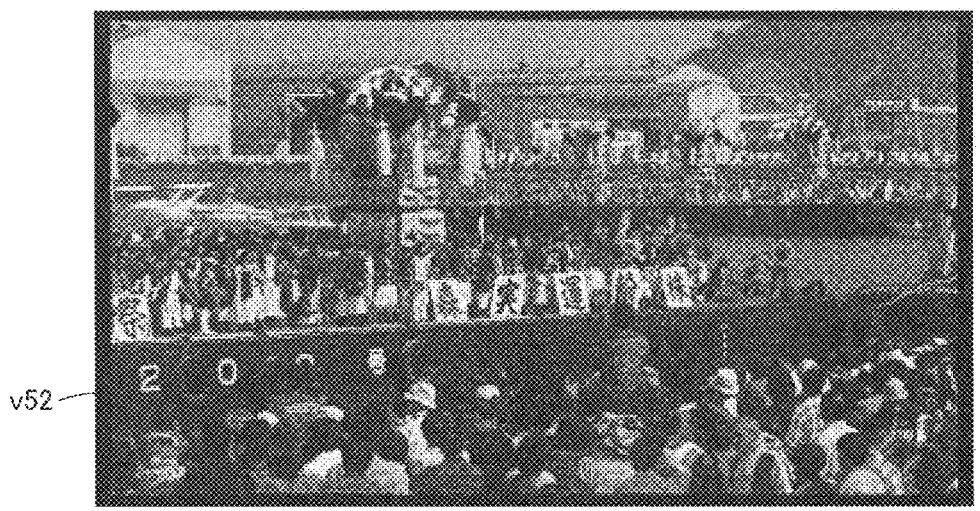
FIG. 24 illustrates an example of an original image in which a maximum disparity amount in an intermediate layer is larger than disparity amounts on the foremost side and the innermost side.
Figure 25:
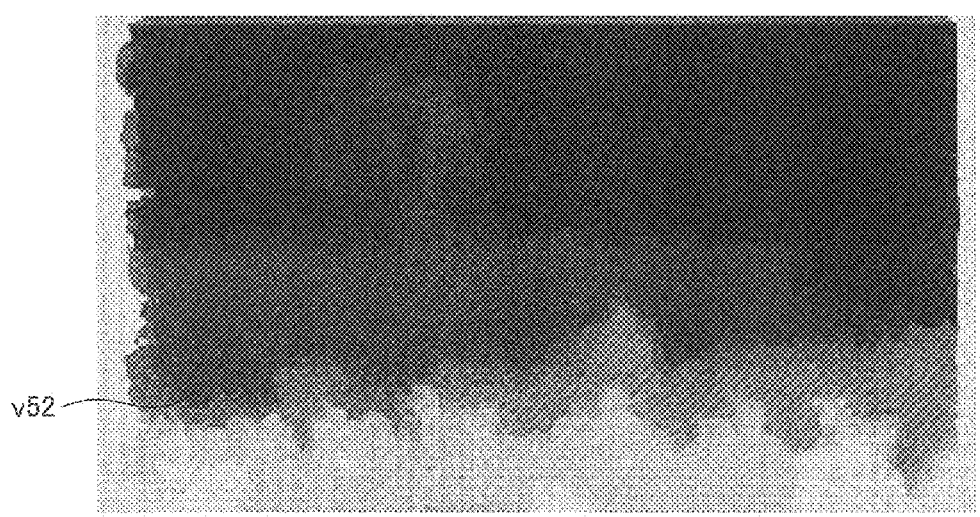
FIG. 25 is a schematic diagram illustrating an example of a disparity map corresponding to the original image illustrated in FIG. 24.
Figure 26:
FIG. 26 is a schematic diagram illustrating an example of a maximum disparity amount map of the original image illustrated in FIG. 24.

For example, FIG. 24 illustrates an example of an original image in which a maximum disparity amount of an intermediate layer is larger than a maximum disparity amount of the foremost side or the innermost side. Meanwhile, FIG. 25 illustrates an example of the disparity map corresponding to an original image v50 illustrated in FIG. 24. In addition, FIG. 26 illustrates an example of a maximum disparity amount map of the original image v50 illustrated in FIG. 24.

An area v52 in the original image v50 illustrated in FIG. 24 indicates that the spatial frequency is higher than in the other areas in the original image v50. Accordingly, a maximum disparity amount map v70 illustrated in FIG. 26 shows that the area v52 has a larger maximum disparity amount than the other areas do. Meanwhile, as shown by a disparity map v60 illustrated in FIG. 25, a part indicated by the area v52 corresponds to an intermediate layer. Even if a disparity range is decided on the basis of a maximum disparity amount of each of a forward ROI and a backward ROI to convert a disparity layout, this original image v50 to be processed may still cause image ghosting and image doubling in an intermediate layer (such as the area v52).

The maximum phase difference estimating unit 130 and the phase difference deciding unit 132 use an idea of a phase difference of a viewpoint image to control disparity. For example, when LR stereo images are used, a phase of the L image is defined as 0.0 and a phase of the R image is defined as 1.0. The use of phases in this way allows the front-to-back relationship of an object to be kept in a viewpoint image to be displayed, and a maximum disparity amount (phase difference) in which degradation is not perceived to be decided.

Specific operations of the maximum phase difference estimating unit 130 and the phase difference deciding unit 132 will be described with reference to FIG. 14.

The maximum phase difference estimating unit 130 acquires a maximum disparity amount map from the maximum disparity amount estimating unit 104, the maximum disparity amount map indicating the distribution of a maximum disparity amount max_dspx. In addition, the maximum phase difference estimating unit 130 acquires a disparity map having a disparity layout converted from the disparity layout converting unit 120.

The maximum phase difference estimating unit 130 converts a maximum disparity amount max_dspx for each pixel in the maximum disparity amount map into a maximum difference phase max_phase at which degradation is not perceived on the basis of the acquired disparity map and the maximum disparity amount map. Specifically, the maximum phase difference estimating unit 130 converts the maximum disparity amount max_dspx into the maximum phase difference max_phase on the basis of the following formula 5.

(formula 5)

$$\text{max\_phase} = \begin{cases} \text{max\_dspx}/\text{lr\_dspx} & \text{if lr\_dspx} \neq 0 \text{ or max\_dspx}/\text{lr\_dspx} < \text{clip\_phase} \\ \text{clip\_phase} & \text{otherwise} \end{cases}$$

(formula 5)

In the formula 5, lr_dspx represents disparity of LR images, and clip_phase represents a maximum phase difference set from the outside. That is to say, the codomain of the maximum phase difference max_phase at which degradation is not perceived satisfies 0≤max_phase≤clip_phase. The maximum phase difference max_phase represents a value obtained by dividing max_dspx obtained in the third step by the disparity of the left and right (LR) images. Accordingly, the maximum disparity amount max_dspx is converted into the maximum phase difference max_phase of the left and right images, and accordingly a front-to-back relationship between objects is taken into consideration. The disparity lr_dspx of the LR images represents a value of disparity between left and right eyes in each pixel of an input image, and defined on the basis of the acquired disparity map.

In this example, a system in which a multi-viewpoint image is generated from the LR images is assumed, but it can be computed in the same manner also in other methods such as an image, + a depth map by performing conversion into a deviation amount (disparity) that is projected when viewpoint images are generated from the depth map. Accordingly, a disparity map of critical adjacent viewpoints of each pixel can be converted into a phase difference map of adjacent viewpoints of 3D images (phase map: a map which guides a level of phase difference to be applied).

As described above, the maximum phase difference estimating unit 130 calculates, for each pixel, a maximum phase difference at which degradation is not perceived. The maximum phase difference estimating unit 130 outputs a maximum phase difference for each pixel, which namely means a maximum phase difference map, to the phase difference deciding unit 132.

The phase difference deciding unit 132 acquires the map of a maximum difference at which degradation is not perceived, which namely means a maximum phase difference map, from the maximum phase difference estimating unit 130. The phase difference deciding unit 132 decides disparity for keeping the number of pixels in which degradation is perceived less than or equal to a predetermined number of pixels (such as 1% of the number of pixels in a whole image) on the basis of the acquired maximum phase difference map.

Figure 27:
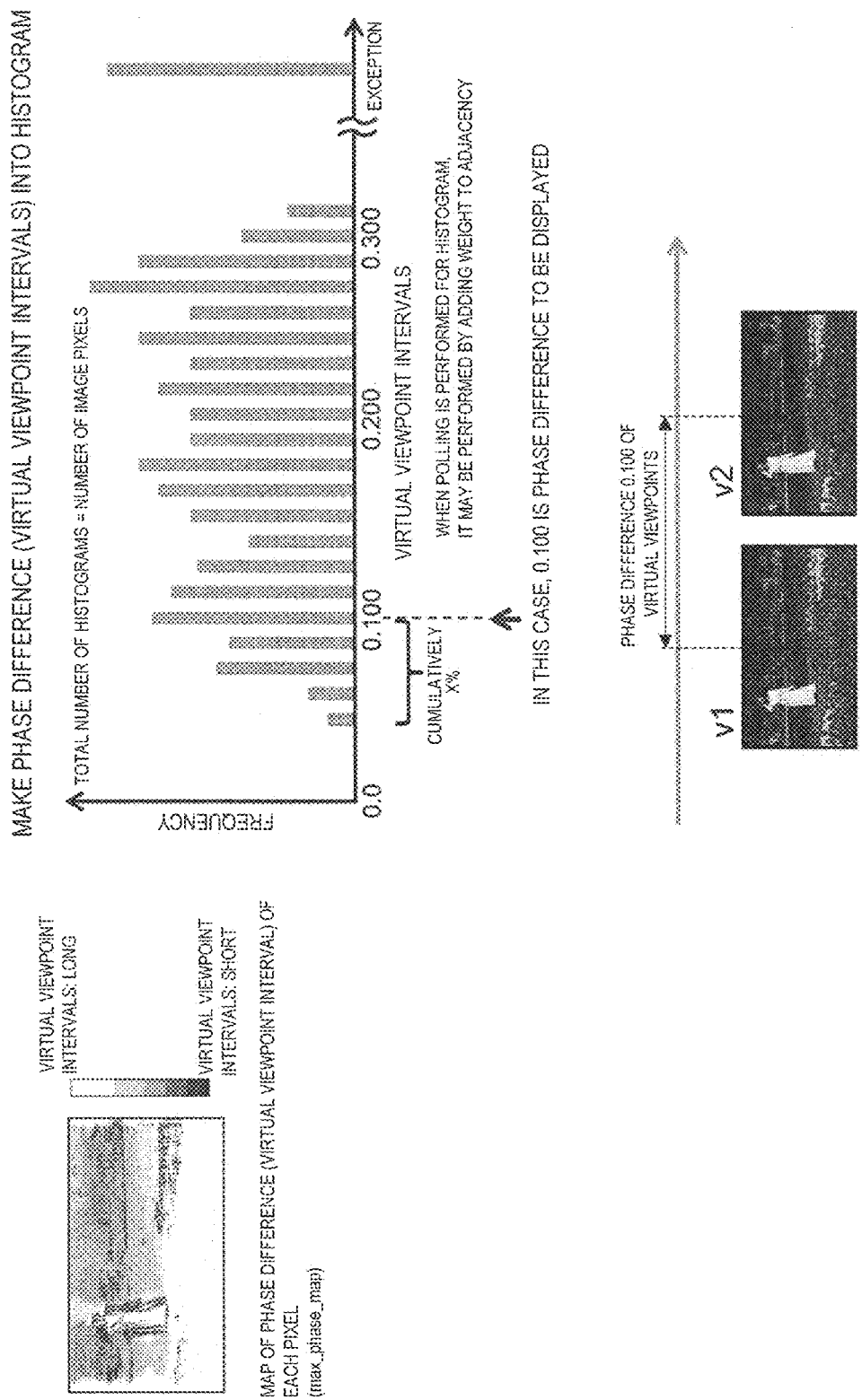
FIG. 27 illustrates an example of a method for a phase difference deciding unit to decide a phase difference of a viewpoint image that is actually displayed.

FIG. 27 illustrates an example of a method for the phase difference deciding unit 132 to decide a phase difference of a viewpoint image that is actually displayed. As illustrated in FIG. 27, the phase difference deciding unit 132 counts, as a histogram, the appearance frequency of each max_phase value for the value of each pixel in the acquired maximum phase difference map. Next, the phase difference deciding unit 132 computes the cumulative sum from the frequency of a smaller max_phase value in a histogram. The phase difference deciding unit 132 decides, as a phase difference opt_phase of a viewpoint image that is actually displayed, a phase difference at which the cumulative sum exceeds a threshold CutTh.

For example, a case in which a numeric value of CutTh= (the total number of pixels)×1% is set for the example of the face of a person (area A1) and the stems of flowers (area A2) of FIG. 8 will be described. When the cumulative value of the histogram is computed, the phase difference at which the cumulative sum exceeds the threshold CutTh is about 0.100. At this moment, disparity equivalent to a maximum phase difference at which degradation of image quality is perceived is applied to the stems of flowers, and degradation of image quality is not perceived in the remaining 99% of the areas. That is to say, the maximum phase difference at which degradation of the image quality is not perceived in a whole image is displayed, and the disparity display performance of a display can be sufficiently exhibited.

As described above, the phase difference deciding unit 132 decides the phase difference opt_phase of a viewpoint image that is actually displayed on the basis of the acquired maximum phase difference map. The phase difference deciding unit 132 outputs the decided phase difference opt_phase to a structural element (such as another image processing unit and the display device 20) for generating a viewpoint image. Additionally, the structural element for generating a viewpoint image may decide a position between respective virtual viewpoint images on the basis of the phase difference opt_phase acquired from the phase difference deciding unit 132.

As described above, the image processing device 10 according to the present embodiment estimates a maximum disparity amount for each pixel on the basis of contrast per spatial frequency in an original image, and decides a maximum disparity range on the basis of the estimated maximum disparity amount for each pixel. The image processing device 10 then converts a disparity layout in a manner that each disparity in a disparity map falls within the estimated maximum disparity range. Such a configuration allows a disparity range to be efficiently used within a range within which no image ghosting or no image doubling occurs, even if disparity is deviated to any one of a front side (+ side) and a back side (− side) of the display surface of the display device 20.

In addition, the image processing device 10 according to the present embodiment decides a phase difference of a viewpoint image at which the number of pixels in which degradation is perceived is kept less than or equal to a predetermined number of pixels on the basis of the estimated maximum disparity amount for each pixel. Such a configuration allows the image processing device 10 to prevent image ghosting and image doubling from occurring in an intermediate layer even if, for example, an object that is likely to experience image ghosting and image doubling is present in the intermediate layer within a disparity range.

In this way, the image processing device 10 according to the present embodiment can accurately estimate a relationship between a disparity range and image quality degradation caused by crosstalk, so that it is possible to efficiently use a disparity range to the maximum within a range within which image ghosting and image doubling are prevented.

6. SECOND EMBODIMENT

Figure 28:
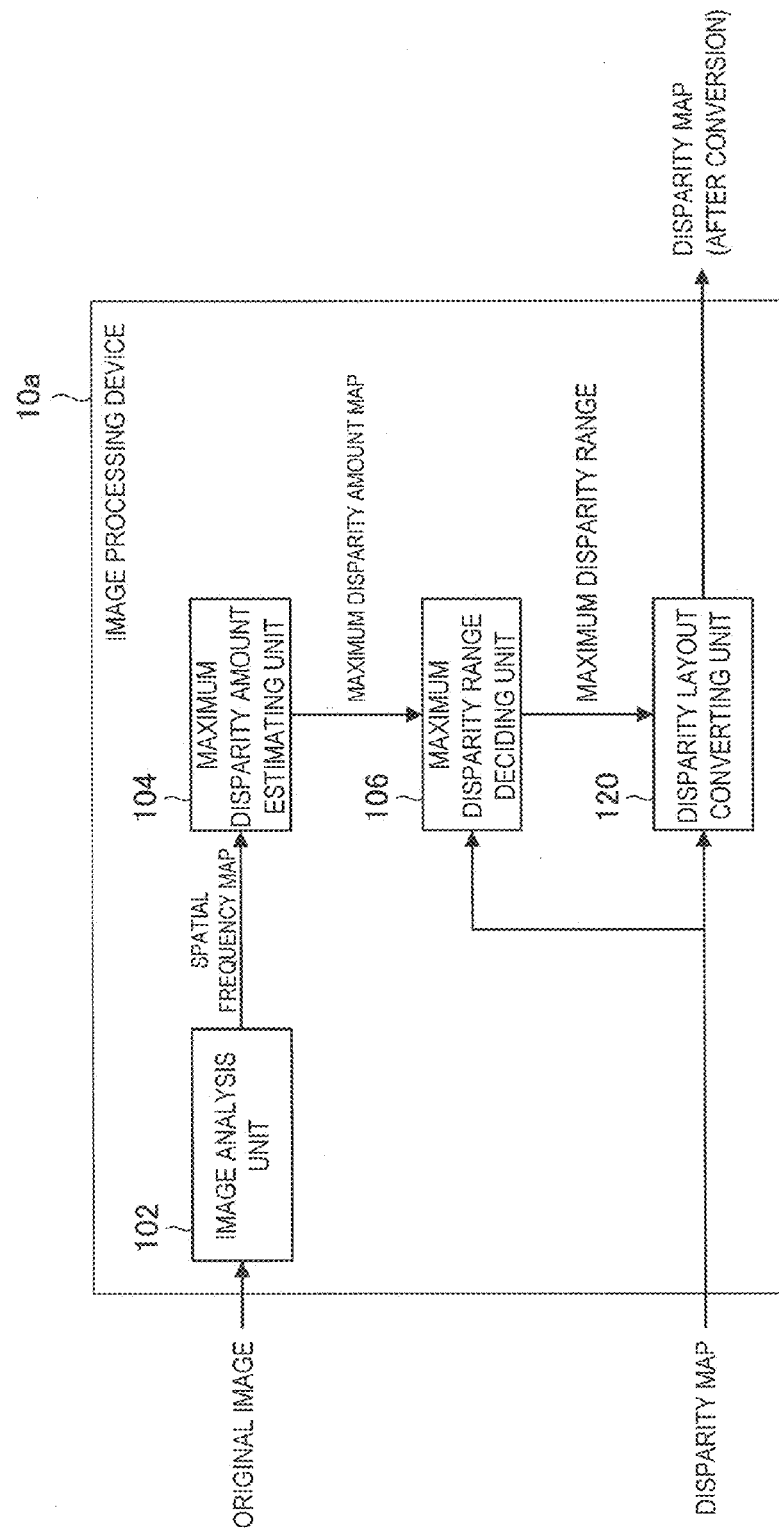
FIG. 28 is a block diagram illustrating an example of a functional configuration of an image processing device according to a second embodiment of the present disclosure.

Next, an image processing device 10a according to a second embodiment will be described with reference to FIG. 28. FIG. 28 is a block diagram illustrating an example of a functional configuration of the image processing device 10a according to the present embodiment.

As illustrated in FIG. 28, the image processing device 10a according to the present embodiment is different from the image processing device 10 according to the above-described first embodiment in that the image processing device 10a according to the present embodiment does not include the maximum phase difference estimating unit 130 or the phase difference deciding unit 132. Additionally, the other structural elements are the same as the structural elements of the image processing device 10 according to the first embodiment.

The maximum phase difference estimating unit 130 or the phase difference deciding unit 132 are not included in this way, and no phase difference is converted, but a disparity layout alone for a disparity map may be converted. In this case, a phase difference may be treated as a predefined value (such as 1.0).

Such a configuration allows the image processing device 10a according to the present embodiment to simplify the configuration and the processes more than the configuration and the processes of the image processing device 10 according to the first embodiment, although the image processing device 10a attains a weaker effect for preventing image ghosting and image doubling from occurring in an intermediate layer than the image processing device 10 attains.

7. THIRD EMBODIMENT

Figure 29:
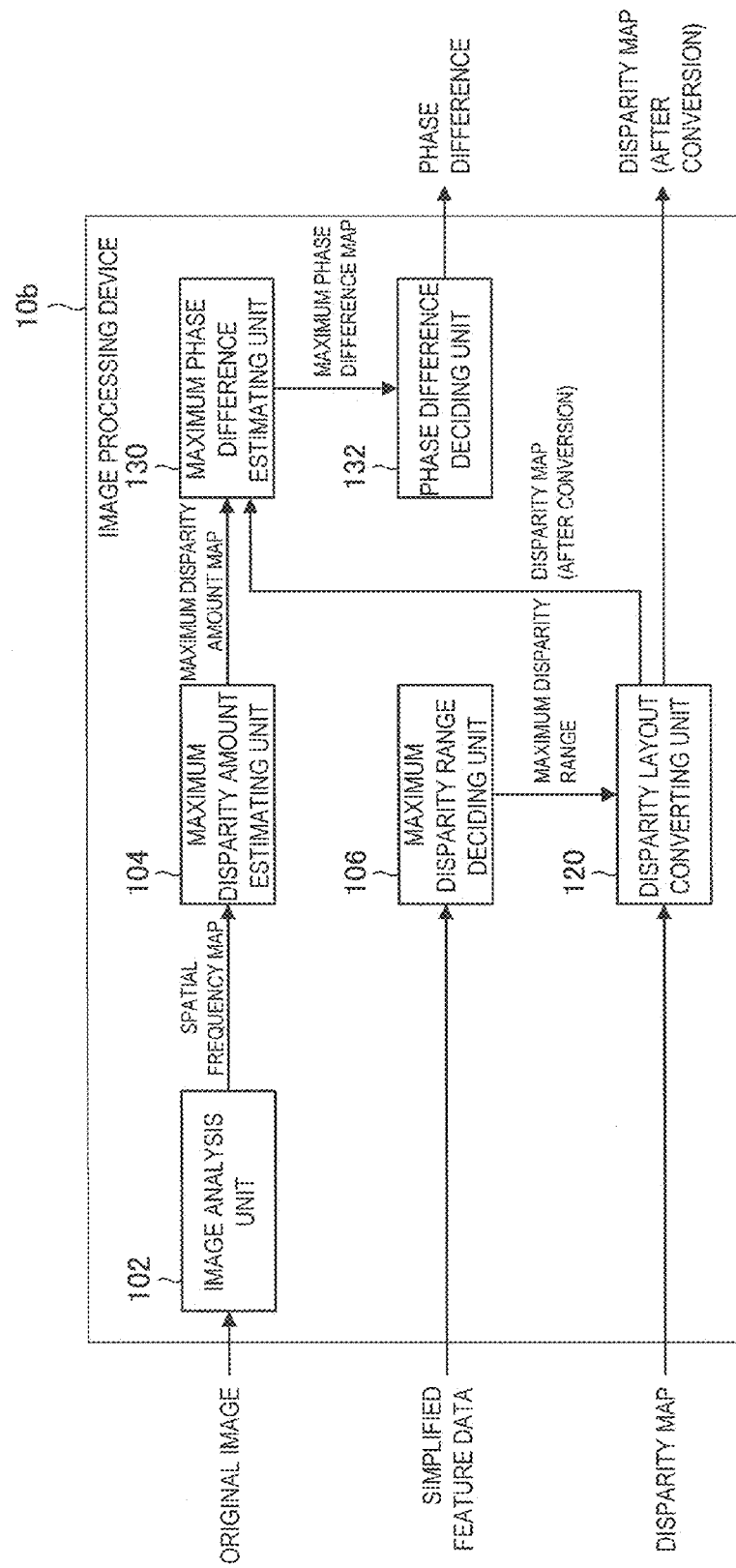
FIG. 29 is a block diagram illustrating an example of a functional configuration of an image processing device according to a third embodiment of the present disclosure.

Next, an image processing device 10b according to a third embodiment will be described with reference to FIG. 29. FIG. 29 is a block diagram illustrating an example of a functional configuration of the image processing device 10b according to the present embodiment.

The maximum disparity range deciding unit 106 decides a maximum disparity range on the basis of the distribution of maximum disparity amounts (i.e. maximum disparity amount map) estimated by the maximum disparity amount estimating unit 104 in the image processing device according to each of the above-described embodiments. By contrast, the image processing device 10b according to the present embodiment decides a maximum disparity range on the basis of, for example, an image feature amount such as an edge and a spatial frequency in an original image. The present description then focuses on the maximum disparity range deciding unit 106, the operation of which is different from the operations in each of the above-described embodiments, and the detailed description of the other structural elements will be omitted.

As illustrated in FIG. 29, the maximum disparity range deciding unit 106 acquires simplified feature data indicating the distribution of image feature amounts for each pixel in an original image. For example, the maximum disparity range deciding unit 106 may acquire, as simplified feature data, the distribution of contrast of each of N types of spatial frequency generated by the image analysis unit 102 on the basis of an original image. To give another example, the maximum disparity range deciding unit 106 may acquire, as simplified feature data, the distribution of edges in an original image by carrying out an image analysis on the original image. Additionally, simplified feature data may be acquired from any source. For example, the maximum disparity range deciding unit 106 may generate simplified feature data by carrying out an image analysis on an original image, or another structural element (such as the image analysis unit 102) of the image processing device 10b may generate simplified feature data.

It is possible to calculate a relative value (ratio) of a maximum disparity amount in each area in an original image from the simplified feature data acquired in this way. The maximum disparity range deciding unit 106 according to the present embodiment uses such a feature to calculate a ratio of the maximum disparity amounts between a forward ROI and a backward ROI.

Here, the description will be made below for an example in which a ratio of maximum disparity amounts between a forward ROI and a backward ROI is calculated on the basis of the distribution of edges in an original image.

The maximum disparity range deciding unit 106 identifies edge strength in each pixel on the basis of the distribution of edges acquired as a result of an image analysis on an original image. The maximum disparity range deciding unit 106 then sets higher edge strength to a pixel that has a sharper change in a gradation value than an adjacent pixel, and sets lower edge strength to a pixel that has a more gradual change in a gradation value.

The maximum disparity range deciding unit 106 then generates a histogram indicating the frequency of edge strength for each of the forward ROI and the backward ROI on the basis of the edge strength identified for each pixel. Here, for example, the histogram of a maximum disparity amount, which is illustrated in each of FIGS. 21A and 21B, having a maximum disparity amount indicated by the transverse axis replaced with edge strength corresponds to the histogram indicating the frequency of edge strength.

The maximum disparity range deciding unit 106 considers that higher edge strength leads to a larger maximum disparity amount, and replaces edge strength with a maximum disparity amount on the basis of the histogram indicating the frequency of edge strength to calculate a maximum disparity amount corresponding to each of a forward ROI and a backward ROI. Additionally, a relational expression for replacing edge strength with a maximum disparity amount may be stored in advance, for example, at a position (e.g. as a database) at which the maximum disparity range deciding unit 106 can read out the relational expression. In addition, a method for identifying a maximum disparity amount corresponding to each of a forward ROI and a backward ROI on the basis of the histogram is the same as discussed with reference to FIGS. 21A and 21B.

Additionally, the maximum disparity amount calculated here indicates a relative value of maximum disparity amounts between respective pixels based on edge strength, and is different from the maximum disparity amount calculated on the basis of the above-described crosstalk model formula in the strict sense. Accordingly, the maximum disparity amount that is calculated here and corresponds to each of a forward ROI and a backward ROI indicates a ratio of maximum disparity amounts between the forward ROI and the backward ROI.

The maximum disparity range deciding unit 106 calculates a maximum disparity dispMax on a front side (+ side) and a maximum disparity dispMin on a back side (− side) on the basis of the calculated rate of maximum disparity amounts between the forward ROI and the backward ROI, and a range of disparity within which image ghosting and image doubling are not likely to occur.

The later processes are the same as the processes performed by the image processing device according to each of the above-described embodiments. That is to say, the maximum disparity range deciding unit 106 outputs information indicating the maximum disparity dispMax on the front side (+ side) and the maximum disparity dispMin on the back side (− side), which namely means the maximum disparity range, to the disparity layout converting unit 120. The disparity layout converting unit 120 may convert a disparity layout of a disparity map (disparity map before conversion) acquired from the outside, on the basis of the maximum disparity range acquired from the maximum disparity range deciding unit 106.

The description has been made so far for the example in which a ratio of maximum disparity amounts between a forward ROI and a backward ROI is calculated on the basis of the distribution of edges in an original image, and yet the same applies to the distribution of contrast of each of N types of spatial frequency. That is to say, a pixel value (such as edge strength and a spatial frequency) of each pixel in each distribution based on an original image is replaced with a relative value of a maximum disparity amount, and a ratio of maximum disparity mounts between a forward ROI and a backward ROI is calculated on the basis of the relative value of a maximum disparity amount.

As described above, the image processing device 10b according to the present embodiment calculates a maximum disparity range on the basis of simplified feature data indicating the distribution of image feature amounts for each pixel in an original image. Such a configuration allows the image processing device 10b according to the present embodiment to simplify more parts of the structural elements than the image processing device according to each of the above-described embodiments because the image processing device 10b according to the present embodiment does not necessarily have to calculate a maximum disparity map for calculating a maximum disparity range. Additionally, the description has been made so far for the example in which the process of the maximum disparity range deciding unit 106 is replaced on the basis of the image processing device 10 according to the above-described first embodiment. Needless to say, however, the process may also be replaced on the basis of the image processing device 10a according to the second embodiment.

8. MODIFIED EXAMPLES

8.1. Modified Example 1

Next, a modified example of the image processing device according to each of the above-described embodiments will be described as a modified example 1. The disparity layout converting unit 120 generates an I/O curve in the image processing device according to each of the above-described embodiments in a manner that a histogram indicating the distribution of disparity is flattened. By contrast, the disparity layout converting unit 120 generates the I/O curve in the modified example 1 on the basis of the distribution of maximum disparity amounts (maximum disparity amount map) estimated by the maximum disparity amount estimating unit 104 in a manner that image ghosting and image doubling are prevented from occurring.

Figure 30:
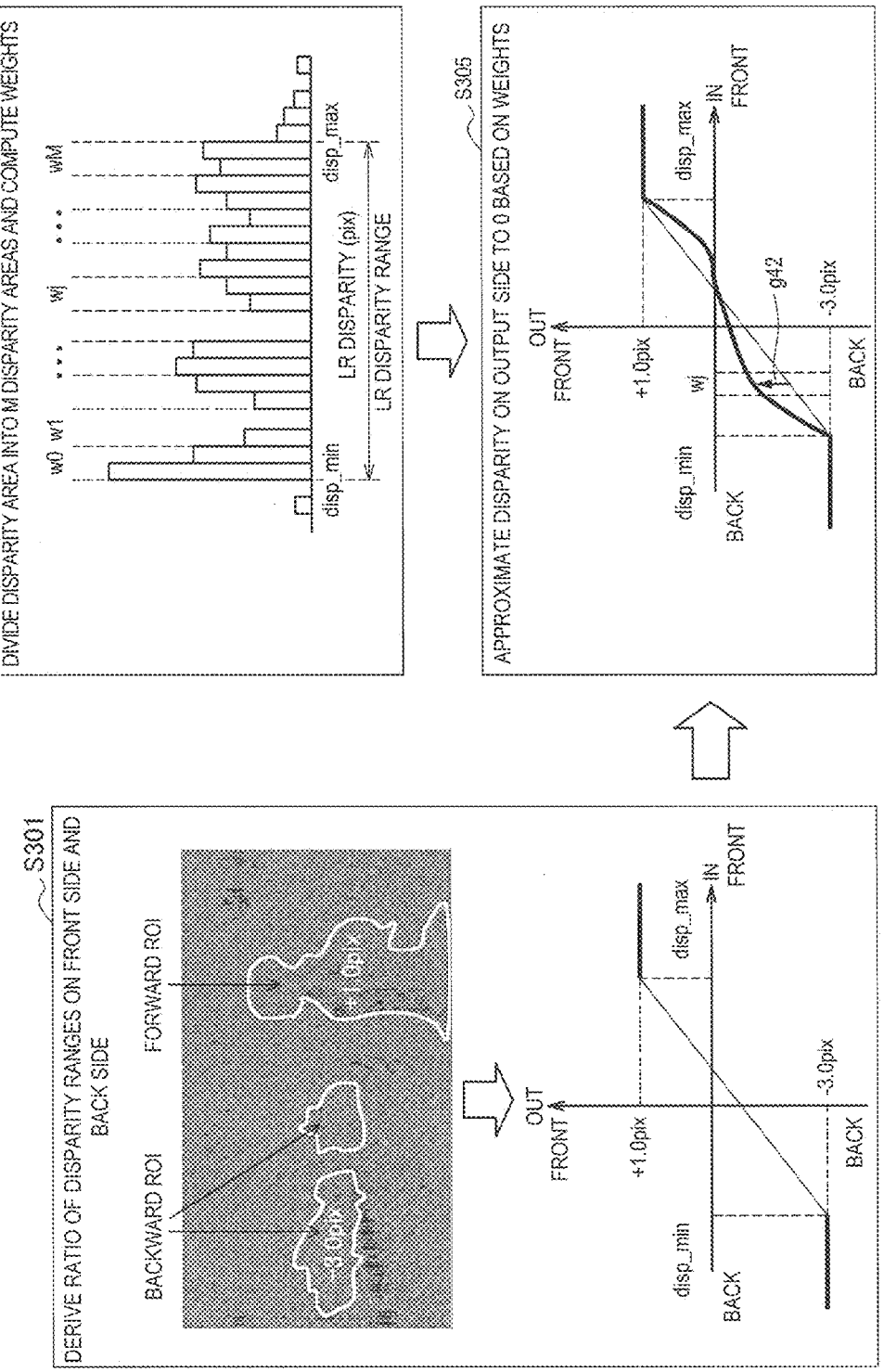
FIG. 30 is an explanatory diagram for describing an operation of an image processing device according to a modified example 1.

The description will be made with reference to FIG. 30 for the operation of the image processing device according to the modified example 1, especially the maximum disparity range deciding unit 106 and the disparity layout converting unit 120, which are different from the image processing device according to each of the above-described embodiments. FIG. 30 is an explanatory diagram for describing the operation of an image processing device according to the modified example 1.

As illustrated in step S301, the maximum disparity range deciding unit 106 identifies a maximum disparity amount of each of a forward ROI and a backward ROI on the basis of a maximum disparity amount map estimated by the maximum disparity amount estimating unit 104 and a disparity map acquired from the outside. The maximum disparity range deciding unit 106 then outputs, to the disparity layout converting unit 120, a maximum disparity range based on the identified maximum disparity amount of each of the forward ROI and the backward ROI. Additionally, the present operation is the same as the operation of the image processing device 10 according to the above-described first embodiment.

The maximum disparity range deciding unit 106 outputs the acquired maximum disparity amount map to the disparity layout converting unit 120.

Next, as illustrated in step S303, the disparity layout converting unit 120 generates a histogram indicating the distribution of disparity on the basis of the disparity map acquired from the outside. The disparity layout converting unit 120 then divides the generated histogram of disparity into a plurality of areas in the depth direction within a range of LR disparity ranges. The disparity layout converting unit 120 divides the histogram into areas 0 to M in the example illustrated in FIG. 28.

Next, the disparity layout converting unit 120 identifies a representative value of the maximum disparity amounts of each of the areas 0 to M on the basis of the acquired maximum disparity amount map. Additionally, the representative value of maximum disparity amounts of each of the areas may be a maximum value of the respective disparity values in the area, or the median or the mean.

The disparity layout converting unit 120 weights each of the areas 0 to M on the basis of the representative value of maximum disparity amounts in the area. For example, the disparity layout converting unit 120 calculates weights w0, w1, . . . , wM for the respective areas 0 to M in the example illustrated in FIG. 30. Additionally, if a weight for a j-th area is denoted with wj, the disparity layout converting unit 120 calculates the respective weights w0, w1, . . . , wM in a manner that 0<wj<1 is satisfied.

Next, the disparity layout converting unit 120 generates an I/O curve for converting disparity as illustrated in step S305 on the basis of the calculated weights w0, w1, ..., wM for the respective areas in a manner that the disparity in each area approximates 0. For example, an I/O curve indicated in a reference numeral S305 in FIG. 30 illustrates that conversion is carried out in a manner that an area having a heavier weight wj, which namely means an area having a larger maximum disparity amount, has a smaller disparity value (approximating 0) as indicated by a reference numeral g42.

The disparity layout converting unit 120 then converts a disparity layout of the disparity map (i.e. disparity map before conversion) acquired from the outside on the basis of the generated I/O curve.

In this way, the image processing device 10 according to the modified example 1 weights the plurality of areas divided in the depth direction on the basis of the distribution of maximum disparity amounts, and then converts the disparity map on the basis of the weights in a manner that the disparity of each of the areas approximates 0 much more. Such a configuration allows the image processing device 10 according to the modified example 1 to convert a disparity map in a manner that the disparity is more reduced for an area having an object that is likely to experience image ghosting and image doubling among the areas in the depth direction.

Additionally, the weighting of areas based on the distribution of maximum disparity amounts is merely an example. A criterion for determining the weighting to reduce disparity may be changed as appropriate depending on a situation in which the image processing device 10 and the display device 20 is used. To give a specific example, an area having a higher attention degree may be weighted and has a reduced disparity on the basis of an attention degree of a viewer, which will be described below as a modified example 2.

8.2. Modified Example 2

Next, an image processing device according to the modified example 2 will be described. The modified example 1 has illustrated an example of the weighting based on a maximum disparity amount as an example in which an original image is divided into a plurality of areas, and each of the areas is weighted at the time of disparity conversion. It will be described in the modified example 2 that an area having a higher attention degree of a viewer is weighted has an emphasized disparity as an example in which each area is weighted at the time of disparity conversion. Additionally, the description will be made below for the operation of the disparity layout converting unit 120, the operation of which is different from the operation of the disparity layout converting unit 120 of the image processing device 10 according to the above-described first embodiment, and the detailed description for the other structural elements will be omitted.

The disparity layout converting unit 120 according to the modified example 2 acquires an original image from the outside, and generates an attention degree map of the acquired original image on the basis of image feature amounts of the original image such as contrast, a luminance level, a tone of colors (RGB), edge strength, and an edge direction. Information indicating an attention degree of a viewer is added to each pixel of an input image in order to obtain an attention map.

For example, when the contrast of an image is high, when the luminance of an image is high, when the edges of an image are constant, when the spatial frequency of an image is high, etc. the disparity layout converting unit 120 may determine that an attention degree is high. Additionally, constant edges of an image mean that contrast and luminance change regularly, and edges represent an object such as the outline of a person's face. Contrast corresponds to the amplitude of a spatial frequency. For example, when an image shows a person's face at the center and has no feature in the background, the person's face at the center has a high attention degree.

Additionally, as long as it is possible to generate an attention degree map by quantitatively converting the height of an attention degree of a viewer into numerals, the generation method is not limited in particular. For example, the disparity layout converting unit 120 may obtain a motion vector of an image from an original image by using a technique such as a block matching algorithm to calculate an attention degree from the motion vector, or to calculate an attention degree map that takes motion vector information into consideration.

The disparity layout converting unit 120 analyzes an attention degree map for each disparity amount of each pixel, and sets a weighting parameter for disparity having a high attention degree. That is to say, the disparity layout converting unit 120 statistically analyzes in which band disparity has a high attention degree (is likely to stand out), and performs a weighing process on the basis of it.

Figure 31:
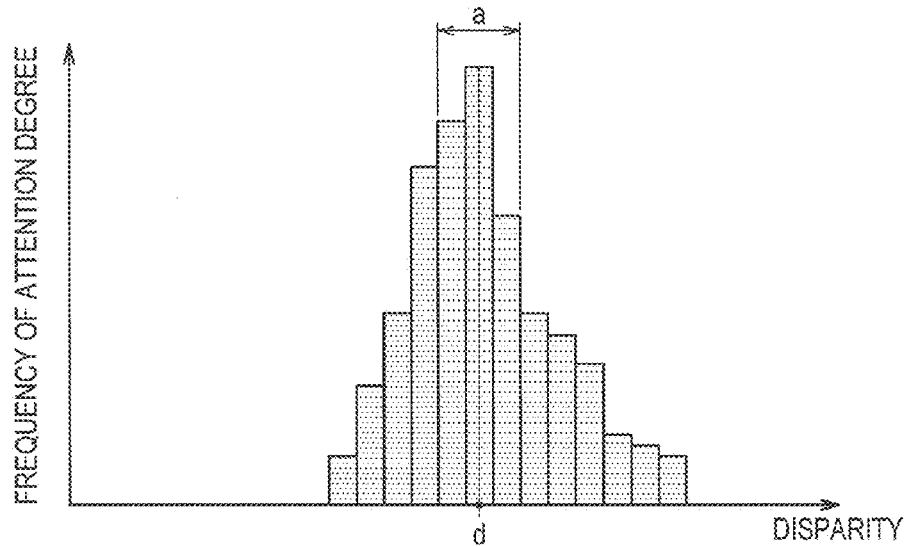
FIG. 31 is a schematic diagram illustrating a histogram indicating scores of an attention degree accumulated for each disparity amount.

For example, FIG. 31 is a schematic diagram illustrating a histogram showing, for each of disparity amounts, accumulated scores of attention degrees of respective pixels. As illustrated in FIG. 31, the disparity layout converting unit 120 generates a histogram indicating a degree of an attention degree to disparity on the basis of the disparity of each pixel and information indicating the attention degree. For example, when an image shows a person's face at the center and has no feature in the background, the face of the person at the center has a high attention degree. Consequently, a disparity value d of the pixel corresponding to the person's face has a high frequency of the attention degree (longitudinal axis in FIG. 31).

The disparity layout converting unit 120 then estimates, from a mode value of the histogram, a disparity band having a high attention degree, and sets a weighting parameter. Specifically, since the disparity value d has the highest attention degree in FIG. 31, a weighting parameter is set in a manner that a band a near the disparity value d has a heavy weight.

Figure 32:
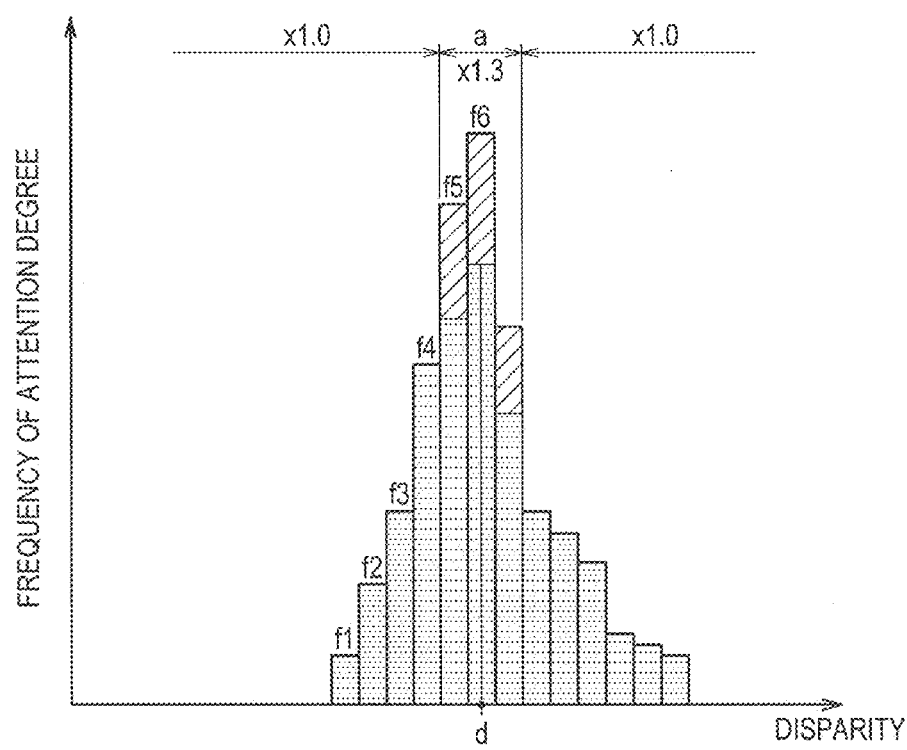
FIG. 32 is a schematic diagram illustrating a weighted disparity histogram.

The disparity layout converting unit 120 uses the weighting parameter corresponding to the disparity obtained as an analysis result to generate a weighted disparity histogram. FIG. 32 is a schematic diagram illustrating a weighted disparity histogram made by the disparity layout converting unit 120. The histogram illustrated in FIG. 32 has the frequency of the band a near the disparity value d, which is illustrated in FIG. 31, increased by a weighting parameter (weighting coefficient (×1.3)). A hatched part of the band a in FIG. 32 corresponds to a part increased by the weighting parameter. The other parts than the band a near the disparity value d have a weighting parameter of 1.0, and are the same as the histogram of FIG. 31. Additionally, a weighting parameter for a part other than the band a may be less than 1.0.

The disparity layout converting unit 120 generates an I/O curve for converting a disparity layout from a cumulative histogram of the weighted disparity histogram illustrated in FIG. 32.

Figure 33:
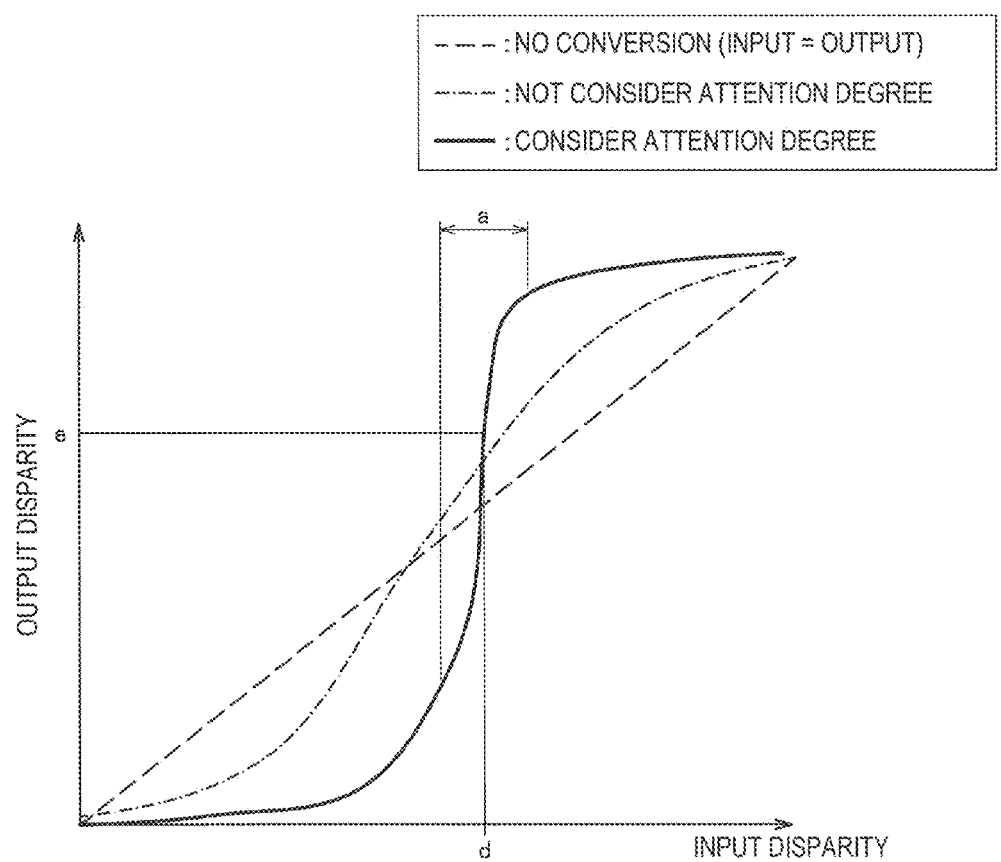
FIG. 33 is a schematic diagram illustrating an example of an I/O curve for converting a disparity layout according to a modified example 2.

For example, FIG. 33 is a schematic diagram illustrating an example of an I/O curve for converting a disparity layout according to the modified example 2.

The frequencies in the weighted disparity histogram illustrated in FIG. 32 are accumulated in association with the disparity values to generate a characteristic of the solid line in the I/O curve illustrated in FIG. 33. For example, a value of an output disparity e corresponding to an input disparity having a disparity value d can be obtained by accumulating the frequencies of disparity values 0 to d illustrated in FIG. 33. To give a specific example, it is possible to obtain the output disparity e in the example illustrated in FIG. 33 by normalizing the cumulative sum of frequencies f1 to f6.

In the same way, a characteristic of the chain line illustrated in FIG. 33 is generated by accumulating the frequencies of the histogram illustrated in FIG. 31 in association with the disparity values, and is shown for comparison with the characteristic of the solid line. Meanwhile, a characteristic of the dashed line illustrated in FIG. 33 indicates that an output disparity is output without carrying out conversion for an input disparity (input disparity=output disparity).

If the characteristic of the solid line illustrated in FIG. 33 is compared with the characteristic of the chain line illustrated in FIG. 33, the characteristic of the solid line has a sharper slope in the band a than the characteristic in the chain line has because the characteristic of the solid line is generated from the weighted disparity histogram having the frequencies of the band a increased by the weighting parameter.

Once an I/O curve for converting a disparity layout is generated, the disparity layout converting unit 120 converts and outputs the disparity in a disparity map on the basis of the I/O curve. The later processes are the same as the processes performed by the image processing device according to each of the above-described embodiments.

As described above, the image processing device according to the modified example 2 weights an area having a higher attention degree of a viewer in a manner that the disparity is emphasized more, and generates an I/O curve for converting a disparity layout on the basis of the weight. Accordingly, a disparity map is converted in a manner that a pixel having a higher attention degree has a larger disparity value. Such a configuration allows the image processing device according to the modified example 2 to increase a disparity value of a pixel having a high attention degree, and to emphasize a stereoscopic sense in the area having a high attention degree.

Additionally, the image processing device according to the modified example 2 identifies, by analyzing an original image, an area to which a viewer is likely to pay attention in the above-described example, and yet the above-described method does not necessarily have to be used as long as it is possible to identify an area in the original image having a high attention degree of a viewer.

For example, the image processing device may identify an area in an original image to which a viewer pays attention from a visual line direction of the viewer to the display panel 25 of the display device 20. In this case, for example, the image processing device may identify a visual line direction of a viewer to the display panel 25 on the basis of a facial image of the viewer (image of the eyes in particular) captured by a camera, etc.

In addition, as described for the modified example 1, the image processing device according to the modified example 1 may be combined with the image processing device according to the second modified example 2. For example, a plurality of areas divided in the depth direction may be weighted in accordance with the height of an attention degree in an original image, and then a disparity map may be converted in a manner that the disparity is reduced for each of the areas in accordance with the weight. In this case, as discussed above, the image processing device may convert the height of an attention degree into numerals on the basis of an image feature (such as contrast, luminance, an edge, and a spatial frequency) in an original image and a detected visual line direction of a viewer, and then weight the plurality of areas divided on the basis of the attention degree.

8.3. Modified Example 3

Next, an image processing device according to a modified example 3 will be described. Let us assume that the number of viewpoints in a display is V, while a quantity of light at a viewpoint k seen from a given apparent position is $r_k$. The front surface or the backward part (part between a display panel and a backlight) of a display panel of a display has a parallax element (such as a barrier having a slit) for forming a multi-viewpoint image. For example, the barrier 23 corresponds to a parallax element in the display device 20 illustrated in FIG. 2.

FIGS. 34 and 35 each are a plan view illustrating an RGB sub-pixel and a crosstalk ratio thereof, the schematic diagrams each illustrating a crosstalk ratio dependent on the slope of a parallax element. The slope of a parallax element is 1:3 in FIG. 34, and parallax elements (slits) are provided in the directions indicated in chain lines P. Meanwhile, the slope of a parallax element (slit) is not 1:3 in FIG. 35, and the slope is gentler than the slope in FIG. 34.

If the slope of a parallax element is 1:3, a crosstalk ratio $r=(r_1, r_2, r_3, r_4, \ldots, r_V)$ is uniquely decided. To the contrary, if the slope of a parallax element is not 1:3, a plurality of types of crosstalk ratio $r=(r1, r2, r3, r4, \ldots, r_N)$ are present. The types are represented by M.

A specific example will be described on the basis of FIGS. 34 and 35. The upper figure illustrates the number of a viewpoint to be mapped to each pixel in each of FIGS. 34 and 35. The lower figure illustrates a crosstalk ratio of each pixel.

As illustrated in FIG. 34, a crosstalk ratio is 0.1, which is the smallest, at the position (on the chain line P) of a parallax element (slit), while a crosstalk ratio increases with an increasing distance from the parallax element. As illustrated in FIG. 34, if the slope of a parallax element is 1:3, crosstalk ratios of the respective components of adjacent RGB sub-pixels are equal to each other. That is to say, the crosstalk ratios illustrated in a column 1 (Column 1) are r=(r1, r2, r3, r4, . . . , r6)=(0.13, 0.3, 1, 0.3, 0.13, 0.1) with respect to any of R, G, and B components, and these crosstalk ratios are cyclically repeated in the lower figure of FIG. 34. Additionally, since the number of viewpoints is 6, r=(r1, r2, r3, r4, . . . , r6)=(0.13, 0.3, 1, 0.3, 0.13, 0.1) is cyclically repeated in the first row in a column 3 (Column 3) or later. A luma component is represented as a linear sum of RGB components, so that a crosstalk ratio may be approximately described with a luma component alone.

To the contrary, if the slope of a parallax element is not 1:3, crosstalk ratios of the respective components of adjacent RGB sub-pixels are not equal to each other. For example, as the description is made chiefly for a column 1 (Column 1) in the lower part of FIG. 35, a crosstalk ratio of R components is $r_R=(r_{R1}, r_{R2}, r_{R3}, r_{R4}, \ldots, r_{R8})$=(0.1, 0.11, 0.16, 0.45, 0.73, 0.71, 0.55, 0.19), a crosstalk ratio of G components is $r_G=(r_{G1}, r_{G2}, r_{G3}, r_{G4}, \ldots, r_{G8})$=(0.1, 0.13, 0.25, 0.65, 0.74, 0.66, 0.34, 0.14), and a crosstalk ratio of B components is $r_B=(r_{B1}, r_{B2}, r_{B3}, r_{B4}, \ldots, r_{B8})$=(0.1, 0.11, 0.16, 0.45, 0.73, 0.71, 0.55, 0.19), so that the crosstalk ratios of the RGB components are different (the crosstalk ratio of the G components alone is different in this example). Thus, this dispersion of the crosstalk ratios causes color breakup. This dispersion differs at a different position in a display surface, and is cyclic in accordance with the slope of a parallax element. Accordingly, crosstalk causes cyclic color breakup, leading to a striped pattern.

FIG. 36 is a schematic diagram illustrating an example in which color breakup causes a striped pattern. The left figure of FIG. 36 illustrates that the slope of a parallax element is 1:3, and color breakup causes no striped pattern when the slope of the parallax element is 1:3. Meanwhile, the right figure of FIG. 36 illustrates that the slope of a parallax element is not 1:3. As illustrated in the right figure of FIG. 36, when the slope of a parallax element is not 1:3, color breakup causes a striped pattern. In this way, a display that does not have a parallax element slope of 1:3 as its original design experiences the degradation of image quality caused by color breakup.

Different from each of the above-described embodiments and each of the above-described modified examples, the modified examples 3 illustrates that a process is performed for color breakup of RGB components, thereby preventing a pattern caused by the color breakup from occurring. For example, the following 3 steps are primarily used for learning in the example described in "4. Description of Principles."

(First Step) A crosstalk model is applied to a luminance image component, and a crosstalk degradation amount ΔI image is generated while disparity is changing.

(Second Step) A class is defined with the contrast/spatial frequency of a luminance image, and data samples of a disparity transition of the crosstalk degradation amount ΔI are collected for each class from an image group generated in step 1.

(Third Step) A regression analysis is carried out on sample data in each class, and the sample data is converted into a function or a table.

As discussed above, since a crosstalk ratio of RGB sub-pixels is constant when the slope of a parallax element is 1:3, learning alone for luma components, which are a linear sum of RGB is sufficient. However, when the slope of a parallax element is not 1:3, a crosstalk ratio differs at a different position on a display surface, so that there are M types of crosstalk ratio. Thus, the degradation of image quality is represented using M types of crosstalk model to an image of RGB components without degeneration to luma components in the modified example 3. Learning in the modified example 3 is conducted in the following 3 steps.

(First Step) Crosstalk models for M types of crosstalk ratio are applied to respective components of RGB images, and crosstalk degradation amount ΔR image, ΔG image, and ΔB image are generated while disparity is changing. Additionally, a crosstalk ratio changes depending on the slope of a parallax element, so that the crosstalk degradation amount ΔR image, ΔG image, and ΔB are obtained in advance for each of M types from crosstalk models for M types of crosstalk ratio depending on the slope of a parallax element. It is also possible to measure a crosstalk ratio as illustrated in the lower part of each of FIGS. 34 and 35 by directly measuring the luminance of a display.

(Second Step) A class is defined with the contrast/spatial frequency for each component of the RGB images, and data samples of a disparity transition of the crosstalk degradation amount ΔI are collected for each class from an image group generated in step 1.

(Third Step) A regression analysis is carried out on sample data in each class, and the sample data is converted into a function or a table.

The above-described 3 steps are used to obtain the first terms (referred to as $\Delta I_R$ hat, $\Delta I_G$ hat, and $\Delta I_B$ hat) on the right sides in the following formulae through learning.

$\Delta I_R(C_{R\_sf}, disp) = \widehat{\Delta I}_R(C_{R\_sf}, disp) + N(\sigma),$ $C_{R\_sf} = (C_{R\_0}, C_{R\_1}, \ldots, C_{R\_N-1})$ \hfill (formula 6)

$\Delta I_G(C_{G\_sf}, disp) = \widehat{\Delta I}_G(C_{G\_sf}, disp) + N(\sigma),$ $C_{G\_sf} = (C_{G\_0}, C_{G\_1}, \ldots, C_{G\_N-1})$ \hfill (formula 7)

$\Delta I_B(C_{B\_sf}, disp) = \widehat{\Delta I}_B(C_{B\_sf}, disp) + N(\sigma),$ $C_{B\_sf} = (C_{B\_0}, C_{B\_1}, \ldots, C_{B\_N-1})$ \hfill (formula 8)

Here, $C_{R\_sf}$ represents an R component contrast vector to be decomposed into N vectors for each spatial frequency, $C_{R\_i}$ represents the contrast of a spatial frequency i in an R component image, and $\Delta I_R$ hat of the first term on the right side in the formula 6 represents a statistical value (function or table) of a disparity transition of a crosstalk degradation amount ΔI in $C_{R\_sf}$ in the R component image.

Similarly, $C_{G\_sf}$ represents a G component contrast vector to be decomposed into N vectors for each spatial frequency, $C_{G\_i}$ represents the contrast of a spatial frequency i in a G component image, and $\Delta I_G$ hat of the first term on the right side in the formula 7 represents a statistical value (function or table) of a disparity transition of a crosstalk degradation amount ΔI in $C_{G\_sf}$ in the G component image. In addition, $C_{B\_sf}$ represents a B component contrast vector to be decomposed into N vectors for each spatial frequency, $C_{B\_i}$ represents the contrast of a spatial frequency i in a B component image, and $\Delta I_B$ hat of the first term on the right side in the formula 8 represents a statistical value (function or table) of a disparity transition of a crosstalk degradation amount ΔI in $C_{B\_sf}$ in the B component image. These $\Delta I_R$ hat, $\Delta I_G$ hat, and $\Delta I_B$ hat are generated as much as the number of types (M types) of crosstalk ratio. More specifically, an index j is assumed to be an integer satisfying $0 \leq j \leq M-1$, and $\Delta I_R^j$ hat, $\Delta I_G^j$ hat, and $\Delta I_B^j$ hat are obtained for each crosstalk ration through learning.

Next, an operation for the image processing device 10 according to the modified example 3 to control disparity will be described. The image processing device 10 according to the modified example 3 has a different structural element for generating a maximum disparity amount map, which namely means the operations of the image analysis unit 102 and the maximum disparity amount estimating unit 104, from the structural element of the image processing device 10 according to each of the above-described embodiments. Accordingly, the detailed description will be made for the image analysis unit 102 and the maximum disparity amount estimating unit 104 according to the modified example 3, and the detailed description of the other structural elements will be omitted.

The maximum disparity amount estimating unit 104 according to the modified example 3 applies the process of estimating a maximum disparity amount to a chroma component, and computes a crosstalk degradation amount ΔI for the chroma component.

Specifically, the image analysis unit 102 carries out a spatial frequency analysis on each of RGB components in an original image with N types of band-pass filter (such as a Gabor filter and a LOG filter) to compute contrast/spatial frequency $C_{R\_sf}$, $C_{G\_sf}$, and $C_{B\_sf}$ for each pixel. The image analysis unit 102 then outputs, to the maximum disparity amount estimating unit 104, the contrast vector $C_{sf}=(C_0, C_1, \ldots, C_{N-1})$ of each of N types of spatial frequency obtained for each pixel for each of the RGB components, which namely means information indicating a spatial frequency map.

The maximum disparity amount estimating unit 104 obtains an index j of a crosstalk ratio from information on a crosstalk ratio for each pixel (retained in advance as an index map of an integer j ($0 \leq j \leq M-1$). The maximum disparity amount estimating unit 104 makes a class separation on the basis of information on the contrast/spatial frequency $C_{R\_sf}$, $C_{G\_sf}$, $C_{B\_sf}$ of each of the RGB components, which is compared with class data in a database for a learning result, the class data corresponding to the index j of the crosstalk ratio.

After settling the corresponding class, the maximum disparity amount estimating unit 104 retains $\Delta I_R^j$ hat, $\Delta I_G^j$ hat, and $\Delta I_B^j$ hat (model formula of $\Delta I$-disp of each of the RGB components) for each pixel.

Next, the maximum disparity amount estimating unit 104 integrates graphs of $\Delta I_R^j$ hat, $\Delta I_G^j$ hat, and $\Delta I_B^j$ hat, and newly generates a $\Delta I$-disp model formula for a chroma component. The maximum disparity amount estimating unit 104 then inputs a threshold Th for perceiving degradation to the $\Delta I$-disp model formula for a chroma component, and generates a maximum disparity amount map by computing a maximum disparity amount for each pixel.

Here, the further detailed description will be made for a process for the maximum disparity amount estimating unit 104 to generate a $\Delta I$-disp model formula on the basis of $\Delta I_R^j$ hat, $\Delta I_G^j$ hat, and $\Delta I_B^j$ hat, and a process for the maximum disparity amount estimating unit 104 to generate a maximum disparity amount on the basis of the $\Delta I$-disp model formula.

The maximum disparity amount estimating unit 104 evaluates the chrominance of RGB with a Cb component and a Cr component in a YcBCr space. In this case, conversion formulae from RGB to YCbCr are expressed in the following formulae (formula 9).

$$Y=0.2126*R+0.7152*G+0.0722*B$$

$$Cb=-0.1146*R-0.3854*G+0.5000*B$$

$$Cr=0.5000*R-0.4542*G-0.0458*B \quad \text{(formula 9)}$$

The above-described formulae are linear, so that if change amounts by crosstalk $\Delta I_R^j$ hat, $\Delta I_G^j$ hat, and $\Delta I_B^j$ hat are put into R, G, and B in the formula 9, respectively, the following can be obtained as functions of crosstalk degradation amounts of chroma components.

$$\widehat{\Delta I}_{Cb}^j(C_{R\_sf}, C_{G\_sf}, C_{B\_sf}, \text{disp})$$

$$\widehat{\Delta I}_{Cr}^j(C_{R\_sf}, C_{G\_sf}, C_{B\_sf}, \text{disp})$$

The respective functions of the crosstalk degradation amounts of the chroma components will be referred to as $\Delta I_{Cb}^j$ hat and $\Delta I_{Cr}^j$ hat below.

Figure 37:
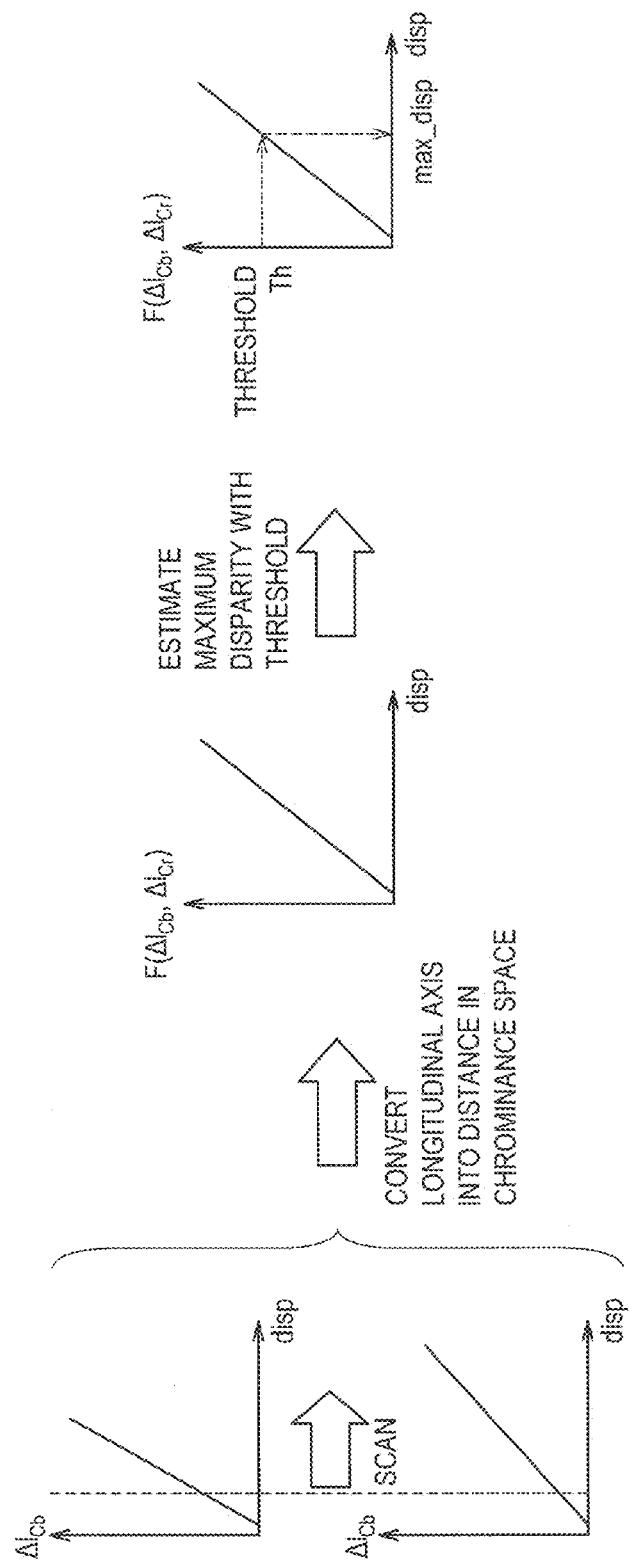
FIG. 37 is a schematic diagram illustrating a method for estimating a maximum disparity amount in which color breakup does not occur.

FIG. 37 illustrates a method for estimating a maximum disparity amount in which color breakup does not occur from $\Delta I_{Cb}^j$ hat and $\Delta I_{Cr}^j$ hat obtained in this way. As illustrated in FIG. 37, each graph is scanned along the disp (disparity) axis, and an evaluation function $F(\Delta I_{Cb}, \Delta I_{Cr})$ representing color breakup is used to integrate $\Delta I_{Cb}^j$ hat and $\Delta I_{Cr}^j$ hat into a single graph. For example, an evaluation function representing color breakup can be defined in the following way.

$$F(\Delta I_{Cb}, \Delta I_{Cr})=(\Delta I_{Cb}^2+\Delta I_{Cr}^2)^{1/2} \quad \text{(formula 10)}$$

The formula 10 represents, as a distance, a change from the original chrominance in a Cb–Cr chrominance space (two-dimension). That is to say, each graph of $\Delta I_{Cb}^j$ hat and $\Delta I_{Cr}^j$ hat illustrated in the left part of FIG. 37 is scanned along the disp (disparity) axis, the distance between $\Delta I_{Cb}$ and $\Delta I_{Cr}$ corresponding to the disparity in the Cb–Cr chrominance space (two-dimension) (intermediate characteristic in FIG. 37) is obtained. Additionally, any other evaluation functions than the formula 10 can also represent color breakup. For example an angular shift from the origin (achromatic color) in the Cb–Cr chrominance space may be defined to define an evaluation function representing a hue shift. Furthermore, the present embodiment has described a color space representing color breakup by using a YCbCr space, and yet a similar process may be used in a CIE L*a*b* space (nonlinear), which takes a color perception characteristic of human vision more into consideration.

If a threshold Th for color breakup perception is input to the longitudinal axis in a graph (rightmost graph in FIG. 37) for evaluating color breakup obtained in this way, it is possible to compute a maximum disparity amount max_disp in which color breakup is not perceived.

Additionally, the operations after the maximum disparity amount map is generated are similar to the operations of the image processing device 10 according to each of the above-described embodiments.

As described above, the image processing device 10 according to the modified example 3 can use the disparity display performance of a display to the maximum by taking into consideration an image feature (contrast/spatial frequency) in addition to a display characteristic (crosstalk to each of RGB components) and estimating, with high accuracy, a critical disparity amount in which color breakup almost occurs. This allows a stereoscopic sense, a sense of depth, and image quality in a tradeoff relationship to be optimized, thereby allowing a user to have a video experience with a clear sense of presence. The technology is of great versatility, and is adjustable for a display having a different design without relying on a user's experience.

Furthermore, since a crosstalk degradation amount $\Delta I$ (chrominance) is estimated from the display characteristics and image feature, it can be easily adjusted in a display having a different design. In addition, by using psychological and physical amounts quantized in vision research, disparity control can be exerted with higher accuracy.

9. HARDWARE CONFIGURATION

Figure 38:
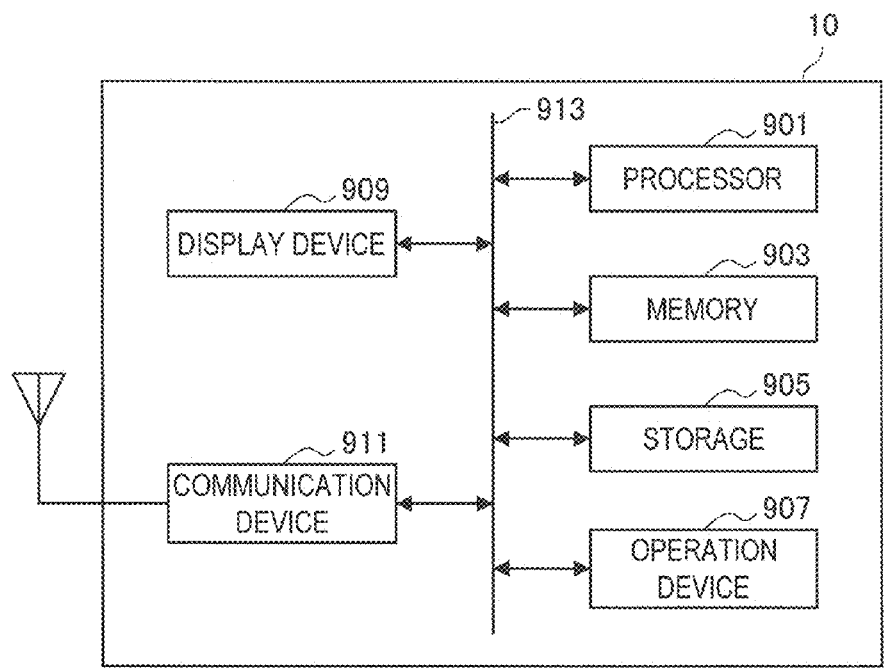
FIG. 38 is a diagram illustrating an example of a hardware configuration.

Next, an example of the hardware configuration of the image processing device 10 according to an embodiment of the present disclosure will be described with reference to FIG. 38. FIG. 38 illustrates an example of the hardware configuration of the image processing device 10 according to the present embodiment.

As illustrated in FIG. 38, the image processing device 10 according to the present embodiment includes a processor 901, a memory 903, a storage 905, an operation device 907, a display device 909, a communication device 911, and a bus 913.

The processor 901 may be, for example, a central processing unit (CPU), a graphics processing unit (GPU), a digital signal processor (DSP), or a system on chip (SoC), and executes a variety of processes of the image processing device 10. The processor 901 can be made of, for example, an electronic circuit for executing a variety of arithmetic processing. Additionally, the processor 901 may include the image analysis unit 102, the maximum disparity amount estimating unit 104, the maximum disparity range deciding unit 106, the disparity layout converting unit 120, the maximum phase difference estimating unit 130, and the phase difference deciding unit 132, which have been described above.

The memory 903 includes random access memory (RAM) and read only memory (ROM), and stores a program to be executed by the processor 901 and data. The storage 905 may include a storage medium such as semiconductor memory and a hard disk.

The operation device 907 has a function of generating an input signal for allowing a user to perform a desired operation. The operation device 907 may be made of, for example, an input unit such as a button and a switch for allowing a user to input information, and an input control circuit for generating an input signal on the basis of an input from a user and supplying the input signal to the processor 901.

The display device 909 is an example of an output device, and may be a display device such as a liquid crystal display (LCD) display and an organic light emitting diode (OLED) display device. The display device 909 can provide information to a user by displaying a screen. Additionally, the above-described display device 20 may be used as the display device 909, or the display device 909 may be installed apart from the display device 20.

The communication device 911 is a communication unit included in the image processing device 10, and communicates with an external device via a network. The communication device 911 is an interface for wireless communication, may include a communication antenna, a radio frequency (RF) circuit, a baseband processor, and the like.

The communication device 911 has a function of performing a variety of signal processing on a signal received from an external device, and can supply a digital signal generated from the received analogue signal to the processor 901.

The bus 913 connects the processor 901, the memory 903, the storage 905, the operation device 907, the display device 909, and the communication device 911 to each other. The bus 913 may include a plurality of types of bus.

It is also possible to manufacture a program for causing hardware such as a CPU, ROM, and RAM built in a computer to perform a function corresponding to a structural element in the above-described image processing device 10. There may also be provided a computer-readable storage medium having the program recorded thereon.

10. APPLICATION EXAMPLE

An application example of the image processing device according to the above-described embodiment will be described below using a specific example.

Figure 39:
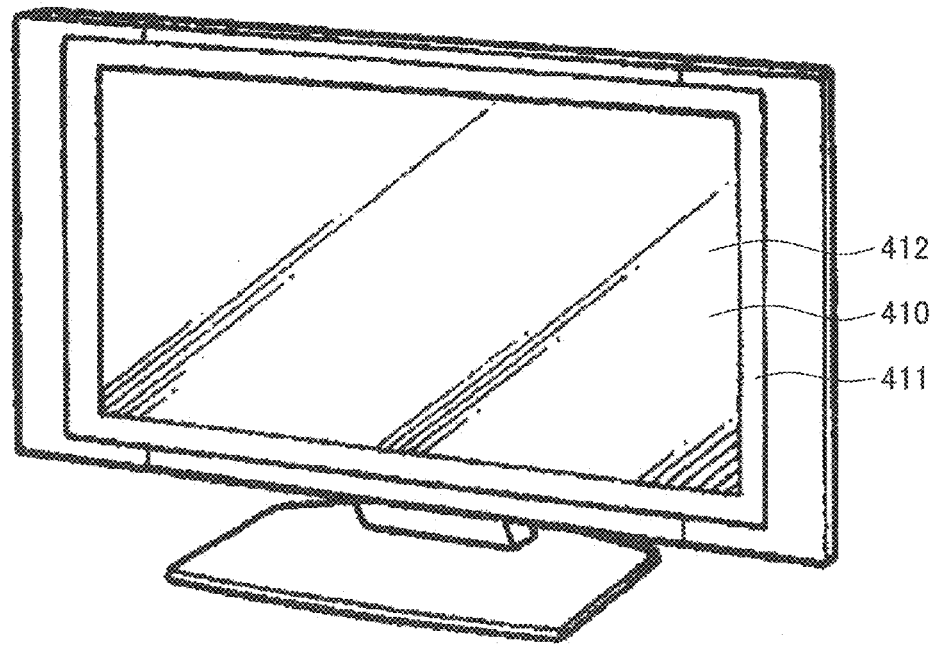
FIG. 39 is a perspective view illustrating an external appearance of an application example (television device) of an image processing device according to an embodiment of the present disclosure.

For example, FIG. 39 illustrates an external appearance of a television device. The television device is equipped with, for example, a video display screen unit 410 (display device 20) including a front panel 411 and a filter glass 412. Additionally, a device (e.g. processor such as a CPU and a GPU) for displaying an image on the video display screen unit 410, which is installed in the housing of the television device, corresponds to the image processing device 10 according to the above-described embodiment. If a display device according to an embodiment of the present disclosure is used as a television device, it is possible to accurately estimate to what extent a stereoscopic sense can be created until image quality degrades, so that a sufficiently wide disparity range can be used within a range within which an image to be observed is not broken. Accordingly, it is possible to use the 3D display performance of a television device to the maximum, contributing to the television device.

Additionally, the above-described application example is merely illustrative, and, needless to say, an applicable configuration of the image processing device according to the present embodiment is not limited thereto.

11. CONCLUSION

It should be understood by those skilled in the art that various modifications, combinations, sub-combinations and alterations may occur depending on design requirements and other factors insofar as they are within the scope of the appended claims or the equivalents thereof.

For example, an example has been described so far in the above-described embodiments in which a disparity value associated with each pixel in an original image is adjusted, and yet any parameter associated with each pixel other than a disparity value can also be adjusted. To give a specific example, the image processing device 10 may be configured to adjust a parameter (such as a pixel value) associated with each pixel in a manner that lightness, contrast, saturation, chromaticity, a spatial frequency, or the like is adjusted for each pixel.

The advantageous effects described herein are merely explanatory or illustrative, but not limited. That is to say, the technology according to the present disclosure may attain other advantageous effects obvious to those skilled in the art from the present specification in combination with the above-described advantageous effects or instead thereof.

Additionally, the present technology may also be configured as below.

(1) An image processing method including:
acquiring an original image and a disparity map, the disparity map indicating distribution of disparity values associated with respective pixels in the original image;
causing a processor to decide a dynamic range of disparity on the basis of the acquired original image and the acquired disparity map; and
converting the disparity map in a manner that each disparity in the disparity map is distributed within the decided dynamic range of the disparity.

(2) The image processing method according to (1),
wherein the dynamic range of the disparity is decided on the basis of distribution of maximum disparity amounts and the disparity map, the distribution of the maximum disparity amounts being based on a relationship between a crosstalk degradation amount corresponding to contrast according to a spatial frequency of the original image, and a disparity transition.

(3) The image processing method according to (2),
wherein the dynamic range of the disparity is decided on the basis of the disparity map, and each maximum disparity amount for a forward area positioned on a front side in a depth direction and a backward area positioned on a back side in the depth direction.

(4) The image processing method according to (3),
wherein the dynamic range of the disparity is decided on the basis of a threshold process for an integrated value of the maximum disparity amounts from the front side in the forward area, and a threshold process for an integrated value of the maximum disparity amounts from the back side in the backward area.

(5) The image processing method according to any one of (2) to (4),
wherein the distribution of the maximum disparity amounts is decided on the basis of the distribution of the contrast according to the spatial frequency of the original image.

(6) The image processing method according to (5), further including:
analyzing the contrast according to the spatial frequency of the original image for each of RGB pixels;
acquiring the relationship between the crosstalk degradation amount and the disparity transition for each of the RGB pixels, the relationship corresponding to the contrast according to the spatial frequency of the original image; and
integrating the relationship between the crosstalk degradation amount and the disparity transition, the relationship being acquired for each of the RGB pixels,
wherein the distribution of the maximum disparity amounts is decided on the basis of the integrated relationship between the crosstalk degradation amount and the disparity transition.

(7) The image processing method according to (1),
wherein the dynamic range of the disparity is decided on the basis of distribution of relative values of maximum disparity amounts based on pixels values of the respective pixels in the original image, and the disparity map.

(8) The image processing method according to (7),
wherein a ratio of ranges of the disparity between a front side and a back side in a depth direction based on a display surface is calculated on the basis of the distribution of the relative values of the maximum disparity amounts, and
wherein the dynamic range of the disparity is decided on the basis of the calculated ratio of the ranges of the disparity.

(9) The image processing method according to (7) or (8),
wherein the pixel values of the respective pixels represent strength of an edge calculated for each of the pixels in the original image.

(10) The image processing method according to (7) or (8),
wherein the pixel values of the respective pixels represent the contrast according to the spatial frequency of the original image.

(11) The image processing method according to any one of (1) to (10),
wherein the disparity map is divided into a plurality of areas in a depth direction, and the plurality of areas that have been divided are weighted, and
wherein the disparity map is converted in a manner that the disparity is reduced for each of the areas in accordance with the weights.

(12) The image processing method according to (11),
wherein the plurality of areas are weighted on the basis of the distribution of the maximum disparity amounts based on a relationship between a crosstalk degradation amount and a disparity transition in a manner that an area the maximum disparity amount of which is larger is weighted more, the plurality of areas having been divided in the depth direction, the relationship corresponding to contrast according to a spatial frequency of the original image.

(13) The image processing method according to (11),
wherein the plurality of areas are weighted in a manner that an area having a higher attention degree in the original image is weighted more, the plurality of areas having been divided in the depth direction.

(14) The image processing method according to any one of (1) to (13), further including:
estimating distribution of maximum phase differences of a viewpoint image at adjacent viewpoint positions of a plurality of viewpoint positions on the basis of the distribution of the maximum disparity amounts based on the original image, and the disparity map that has been converted; and
deciding a phase difference of the viewpoint image at the adjacent viewpoint positions on the basis of the estimated distribution of the maximum phase differences.

(15) The image processing method according to any one of (1) to (14),
wherein an area having a high attention degree in the original image is identified, and the disparity map is converted in a manner that the identified area is emphasized.

(16) The image processing method according to (15),
wherein a visual line of a viewer is detected, and an area to which the viewer pays attention in the original image is identified as the area having a high attention degree on the basis of the detected visual line.

(17) The image processing method according to (15),
wherein, on the basis of saliency of each area in the original image, an area the saliency of which is high is identified as the area having a high attention degree.

(18) An image processing device including:
an acquisition unit configured to acquire an original image and a disparity map, the disparity map indicating distribution of disparity values associated with respective pixels in the original image;
a disparity range deciding unit configured to decide a dynamic range of disparity on the basis of the acquired original image and the acquired disparity map; and
a disparity layout converting unit configured to convert the disparity map in a manner that each disparity in the disparity map is distributed within the decided dynamic range of the disparity.

(19) An electronic apparatus including:
an acquisition unit configured to acquire an original image and a disparity map, the disparity map indicating distribution of disparity values associated with respective pixels in the original image;
a disparity range deciding unit configured to decide a dynamic range of disparity on the basis of the acquired original image and the acquired disparity map; and
a disparity layout converting unit configured to convert the disparity map in a manner that each disparity in the disparity map is distributed within the decided dynamic range of the disparity.

What is claimed is:

1. An image processing method comprising:
acquiring an original image and a disparity map, the disparity map indicating distribution of disparity values associated with respective pixels in the original image;
causing a processor to decide a dynamic range of disparity on the basis of the acquired original image and the acquired disparity map; and
converting the disparity map in a manner that each disparity in the disparity map is distributed within the decided dynamic range of the disparity;
wherein the dynamic range of the disparity is decided on the basis of distribution of maximum disparity amounts and the disparity map, the distribution of the maximum disparity amounts being based on a relationship between a crosstalk degradation amount corresponding to contrast according to a spatial frequency of the original image, and a disparity transition.

2. The image processing method according to claim 1,
wherein the dynamic range of the disparity is decided on the basis of the disparity map, and each maximum disparity amount for a forward area positioned on a front side in a depth direction and a backward area positioned on a back side in the depth direction.

3. The image processing method according to claim 2, wherein the dynamic range of the disparity is decided on the basis of a threshold process for an integrated value of the maximum disparity amounts from the front side in the forward area, and a threshold process for an integrated value of the maximum disparity amounts from the back side in the backward area.

4. The image processing method according to claim 1, wherein the distribution of the maximum disparity amounts is decided on the basis of the distribution of the contrast according to the spatial frequency of the original image.

5. The image processing method according to claim 4, further comprising:
analyzing the contrast according to the spatial frequency of the original image for each of RGB pixels;
acquiring the relationship between the crosstalk degradation amount and the disparity transition for each of the RGB pixels, the relationship corresponding to the contrast according to the spatial frequency of the original image; and
integrating the relationship between the crosstalk degradation amount and the disparity transition, the relationship being acquired for each of the RGB pixels,
wherein the distribution of the maximum disparity amounts is decided on the basis of the integrated relationship between the crosstalk degradation amount and the disparity transition.

6. The image processing method according to claim 1, wherein the dynamic range of the disparity is decided on the basis of distribution of relative values of maximum disparity amounts based on pixels values of the respective pixels in the original image, and the disparity map.

7. The image processing method according to claim 6, wherein a ratio of ranges of the disparity between a front side and a back side in a depth direction based on a display surface is calculated on the basis of the distribution of the relative values of the maximum disparity amounts, and
wherein the dynamic range of the disparity is decided on the basis of the calculated ratio of the ranges of the disparity.

8. The image processing method according to claim 6, wherein the pixel values of the respective pixels represent strength of an edge calculated for each of the pixels in the original image.

9. The image processing method according to claim 6, wherein the pixel values of the respective pixels represent the contrast according to the spatial frequency of the original image.

10. The image processing method according to claim 1, wherein the disparity map is divided into a plurality of areas in a depth direction, and the plurality of areas that have been divided are weighted, and
wherein the disparity map is converted in a manner that the disparity is reduced for each of the areas in accordance with the weights.

11. The image processing method according to claim 10, wherein the plurality of areas are weighted on the basis of the distribution of the maximum disparity amounts based on a relationship between a crosstalk degradation amount and a disparity transition in a manner that an area the maximum disparity amount of which is larger is weighted more, the plurality of areas having been divided in the depth direction, the relationship corresponding to contrast according to a spatial frequency of the original image.

12. The image processing method according to claim 10, wherein the plurality of areas are weighted in a manner that an area having a higher attention degree in the original image is weighted more, the plurality of areas having been divided in the depth direction.

13. The image processing method according to claim 1, further comprising:
estimating distribution of maximum phase differences of a viewpoint image at adjacent viewpoint positions of a plurality of viewpoint positions on the basis of the distribution of the maximum disparity amounts based on the original image, and the disparity map that has been converted; and
deciding a phase difference of the viewpoint image at the adjacent viewpoint positions on the basis of the estimated distribution of the maximum phase differences.

14. The image processing method according to claim 1, wherein an area having a high attention degree in the original image is identified, and the disparity map is converted in a manner that the identified area is emphasized.

15. The image processing method according to claim 14, wherein a visual line of a viewer is detected, and an area to which the viewer pays attention in the original image is identified as the area having a high attention degree on the basis of the detected visual line.

16. The image processing method according to claim 14, wherein, on the basis of saliency of each area in the original image, an area the saliency of which is high is identified as the area having a high attention degree.

17. An image processing device comprising:
an acquisition unit configured to acquire an original image and a disparity map, the disparity map indicating distribution of disparity values associated with respective pixels in the original image;
a disparity range deciding unit configured to decide a dynamic range of disparity on the basis of the acquired original image and the acquired disparity map; and
a disparity layout converting unit configured to convert the disparity map in a manner that each disparity in the disparity map is distributed within the decided dynamic range of the disparity;
wherein the dynamic range of the disparity is decided on the basis of distribution of maximum disparity amounts and the disparity map, the distribution of the maximum disparity amounts being based on a relationship between a crosstalk degradation amount corresponding to contrast according to a spatial frequency of the original image, and a disparity transition.

18. An electronic apparatus comprising:
an acquisition unit configured to acquire an original image and a disparity map, the disparity map indicating distribution of disparity values associated with respective pixels in the original image;
a disparity range deciding unit configured to decide a dynamic range of disparity on the basis of the acquired original image and the acquired disparity map; and
a disparity layout converting unit configured to convert the disparity map in a manner that each disparity in the disparity map is distributed within the decided dynamic range of the disparity;
wherein the dynamic range of the disparity is decided on the basis of distribution of maximum disparity amounts and the disparity map, the distribution of the maximum disparity amounts being based on a relationship between a crosstalk degradation amount corresponding to contrast according to a spatial frequency of the original image, and a disparity transition.

* * * * *